US012466738B2

(12) United States Patent
Burton et al.

(10) Patent No.: US 12,466,738 B2
(45) Date of Patent: Nov. 11, 2025

(54) INTRAMOLECULAR PI-STACKING STRUCTURE DIRECTING AGENTS AND MOLECULAR SIEVES SYNTHESIZED THEREFROM

(71) Applicant: ExxonMobil Technology and Engineering Company, Annandale, NJ (US)

(72) Inventors: Allen W. Burton, Stewartsville, NJ (US); Hilda B. Vroman, Piscataway, NJ (US); Joseph M. Falkowski, Hampton, NJ (US); Eugene Terefenko, Center Valley, PA (US); Michael A. Marella, Easton, PA (US); Ross Mabon, Whitehall, PA (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 640 days.

(21) Appl. No.: 17/772,065

(22) PCT Filed: Jul. 22, 2020

(86) PCT No.: PCT/US2020/042989
§ 371 (c)(1),
(2) Date: Apr. 26, 2022

(87) PCT Pub. No.: WO2021/086458
PCT Pub. Date: Jun. 5, 2021

(65) Prior Publication Data
US 2022/0388853 A1 Dec. 8, 2022

Related U.S. Application Data

(60) Provisional application No. 62/929,524, filed on Nov. 1, 2019.

(51) Int. Cl.
| | |
|---|---|
| C01B 39/04 | (2006.01) |
| C01B 37/00 | (2006.01) |
| C01B 39/14 | (2006.01) |
| C01B 39/48 | (2006.01) |
| C01B 39/50 | (2006.01) |
| C01B 39/54 | (2006.01) |

(52) U.S. Cl.
CPC ............ *C01B 39/04* (2013.01); *C01B 37/005* (2013.01); *C01B 37/007* (2013.01); *C01B 39/145* (2013.01); *C01B 39/48* (2013.01); *C01B 39/50* (2013.01); *C01B 39/54* (2013.01)

(58) Field of Classification Search
None
See application file for complete search history.

(56) References Cited

U.S. PATENT DOCUMENTS

| | | | |
|---|---|---|---|
| 5,569,785 A | 10/1996 | Kourtakis et al. | 564/474 |
| 6,143,261 A | 11/2000 | Lissy et al. | 423/213.5 |
| 2008/0107594 A1 | 5/2008 | Cao et al. | 423/706 |
| 2012/0202006 A1 | 8/2012 | Rimer | 428/131 |

FOREIGN PATENT DOCUMENTS

| | | | | |
|---|---|---|---|---|
| WO | WO2017/095705 | | 6/2017 | C01B 39/48 |

OTHER PUBLICATIONS

Millipore Signma "1-Benzylimidazole". 2024. (Year: 2024).*
Boal, B. Schmidt, Davis et al. (2015) "Facile Synthesis and Catalysis of Pure-Silica and Heteroatom LTA," *Chem. Mater.*, v.27(22), pp. 7774-7779.
Boal, B. W. et al. (2016) "Synthesis of Germanosilicate Molecular Sieves from Mono- and Di-Quaternary Ammonium OSDAs Constructed from Benzyl Imidazolium Derivatives: Stabilization of Large Micropore Volumes Including New Molecular Sieve CIT-13," *Chemistry of Materials*, v. 28(7), pp. 2158-2164.
Camblor, M. A. et al. (1997) "Synthesis and Structure of ITQ-3, the First Pure Silica Polymorph with a Two-Dimensional System of Straight Eight-Ring Channels," *Angew. Chem. Int. Ed.*, v.36(23), pp. 2659-2661.
Corma, A. et al. (2004) Supramolecular Self-Assembled Molecules as Organic Directing Agent for Synthesis of Zeolites, *Nature*, v.431, pp. 287-290.
Dorset, D. et al. (2006) "P-Derived Organic Cations as Structure-Directing Agents: Synthesis of a High-Silica Zeolite (ITQ-27) with a Two-Dimensional 12-Ring Channel System," *J. Am. Chem. Soc.*, v128(27), pp. 8862-8867.
Gao, Z. et al. (2016) "A Stable Extra-Large-Pore Zeolite with Intersecting 14- and 10-Membered-Ring Channels," *Chem. Eur. J.*, v.22(40), pp. 14367-14372.
Hong, S., Jo, Donghui et al. (2016) "Synthesis of High-Silica LTA and UFI Zeolites and NH3-SCR Performance of Their Copper-Exchanged Form," *ACS Catal.*, 2016, V.6(4), pp. 2443-2447.
Hua, W. et al. (2014) "A Germanosilicate Structure with 11x11x12-Ring Channels Solved by Electron Crystallography," *Angew. Chem. Int. Ed.*, v.53(23), pp. 5868-5871.

(Continued)

*Primary Examiner* — Sheng H Davis
(74) *Attorney, Agent, or Firm* — Shook, Hardy & Bacon L.L.P.

(57) ABSTRACT

A method of making a molecular sieve may include: reacting a source selected from the group consisting of: a source of a tetrahedral element in the presence of a structure directing agent (SDA) selected from the group consisting of: $Ar^+$-L-Ar, $Ar^+$-L-Ar-L-$Ar^+$, $Ar^+$-L-Ar-L-$NR_3^+$, and $ArAr^+$-L-$Ar^+$Ar, where $Ar^+$ is to a N-containing cationic aromatic ring, Ar is to a non-charged aromatic ring, L is a methylene chain of 3-6 carbon atoms, $NR_3^+$ is to a quaternary ammonium, and $ArAr^+$ and $Ar^+Ar$ are a fused aromatic ring structure comprising both a N-containing cationic portion and a non-charged portion, to produce the molecular sieve.

13 Claims, 18 Drawing Sheets

(56) References Cited

OTHER PUBLICATIONS

Kang, J. et al. (2016) "Synthesis and Characterization of CIT-13, a Germanosilicate Molecular Sieve with Extra-Large Pore Openings," *Chem. Mater.*, v.28(17), pp. 6250-6259.

Lee, G. S. et al. (2002) "Polymethylated [4.1.1] Octanes Leading to Zeolite SSZ-50," *J. Solid State Chem.*, v.167(2), pp. 289-298.

Lee, J. K. et al. (2011) "Ionic Liquid co-lyophilized Enzyme for Biocatalysis in Organic Solvent: Remarkably Enhanced Activity and Enantioselectivity," *Jrnl. Molecular Catalysis B: Enzymatic*, v.68(3-4), pp. 275-278.

Patinec, V. et al. (1999) "Synthesis of a Novel Microporous Magnesioaluminophosphate, STA-6, Containing an Unbound Azamacrocycle," *J. Chem. Soc., Dalton Trans.*, pp. 3909-3911.

Richter, I. et al. (2008) "Intramolecularcation-x Interactions Control the Conformation of Nonrestricted (phenylalkyl)pyridines," *Chem. Commun.*, 2008, pp. 1082-1084.

Simancas, R. et al. (2014) "A New Microporous Zeolitic Silicoborate (ITQ-52) with Interconnected Small and Medium Pores," *J. Am. Chem. Soc.*, v.136, pp. 3342-3345.

Smeets, S. et al. (2015) "SSZ-87: A Borosilicate Zeolite with Unusually Flexible 10-Ring Pore Openings," *J. Am. Chem. Soc.*, v.137(5), pp. 2015-2020.

Valtchev, V. et al. (2000) "Synthesis and Characterization of Mu-14: an Aluminosilicate Zeolite with ITE-Type Topology," *Microporous Mesoporous Mat.*, v.38(2-3), pp. 177-185.

Vortmann, S. et al. (1995) "Synthesis and Crystal Structure of the New Borosilicate Zeolite RUB-13," *Microporous Materials*, v.4(2-3), pp. 111-121.

Wagner, P. et al. (2000) "Guest/Host Relationships in the Synthesis of the Novel Cage-Based Zeolites SSZ-35, SSZ-36, and SSZ-39," *J. Am. Chem. Soc.*, v.122(2), pp. 263-273.

Weston, S. C. et al. (2019) "EMM-17, a New Three-Dimensional Zeolite with Unique 11-Ring Channels and Superior Catalytic Isomerization Performance," *Jrnl. Amer. Chem. Soc.*, v.141(40), pp. 15910-15920.

\* cited by examiner

INTRAMOLECULAR PI-STACKING STRUCTURE DIRECTING AGENTS AND MOLECULAR SIEVES SYNTHESIZED THEREFROM

CROSS REFERENCE TO RELATED APPLICATIONS

This application is a national stage filing of Patent Cooperation Treaty Application No. PCT/US2020/042989 filed Jul. 22, 2020 claiming priority to U.S. Provisional Application No. 62/929,524 filed Nov. 1, 2019.

FIELD OF THE INVENTION

The present disclosure relates to structure directing agents that are capable of assuming a bulky conformation as a result of intramolecular pi-stacking. The present disclosure also relates to molecular sieves produced from such structure directing agents and characterized by a large cage, large cavities, and/or large pores.

BACKGROUND OF THE INVENTION

Molecular sieves have a wide range of industrial applications including catalysis, ion exchange, gas adsorption, and molecular separation. Many of the properties and resultant applications of molecular sieves are derived from the size and shape of the pore structure. There is a need for all-silica, aluminosilicate, or borosilicate molecular sieves that possess large cage, large cavities, or large pores. Such molecular sieves are often made by using bulky quaternary ammonium or phosphonium molecules as structure directing agents (SDAs).

For example, Compound A (where $R_1$ is preferably H, $R_2$ and $R_3$ are preferable $CH_3$, and $R_4$ is preferably $CH_3CH_2$) was used by Lee and Zones to prepare SSZ-50, which is an aluminosilicate with the RTH topology (Lee, G. S. and Zones, S. I., Polymethylated [4.1.1] octanes leading to molecular sieve SSZ-50, *J. Solid State Chem.*, 167, 289-298 (2002)).

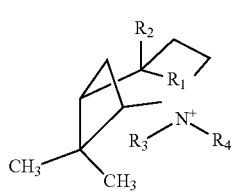

Compound A

The RTH framework possesses large cages with two perpendicular 8-ring channels that intersect at a large cavity. The bulkiness of the molecule provides a good fit within the large cages of the framework. The RTH-type molecular sieves can also be made as borosilicates with a number of SDAs (Wagner, P., Nakagawa, Y., Lee, G. S., Davis, M. E., Elomari, S., Medrud, R. C. and Zones, S. I. *J. Am. Chem. Soc.*, 122, 263-273 (2000) and Vortmann, S., Marler, B., Gies, H. and Daniels, P. *Microporous Materials*, 4, 111-121 (1995)). However, to this point, Compound A has been the only quaternary ammonium molecule that leads to the RTH framework structure in the aluminosilicate form.

Compound A requires a 7-8 step synthesis that uses lithium aluminum hydride reductions. The expense and danger of preparing Compound A makes it difficult to prepare, especially on the large scales necessary for commercial implementation of the aluminosilicate form of the aforementioned RTH topology molecular sieve.

There is a related molecular sieve structure, ITQ-3 (ITE, Camblor, M. A., Corma, A., Lightfoot, P., Villaescusa, L. A. and Wright, P. A. *Angew. Chem. Int. Ed.*, 36, 2659-2661 (1997)), that possesses the same layers present in RTH structure except the layers are related by mirror plane symmetry rather than by an inversion center. The cages of RTH and ITE are similar in size but different in shape. ITQ-3 was reported to be made in fluoride media both in all-silica and aluminosilicate form using an amine precursor that is not readily available. Reportedly, the same SDA molecule used to produce the ITE structure could be used to prepare a SSZ-36 structure as an aluminosilicate in hydroxide medium (*J. Am. Chem. Soc.*, 122, 263-273 (2000)). Workers at Mulhouse reported another aluminosilicate ITE-type molecular sieve using Compound B as the SDA (Valtchev, V., Paillaud, J. L., Lefebvre, T., LeNouen, D. and Kessler, H. *Microporous Mesoporous Mat.*, 38, 177-185 (2000)). Again, this is a polycyclic molecule whose preparation requires a multi-step procedure.

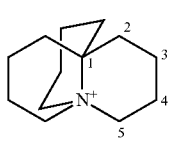

Compound B

Another cage-based molecular sieve with a large pore structure are ITQ-52 (IFW, Simancas, R., Jorda, J. L., Rey, F., Corma, A., Cantin, A., Peral, I. and Popescu, C. *J. Am. Chem. Soc.*, 136, 3342-3345 (2014)) and the isostructural SSZ-87 (Smeets, S., McCusker, L. B., Baerlocher, Ch., Xie, D., Chen, C.-Y. and Zones, S. I. J. Am. Chem. Soc., 137, 2015-2020 (2015)). ITQ-52 is prepared with Compound C, which is derived from an aminophosphine intermediate. Isostructural SSZ-87 is prepared with Compound D, which is prepared through a multi-step sequence that requires a lithium aluminum hydride reduction.

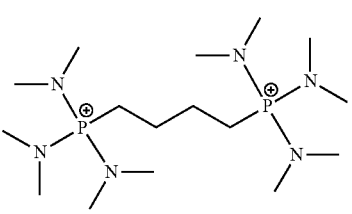

Compound C

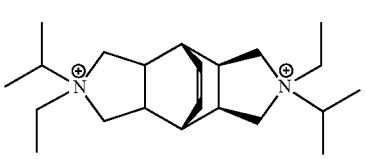

Compound D

Compounds A-D are all relatively bulky and useful in making molecular sieves that possess large cage, large cavities, or large pores. However, these molecules are difficult to prepare or require expensive intermediates.

Other syntheses using SDAs that are difficult to prepare or require expensive intermediates are described in the literature, for example, ITQ-29: Supramolecular self-assembled molecules as organic directing agent for synthesis of zeolites, Nature, 431, 287-290 (2004); ITQ-27: P-derived organic cations as structure-directing agents: synthesis of a high-silica zeolite (ITQ-27) with a two-dimensional 12-ring channel system, J. Am. Chem. Soc., 128, 8862-8867 (2006); CIT-13 and NUD-2: Synthesis and characterization of CIT-13, a germanosilicate molecular sieve with extra-large pore openings, Chem. Mater., 28, 6250-6259 (2016) and A stable extra-large-pore zeolite with intersecting 14- and 10-membered-ring channels, Chem. Eur. J., 22, 14367-14372 (2016); and STA-6: Synthesis of a novel microporous magnesioaluminophosphate, STA-6, containing an unbound azamacrocycle, J. Chem. Soc., Dalton Trans., 3909-3911 (1999).

SUMMARY OF THE INVENTION

The present disclosure relates to structure directing agents that are capable of assuming a bulky conformation as a result of intramolecular pi-stacking. The present disclosure also relates to molecular sieves produced from such structure directing agents and characterized by a large cage, large cavities, and/or large or extra-large pores (12-rings and 14 or more rings, respectively).

A method of the present disclosure may comprise: reacting a source selected from the group consisting of: a source of a tetrahedral element in the presence of a structure directing agent (SDA) selected from the group consisting of: $Ar^+$-L-Ar, $Ar^+$-L-Ar-L-$Ar^+$, and $Ar^+$-L-Ar-L-$NR3^+$, where $Ar^+$ is to a N-containing cationic aromatic ring, Ar is to a non-charged aromatic ring, L is a methylene chain of 3-6 carbon atoms, and $NR3^+$ is to a quaternary ammonium, to produce a molecular sieve.

A method of the present disclosure may comprise: reacting a source selected from the group consisting of: a source of a tetrahedral element in the presence of a structure directing agent (SDA) of ArAr$^+$-L-Ar$^+$Ar, where L is a methylene chain of 3-6 carbon atoms, and ArAr$^+$ and Ar$^+$Ar are a fused aromatic ring structure comprising both a N-containing cationic portion and a non-charged portion, to produce a molecular sieve.

A composition of the present disclosure may comprise: an aluminosilicate molecular sieve or an aluminoborosilicate molecular sieve having a RHO framework having a Si to Al ratio greater than or equal to about 8.

A composition of the present disclosure may comprise: a borosilicate molecular sieve having a RHO framework. Said borosilicate molecular sieve may have a Si to B ratio of about 1 to about 25 (or about 8 to about 25)

A composition of the present disclosure may comprise: a silica sieve having a IFW framework.

A composition of the present disclosure may comprise: an aluminosilicate molecular sieve having a IFW framework.

A composition of the present disclosure may comprise: a silica molecular sieve, an aluminosilicate molecular sieve, a borosilicate molecular sieve, an aluminoborosilicate molecular sieve, or a germanosilicate molecular sieve having a ITH/RTH intergrowth framework.

A composition of the present disclosure may comprise: a silica molecular sieve or a borosilicate molecular sieve having a *CTH framework, which may be absent Ge.

A composition of the present disclosure may comprise: a silicoaluminophosphate molecular sieve having a SAS framework.

BRIEF DESCRIPTION OF FIGURES

FIG. 17B is a zoomed portion of FIG. 17A.

DETAILED DESCRIPTION

Figure 1:
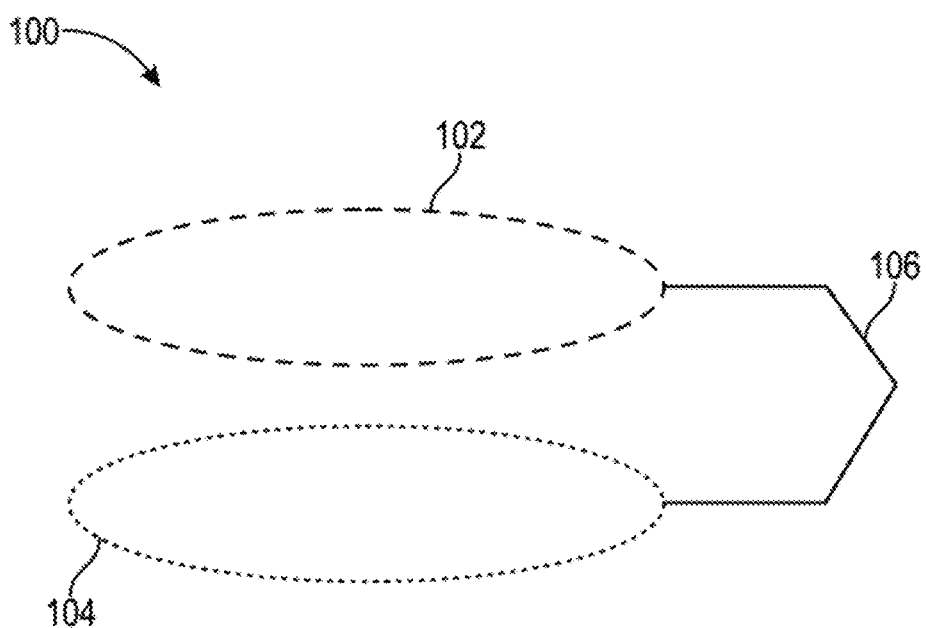
FIG. 1 illustrates a diagram of a nonlimiting example of a proposed pi-stacking conformational structure.
Figure 2:
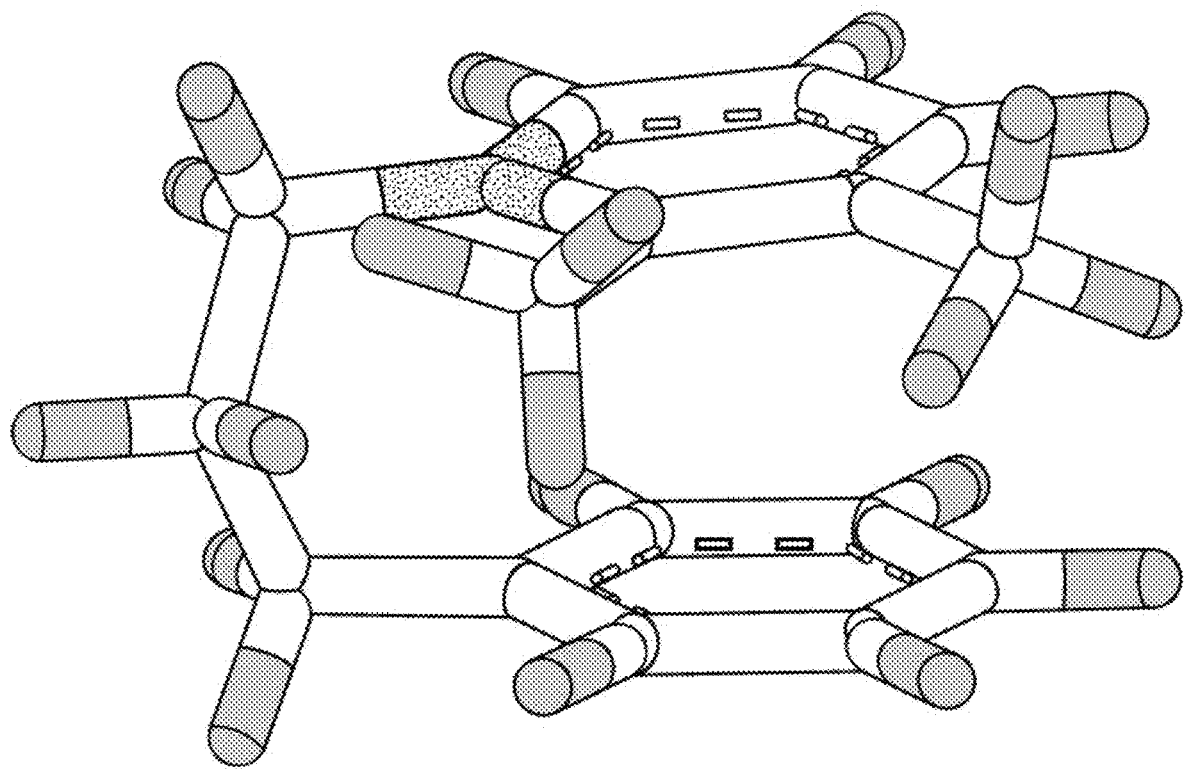
FIG. 2 is a molecular model of Compound E below ($R_1$ and $R_2$ are methyl, $R_3$-$R_{10}$ are H).

The present disclosure relates to molecular sieve syntheses with organic structure directing agents (SDAs) that are capable of intramolecular pi-stacking. The intramolecular stacking is generally achieved by a N-containing cationic aromatic portion of the molecule being separated from a non-charged aromatic portion of the molecule by an alkyl linker. Without being limited by theory, it is believed that the alkyl linker assumes a conformation where the N-containing cationic aromatic portion and non-charged aromatic portion of the SDA sandwich pi stack. FIG. 1 illustrates a diagram of a nonlimiting example of a proposed pi-stacking conformational structure 100 where circles 102 and 104 extending into and out of the plane of the paper are used to visually represent the N-containing cationic aromatic portion of the SDA and the non-charged aromatic portion of the SDA, respectively. Lines 106 represent the linker. The linker may reside completely within the plane of the paper or both in and out of the plane of the paper depending on the length of the linker and the overlap of the N-containing cationic aromatic and non-charged aromatic portions of the SDA. Because the SDA extends into and out of the plane of the paper, the pi-stacking conformational structure 100 has a significant 3-dimensional size that provides the SDA with significant bulk, especially if the N-containing cationic aromatic and/or non-charged aromatic portions of the SDA have functional groups (e.g., alkyls) extending therefrom. More specifically, FIG. 2 is a molecular model of Compound E below ($R_1$ and $R_2$ are methyl, $R_3$-$R_{10}$ are H) where stippled element is nitrogen, white elements are carbon, and grey elements are grey.

As illustrated herein, SDAs with such a pi-stacking conformation capability may be useful in synthesizing molecular sieves that have a large cage, large cavities, and/or large or extra-large pores. The pi-stacking conformation is indirectly inferred by the observed dimensions of the cage, cavity, or pores within which the SDA molecule is occluded. The pi-stacking conformations have been independently observed and described in "Intramolecular cation-p interactions control the conformation of nonrestricted (phenylalkyl)pyridines", Chem. Commun., 2008, 1082-1084. If linear conformers were predominant for these molecules instead of the intramolecularly stacked conformers, then ZSM-12 (MTW) or other 1-dimensional frameworks would be anticipated as common products. Such 1-dimensional frameworks were very rarely observed in the syntheses described herein.

Further, the SDAs described herein can be use in forming different molecular sieve frameworks. As illustrated in the examples, the framework produced is influenced by where the additional bulkiness is added to the SDA via derivatives on the N-containing cationic aromatic ring. For example, Example 12 and Example 13 are each performed with different SDA embodiments of Compound E. The SDA of Example 13 has an additional methyl group as compared to the Example 12 SDA. Example 12 produces primarily RTH frameworks while Example 13 produces primarily ITE frameworks within similar ranges of inorganic conditions. Said frameworks are very similar in structure, but the RTH framework has an inversion center symmetry while ITE framework has a mirror plane symmetry.

Organic Structure Directing Agents Capable of Intramolecular Pi-Stacking

The SDAs described herein capable of intramolecular pi-stacking have one of four general structures: (a) $Ar^+$-L-Ar, (b) $Ar^+$-L-Ar-L-$Ar^+$, (c) $Ar^+$-L-Ar-L-$NR_3^+$, and (d) $ArAr^+$-L-$Ar^+$Ar, where $Ar^+$ refers to a N-containing cationic aromatic ring, Ar refers to a non-charged aromatic ring, L refers to a linker, $NR_3^+$ refers to a quaternary ammonium, and $ArAr^+$ and $Ar^+$Ar refer to a fused aromatic ring structure comprising both a N-containing cationic portion and a non-charged portion where the - connecting to L indicates which portion of the fused aromatic ring structure to which the L is bound.

Without being limited by theory, it is believed that, the Ar (or $ArAr^+$) pi stacks with the $Ar^+$ (or $Ar^+$Ar). Further, the $NR_3^+$ of the $Ar^+$-L-Ar-L-$NR_3^+$ class of SDAs may or may not interact with the Ar. Whether the $NR_3^+$ interacts to a significant degree or not with the Ar, the $NR_3^+$ portion provides additional bulk to this class of SDAs.

Examples of non-charged aromatic rings include, but are not limited to, phenyl, a substituted phenyl, naphthyl, a substituted naphthyl, and the like. The foregoing substituted non-charged aromatic rings include moieties where at one or more C of the non-charged aromatic ring are independently substituted with a $C_1$-$C_6$ alkyl (branched or linear) or a $C_5$-$C_6$ cycloalkyl. Additionally, non-charged N-containing aromatic rings may be used, but the nitrogen should be protected during one or more steps of the synthesis so that it is not alkylated and in the form of a cation in the final SDA.

Examples of the N-containing cationic aromatic rings include, but are not limited to, pyridinium, a substituted pyridinium, imidazolium, a substituted imidazolium, pyrazolium, a substituted pyrazolium, pyrazinium, a substituted pyrazinium, pyrimidinium, a substituted pyrimidinium, and the like. The foregoing substituted N-containing cationic aromatic rings include moieties where at one or more C of the N-containing cationic aromatic ring are independently substituted with a $C_1$-$C_6$ alkyl (branched or linear) or a $C_5$-$C_6$ cycloalkyl.

The N-containing cationic aromatic portion of the SDA may be counterbalanced by $OH^-$, $F^-$, $Cl^-$, $Br^-$, or $I^-$.

Examples of the fused aromatic ring structure with a N-containing cationic portion and a non-charged portion include, but are not limited to, benzimidazolium, a substituted benzimidazolium where one or more C of the benzimidazolium are independently substituted with a $C_1$-$C_6$ alkyl (branched or linear) or a $C_5$-$C_6$ cycloalkyl, and the like. The cationic portion of the aromatic ring structure may be counterbalanced by $OH^-$, $F^-$, $Cl^-$, $Br^-$, or $I^-$.

Examples of linkers include, but are not limited to, methylene chains of 3-6 carbon atoms in length.

Compounds E-W are nonlimiting examples of SDAs described herein.

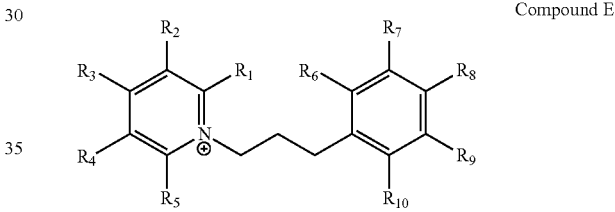

Compound E where $R_1$-$R_{10}$ are independently H, $C_1$-$C_6$ alkyl (branched or linear), or $C_5$-$C_6$ cycloalkyl (preferably, $R_1$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$

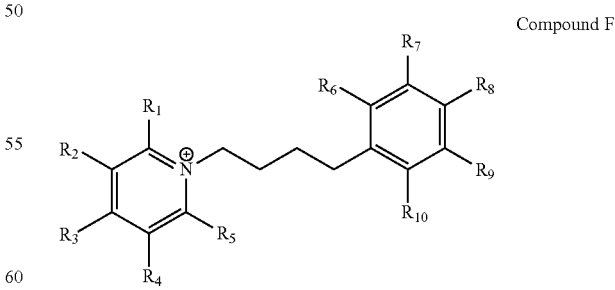

Compound F where $R_1$-$R_{10}$ are independently H, $C_1$-$C_6$ alkyl (branched or linear), or $C_5$-$C_6$ cycloalkyl (preferably, $R_1$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound G

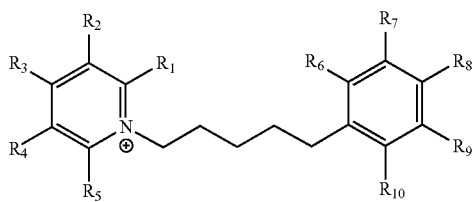

where $R_1$-$R_{10}$ are independently H, $C_1$-$C_6$ alkyl (branched or linear), or $C_5$-$C_6$ cycloalkyl (preferably, $R_1$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound H

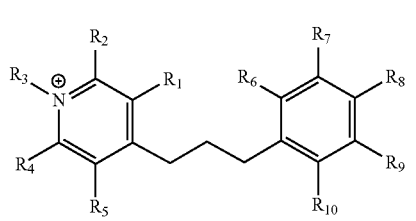

where $R_1$-$R_{10}$ are independently H, $C_1$-$C_6$ alkyl (branched or linear), or $C_5$-$C_6$ cycloalkyl (preferably, $R_1$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound I

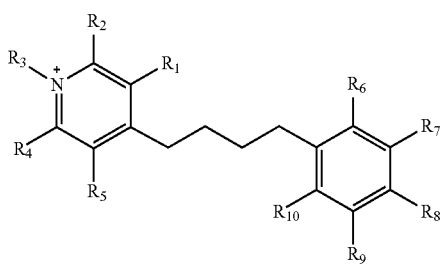

where $R_1$-$R_{10}$ are independently H, $C_1$-$C_6$ alkyl (branched or linear), or $C_5$-$C_6$ cycloalkyl (preferably, $R_1$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound J

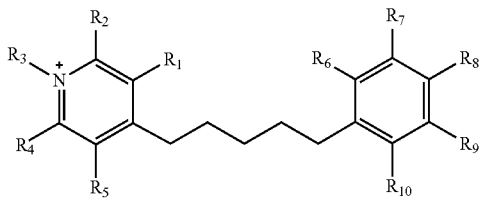

where $R_1$-$R_{10}$ are independently H, $C_1$-$C_6$ alkyl (branched or linear), or $C_5$-$C_6$ cycloalkyl (preferably, $R_1$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound K

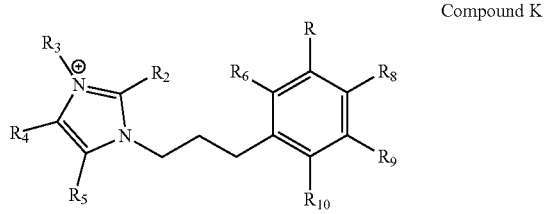

where $R_2$-$R_{10}$ are independently H, $C_1$-$C_6$ alkyl (branched or linear), or $C_5$-$C_6$ cycloalkyl (preferably, $R_2$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound L

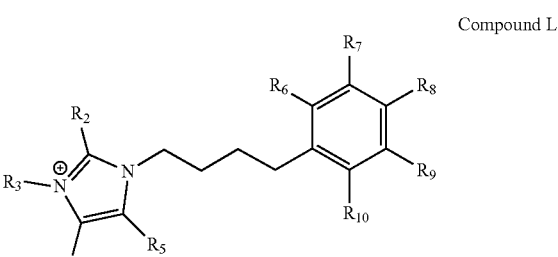

where $R_2$-$R_{10}$ are independently H, $C_1$-$C_6$ alkyl (branched or linear), or $C_5$-$C_6$ cycloalkyl (preferably, $R_2$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound M

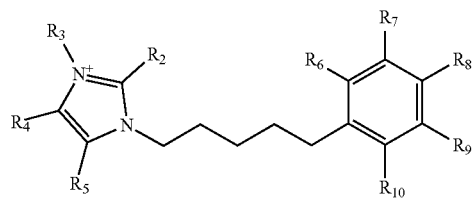

where $R_2$-$R_{10}$ are independently H, $C_1$-$C_6$ alkyl (branched or linear), or $C_5$-$C_6$ cycloalkyl (preferably, $R_2$-$R_5$ are independently H, $C_1$-$C_6$ alkyl (branched or linear), or $C_5$-$C_6$ cycloalkyl and $R_6$-$R_{10}$ are each H); and wherein $N^+$ is counterbalanced by $OH^-$, $F^-$, $Cl^-$, $Br^-$, or $I^-$ Compound N

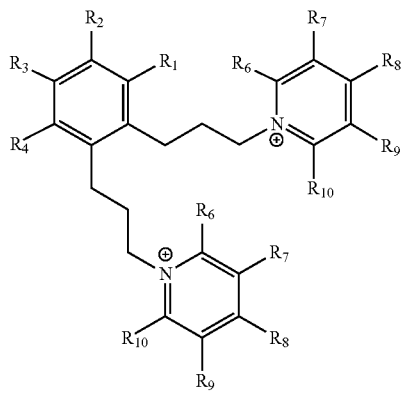

where $R_1$-$R_4$ are independently H, $C_1$-$C_6$ alkyl (branched or linear), or $C_5$-$C_6$ cycloalkyl and $R_6$-$R_{10}$ are independently H, $C_1$-$C_6$ alkyl (branched or linear), or $C_5$-$C_6$ cycloalkyl (preferably, $R_1$-$R_4$ are each H and $R_6$-$R_{10}$ are independently H, $C_1$-$C_6$ alkyl (branched or linear), or $C_5$-$C_6$ cycloalkyl); and wherein $N^+$ is counterbalanced by $OH^-$, $F^-$, $Cl^-$, $Br^-$, or $I^-$ Compound Q

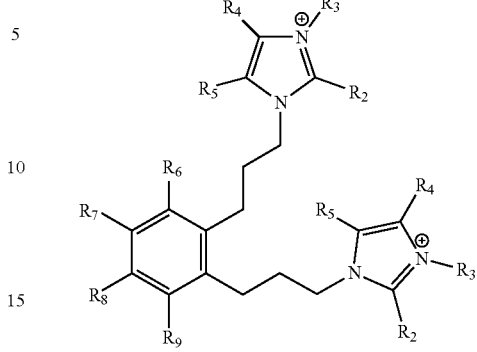

where $R_2$-$R_9$ are independently H, $C_1$-$C_6$ alkyl (branched or linear), or $C_5$-$C_6$ cycloalkyl (preferably, $R_2$-$R_5$ are independently H, $C_1$-$C_6$ alkyl (branched or linear), or $C_5$-$C_6$ cycloalkyl and $R_6$-$R_9$ are each H); and wherein $N^+$ is counterbalanced by $OH^-$, $F^-$, $Cl^-$, $Br^-$, or $I^-$ Compound O

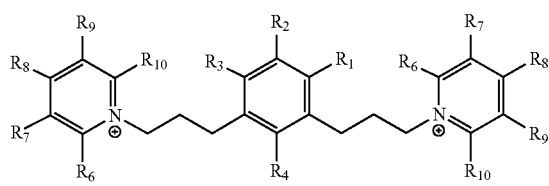

where $R_1$-$R_4$ are independently H, $C_1$-$C_6$ alkyl (branched or linear), or $C_5$-$C_6$ cycloalkyl and $R_6$-$R_{10}$ are independently H, $C_1$-$C_6$ alkyl (branched or linear), or $C_5$-$C_6$ cycloalkyl (preferably, $R_1$-$R_4$ are each H and $R_6$-$R_{10}$ are independently H, $C_1$-$C_6$ alkyl (branched or linear), or $C_5$-$C_6$ cycloalkyl); and wherein $N^+$ is counterbalanced by $OH^-$, $F^-$, $Cl^-$, $Br^-$, or $I^-$ Compound R

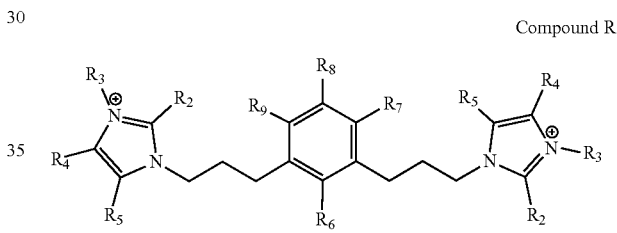

where $R_2$-$R_9$ are independently H, $C_1$-$C_6$ alkyl (branched or linear), or $C_5$-$C_6$ cycloalkyl (preferably, $R_2$-$R_5$ are independently H, $C_1$-$C_6$ alkyl (branched or linear), or $C_5$-$C_6$ cycloalkyl and $R_6$-$R_9$ are each H); and wherein $N^+$ is counterbalanced by $OH^-$, $F^-$, $Cl^-$, $Br^-$, or $I^-$ Compound P

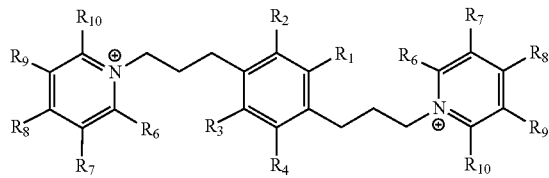

where $R_1$-$R_4$ are independently H, $C_1$-$C_6$ alkyl (branched or linear), or $C_5$-$C_6$ cycloalkyl and $R_6$-$R_{10}$ are independently H, $C_1$-$C_6$ alkyl (branched or linear), or $C_5$-$C_6$ cycloalkyl (preferably, $R_1$-$R_4$ are each H and $R_6$-$R_{10}$ are independently H, $C_1$-$C_6$ alkyl (branched or linear), or $C_5$-$C_6$ cycloalkyl); and wherein $N^+$ is counterbalanced by $OH^-$, $F^-$, $Cl^-$, $Br^-$, or $I^-$ Compound S

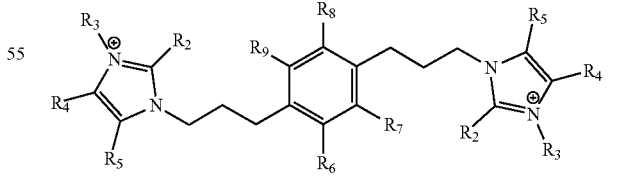

where $R_2$-$R_9$ are independently H, $C_1$-$C_6$ alkyl (branched or linear), or $C_5$-$C_6$ cycloalkyl (preferably, $R_2$-$R_5$ are independently H, $C_1$-$C_6$ alkyl (branched or linear), or $C_5$-$C_6$ cycloalkyl and $R_6$-$R_9$ are each H); and wherein $N^+$ is counterbalanced by $OH^-$, $F^-$, $Cl^-$, $Br^-$, or $I^-$ Compound T

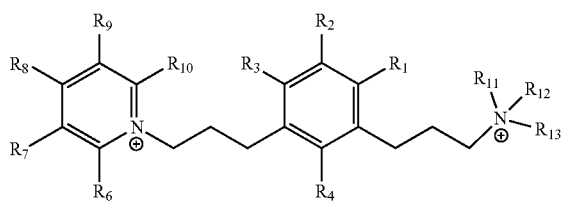

where $R_1$-$R_4$ are independently H, $C_1$-$C_6$ alkyl (branched or linear), or $C_5$-$C_6$ cycloalkyl and $R_6$-$R_{13}$ are independently H, $C_1$-$C_6$ alkyl (branched or linear), or $C_5$-$C_6$ cycloalkyl (preferably, $R_1$-$R_4$ are each H; $R_6$-$R_{10}$ are independently H, $C_1$-$C_6$ alkyl (branched or linear), or $C_5$-$C_6$ cycloalkyl, and $R_{11}$-$R_{13}$ are each $CH_3$); and wherein $N^+$ is counterbalanced by $OH^-$, $F^-$, $Cl^-$, $Br^-$, or $I^-$ Compound U

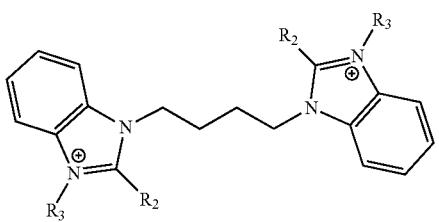

where $R_2$-$R_3$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$ Compound V

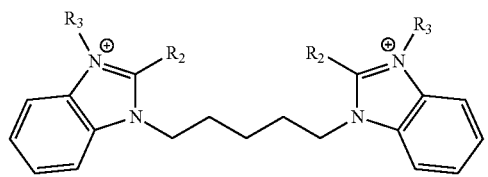

where $R_2$-$R_3$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$ Compound W

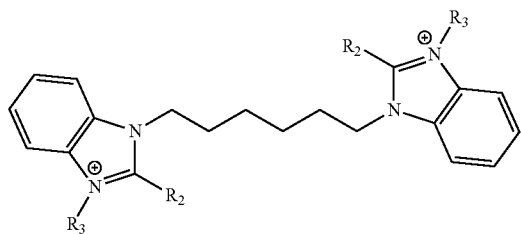

where $R_2$-$R_3$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$ Advantageously, the SDAs described herein have a straightforward synthesis with very few steps (one step in some instances). Generally, the pyridine, imidazole, pyrazole, or pyrazine precursor is reacted with the 1-halo-(3-6)-phenylalkane or a derivative thereof (where the halo is preferably bromo, the 3-6 represents the $C_3$ to $C_6$ linker, and the phenyl group may be derivatized). Further, the reaction conditions are mild and do not require additional expensive or dangerous chemicals.

The Synthesis of Molecular Sieves

The present disclosure also provides a process for producing a molecular sieve, the process comprising the steps of: i) preparing a synthesis mixture capable of forming a molecular sieve, said synthesis mixture comprising a source of one or more tetrahedral elements, optionally a source of hydroxide ions, optionally a source of halide ions, and optionally a source of alkali/alkaline earth metal ions, the synthesis mixture further comprising a SDA described herein capable intramolecular pi-stacking; ii) heating said synthesis mixture under crystallization conditions for a sufficient time (e.g., about 2 hours to about 100 days) to form crystals of said molecular sieve; and iii) recovering said crystals of the molecular sieve from the synthesis mixture. As used herein, a "tetrahedral element" refers to an element that is capable of forming a tetrahedral conformation in a molecular sieve and does not imply any conformation or valency restrictions of the source of said element.

The tetrahedral elements include, but are not limited to, Li, Be, Al, B, P, Si, Ga, Ge, Zn, Cr, Mg, Fe, Co, Ni, Mn, As, In, Sn, Sb, Ti, Zr, and any combination thereof. Preferably the tetrahedral elements include one or more elements selected from the group consisting of Si, Al, B, P, Ge, Sn, Ti, and Zr. More preferably, the tetrahedral atoms are Si, Ge, and any combination thereof.

Suitable sources of tetrahedral element Y depend on the element Y that is selected. Examples of silicon sources include, but are not limited to, a colloidal suspensions of silica, a precipitated silica alkali metal silicate, tetraalkyl orthosilicate, aluminosilicate pozzolan (e.g., metakaolin and fly ash), other siliceous zeolites, and any combination thereof. Examples of germanium sources include, but are not limited to, germanium oxide, germanium alkoxides, germanium-containing zeolites, and any combination thereof. Examples of aluminum sources include, but are not limited to, aluminum nitrate, aluminum sulfate, aluminum hydroxide, sodium aluminate, aluminum oxide, alumina sol, aluminosilicate pozzolan, alumina trihydrate, aluminum alkoxide (e.g., aluminum isopropyloxide), an aluminum metal, and any combination thereof. Examples of boron sources include, but are not limited to, boric acid, a water-soluble boric acid salt, and any combination thereof. Examples of phosphorus sources include, but are not limited to, phosphoric acid, organic phosphates (e.g., triethyl phosphate and tetraethyl-ammonium phosphate), aluminophosphates, and any combination thereof.

Optionally, the synthesis mixture also contains a source of halide ions, which may be selected from the group consisting of chloride, bromide, or fluoride. The source of halide ions may be any compound capable of releasing halide ions in the molecular sieve synthesis mixture. The halide may also originate from the quaternary ammonium if said quaternary ammonium is used in its unexchanged form. Examples of sources of halide ions include, but are not limited to, salts containing one or several metal halides (e.g., where the metal is sodium, potassium, calcium, magnesium, strontium, or barium), ammonium fluoride, or tetraalkylammonium fluorides. If the halide ion is fluoride, a convenient source of halide is HF or ammonium fluoride.

Optionally, the synthesis mixture also contains a source of alkali/alkaline earth metal. If present, the alkali/alkaline earth metal is preferably selected from the group consisting of sodium, potassium, and mixtures of sodium and potassium. The sodium source may be sodium hydroxide or sodium aluminate.

The molecular sieves described herein may include, but are not limited to, silica molecular sieves, aluminosilicate molecular sieves, borosilicate molecular sieves, aluminoborosilicate molecular sieves, or germanosilicate molecular sieves, aluminophosphate molecular sieves, silicoaluminophosphate molecular sieves, or metalloaluminophosphate molecular sieves.

Syntheses of the molecular sieves described herein generally include reacting sources for the prescribed molecular sieve composition in the presence of an SDA and water to form the prescribed molecular sieve composition. Reacting is generally at an elevated temperature (e.g., about 75° C. to about 200° C.) for a suitable length of time (e.g., about 2 hours to about 20 days) to allow for the molecular sieve crystals to form.

The molar ratio of the tetrahedral element to SDA in the reaction mixture can range from about 0.1 to about 30, about 0.5 to about 15, or about 1 to about 10, or about 1 to about 5.

When two or more tetrahedral elements are present, the relative concentrations of the various components (on molar ratio for an atomic component to atomic component, e.g., molar ratio of atomic Si to atomic Al or a molar ratio of atomic Al to atomic B) in the reaction mixture may be any suitable number based on a desired amount of each in a final molecular sieve. Without limitation, the molar ratio of a first atomic component (present at an equal or higher concentration than the second atomic component) to second atomic component in the reaction mixture can range from about 1 to about 1000, or about 1 to about 100, or about 1 to about 5, or about 4 to about 30, or about 4 to about 20, or about 30 to about 60, or about 50 to 100, or about 75 to 200, or about 100 to about 1000.

The molar ratio of water to the tetrahedral element (or combined tetrahedral elements when more than one tetrahedral element is used) in the reaction mixture can range from about 2 to about 80, or about 5 to about 30, or about 10 to about 30, or about 25 to about 50, or about 30 to about 60.

In some instances, the reaction mixture may be seeded with small amount of molecular sieve. The molecular sieve continues to grow from the seeds under reaction conditions. Therefore, the seeds often, but not necessarily, have the desired topographical framework (e.g., a RHO framework, a LTA framework, ITE framework, a RTH framework, an ITE/RTH intergrowth framework, an IWV framework, an IFW framework, a *CTH framework, a SAS framework, a POS framework, or a MWW framework) and compositions (e.g., a silica molecular sieve, an aluminosilicate molecular sieve, a borosilicate molecular sieve, an aluminoborosilicate molecular sieve, a germanosilicate molecular sieve, an aluminophosphate molecular sieve, or a silicoaluminophosphate molecular sieve). The amount of seeds in the reaction mixture can be about 0.01 ppm by weight to about 10,000 ppm by weight, or from about 100 ppm by weight to about 5,000 ppm by weight of the reaction mixture.

The molecular sieve syntheses can be conducted at a temperature of at least about 75° C., or about 75° C. to about 200° C., or about 100° C. to about 185° C., or about 135° C. to about 175° C.

The molecular sieve syntheses can be conducted for a time of at least about 2 hours, or about 34 hours to about 20 days, or about 72 hours to about 15 days, or about 4 days to about 10 days.

Generally, the time and temperature of the reaction are interrelated. Typically, lower temperatures require longer reaction times. Further, if seeds are included, then the reaction time, even at lower reaction temperatures, may be reduced.

The methods described herein may further include calcining the molecular sieves at temperatures of about at about 500° C. to about 900° C., or 550° C. to about 850° C., or 600° C. to about 800° C.

Depending on the SDA, the reaction conditions, and the reactants, the molecular sieves formed by the methods described herein may have a variety of frameworks with a large cage, large cavities, and/or large or extra-large pores. Examples of frameworks include, but are not limited to, a RHO framework, a LTA framework, ITE framework, a RTH framework, an ITE/RTH intergrowth framework, an IWV framework, an IFW framework, a *CTH framework, a SAS framework, a POS framework, and a MWW framework. In some instances, particles having a first framework and other particles having a second may be produced in the same reaction mixture. Each of the frameworks is discussed in more detail herein.

Advantageously, these frameworks having a large cage, large cavities, and/or large pores or extra-large pores are obtained with SDAs with a straightforward synthesis that does not utilize expensive reactants and intermediates. Further, as illustrated in the examples, the SDAs described herein can be used to synthesize molecular sieves with a combination of composition and framework not previously achieved. For example, a RHO framework having a borosilicate or aluminoborosilicate composition with a high silicon content can be achieved.

After a molecular sieve is produced, optionally, at least a portion of the boron, aluminum, and/or germanium (when present) can be released or removed from the structure. This can be achieved, in some instances, by treating said molecular sieve with an acid and/or boiling in hot water. While the highly-siliceous molecular sieves can be synthesized directly, such method can be used to increase the silica content of any of the described molecular sieves. In some instances, where the framework has a large cage and/or large cavities but small to medium pores, the amount of aluminum released or removed from the molecular sieve may be reduced as compared to large pore frameworks.

Therefore, even higher silica concentrations can be achieved like a ratio of atomic Si to atomic B (or Al or Ge) of greater than or equal to 11. Because almost all of the B (or Al or Ge) can be removed, a molar ratio of atomic Si to atomic B (or Al or Ge) can be infinitely high. The molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

Examples of acids suitable for treating the molecular sieves include, but are not limited to, sulfuric acid, hydrochloric acid, acetic acid, nitric acid, and any combination thereof.

RHO Framework

A RHO framework is composed of Linde type A (LTA) cages linked to adjacent LTA cages through the 8-rings to create double 8-rings.

The synthesis of highly siliceous RHO-type molecular sieves (e.g., highly siliceous aluminosilicate molecular sieves, highly siliceous borosilicate molecular sieves, and highly siliceous aluminoborosilicate molecular sieves), if ever synthesized, are difficult in the art with known SDAs. For example, highly siliceous aluminosilicate molecular sieves in the art typically have an atomic Si to atomic Al ratio of 3-6. In another example, borosilicate RHO-type molecular sieves do not appear to have been synthesized before. The SDAs of the present disclosure, as illustrated in the Examples, can have such ratios of 8 or greater and even 11 or greater.

Rho molecular sieves described herein may be silica molecular sieves, aluminosilicate molecular sieves, borosilicate molecular sieves, or aluminoborosilicate molecular sieves. Further, Rho molecular sieves described herein may have other compositions corresponding to the sources of tetrahedral elements and/or alkali/alkaline earth metals not in the foregoing compositions.

Rho borosilicate molecular sieves or Rho aluminoborosilicate molecular sieves may have a molar ratio of atomic Si to atomic B of about 1 or greater (including infinitely high when B is released or removed as described above using acid and/or hot water), or about 1 to about 25, or about 1 to about 5, or about 1 to about 8, or about 8 to about 25, or about 5 to about 12, or about 9 to about 16, or about 10 to about 13, or about 11 to about 25, or about 15 to about 25. Rho aluminosilicate molecular sieves or Rho aluminoborosilicate molecular sieves may have a molar ratio of atomic Si to atomic Al of about 1 or greater (including infinitely high when Al is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25.

Rho molecular sieves of the present disclosure having been treated to release or remove B can comprise B at less than 5 wt % of the molecular sieve, or less than 1 wt % of the molecular sieve, or less than 0.1 wt % of the molecular sieve, or less than 0.01 wt % of the molecular sieve.

The as-synthesized and treated (e.g., calcined or acid treated) borosilicate Rho molecular sieve can have characteristic X-ray diffraction (XRD) patterns, the essential (most intense) reflection lines of which may be represented in Table 1 (as synthesized form) and Table 2 (calcined form). Variations can occur as a function of the specific composition and SDA used in synthesis. For this reason, the relative peak area and d-spacings ("d(Å)") are represented as ranges in Tables 1 and 2.

TABLE 1

| d (Å) | Relative Peak Area |
|---|---|
| 10.4-10.2 | 25-35 |
| 6.1-5.9 | 80-100 |
| 5.3-5.1 | 25-35 |
| 4.0-3.8 | 25-35 |
| 3.55-3.35 | 30-40 |
| 3.34-3.24 | 25-35 |
| 2.95-2.8 | 15-25 |
| 2.75-2.6 | 15-25 |

TABLE 2

| d (Å) | Relative Peak Area |
|---|---|
| 10.4-10.2 | 80-100 |
| 7.4-7.2 | 10-20 |
| 6.1-5.9 | 40-60 |
| 4.7-4.4 | 5-15 |
| 3.6-3.4 | 10-20 |
| 3.35-3.2 | 10-20 |

The as-synthesized and treated (e.g., calcined or acid treated) aluminosilicate Rho molecular sieve can have characteristic X-ray diffraction (XRD) patterns, the essential (most intense) reflection lines of which may be represented in Table 3 (as synthesized form) and Table 4 (calcined form). Variations can occur as a function of the specific composition and SDA used in synthesis. For this reason, the relative peak height intensities and d(Å) are represented as ranges in Tables 3 and 4.

TABLE 3

| d (Å) | Relative Peak Height Intensity |
|---|---|
| 10.8-10.5 | 25-35 |
| 6.2-6.0 | 80-100 |
| 5.4-5.2 | 25-35 |
| 4.1-3.9 | 25-35 |
| 3.55-3.45 | 30-40 |
| 3.36-3.32 | 25-35 |
| 3.08-3.00 | 15-25 |
| 2.74-2.70 | 15-25 |

TABLE 4

| d (Å) | Relative Peak Height Intensity |
|---|---|
| 10.6-10.4 | 80-100 |
| 7.3-7.5 | 10-30 |
| 6.15-6.05 | 80-100 |
| 4.8-4.6 | 10-25 |
| 3.6-3.4 | 20-50 |
| 3.37-3.27 | 30-50 |

LTA Framework

A LTA framework is described in the Atlas of Zeolite Framework Types, 6$^{th}$ Edition.

Generally, aluminophosphate and silicoaluminophosphate molecular sieves (especially pure aluminophosphates) with an LTA framework are difficult to synthesize. Further, highly siliceous forms of LTA frameworks with molar ratio of atomic Si to atomic Al greater than 5 are also difficult to prepare. However, the SDAs described herein readily form said compositions with LTA frameworks. Further, the incorporation of elements other than aluminum, silicon, and phosphate in said structures demonstrated in the Examples is unexpected.

Lta molecular sieves described herein may be silica molecular sieves, aluminosilicate molecular sieves, borosilicate molecular sieves, aluminoborosilicate molecular sieves, germanosilicate molecular sieves, aluminophosphate molecular sieves, or silicoaluminophosphate molecular sieves. Further, Lta molecular sieves described herein may have other compositions corresponding to the sources of tetrahedral elements and/or alkali/alkaline earth metals not in the foregoing compositions. For example, magnesium sources and/or nickel source include in the reaction mixture may result in the magnesium and/or nickel incorporating into the LTA framework in place of an aluminum.

Lta borosilicate molecular sieves or Lta aluminoborosilicate molecular sieves may have a molar ratio of atomic Si to atomic B of about 1 or greater (including infinitely high when B is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25. Lta aluminosilicate molecular sieves or Lta aluminoborosilicate molecular sieves may have a molar ratio of atomic Si to atomic Al of about 1 or greater (including infinitely high when Al is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25. Lta silicoaluminophosphate molecular sieves may have a molar ratio of atomic Si to atomic Al of about 0.05 to about 0.4, or about 0.05 to about 0.1, or about 0.1 to about 0.2, or about 0.2 to about 0.3, or about 0.3 to about 0.4. Lta germanosilicate molecular sieves may have a molar ratio of atomic Si to atomic Ge of about 1 or greater (including infinitely high when Ge is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25.

LTA-type molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

ITE Framework

Generally, ITE frameworks (especially ITE frameworks with aluminosilicate compositions) are produced with SDAs that are expensive and/or difficult to prepare.

Ite molecular sieves described herein may be silica molecular sieves, aluminosilicate molecular sieves, borosilicate molecular sieves, aluminoborosilicate molecular sieves, or germanosilicate molecular sieves.

Ite borosilicate molecular sieves or Ite aluminoborosilicate molecular sieves may have a molar ratio of atomic Si to atomic B of about 3 or greater (including infinitely high when B is released or removed as described above using acid and/or hot water), or about 3 to about 25, or about 3 to about 5, or about 3 to about 8, or about 5 to about 12, or about 9 to about 16, or about 10 to about 13, or about 11 to about 25, or about 15 to about 25. Ite aluminosilicate molecular sieves or Ite aluminoborosilicate molecular sieves may have a molar ratio of atomic Si to atomic Al of about 3 or greater (including infinitely high when Al is released or removed as described above using acid and/or hot water), or about 3 to about 25, or about 3 to about 5, or about 3 to about 8, or about 5 to about 12, or about 9 to about 16, or about 10 to about 13, or about 11 to about 25, or about 15 to about 25. Ite germanosilicate molecular sieves may have a molar ratio of atomic Si to atomic Ge of about 1 or greater (including infinitely high when Ge is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25.

Ite molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

The as-synthesized and treated (e.g., calcined or acid treated) Ite molecular sieve can have characteristic X-ray diffraction (XRD) patterns. The essential (most intense) reflection lines for an aluminosilicate Ite molecular sieve are presented in Table 4 (as synthesized form). Variations can occur as a function of the specific composition and SDA used in synthesis. For this reason, the relative peak height intensities and d(Å) are represented as ranges in Table 4.

TABLE 4

| d (Å) | Relative Peak Height Intensity |
|---|---|
| 10.5-10.3 | 45-65 |
| 9.9-9.7 | 40-60 |
| 5.0-4.8 | 80-100 |
| 3.74-3.70 | 25-45 |
| 3.69-3.63 | 20-40 |
| 3.61-3.54 | 70-90 |

RTH Framework

Generally, RTH frameworks (especially RTH frameworks with aluminosilicate compositions) are produced with SDAs that are expensive and/or difficult to prepare.

Rth molecular sieves described herein may be silica molecular sieves, aluminosilicate molecular sieves, borosilicate molecular sieves, aluminoborosilicate molecular sieves, or germanosilicate molecular sieves.

Rth borosilicate molecular sieves or Rth aluminoborosilicate molecular sieves may have a molar ratio of atomic Si to atomic B of about 3 or greater (including infinitely high when B is released or removed as described above using acid and/or hot water), or about 3 to about 100, or about 3 to about 50, or about 3 to about 8, or about 5 to about 12, or about 9 to about 16, or about 10 to about 13, or about 11 to about 25, or about 15 to about 25, or about 20 to about 50, or about 20 to about 100. Rth aluminosilicate molecular sieves or Rth aluminoborosilicate molecular sieves may have a molar ratio of atomic Si to atomic Al of about 3 or greater (including infinitely high when Al is released or removed as described above using acid and/or hot water), or about 3 to about 100, or about 3 to about 50, or about 3 to about 8, or about 5 to about 12, or about 9 to about 16, or about 10 to about 13, or about 11 to about 25, or about 15 to about 2, or about 20 to about 50, or about 20 to about 100. Rth germanosilicate molecular sieves may have a molar ratio of atomic Si to atomic Ge of about 1 or greater (including infinitely high when Ge is released or removed as described above using acid and/or hot water), or about 1 to about 100, or about 1 to about 50, or about 1 to about 8, or about 5 to about 12, or about 9 to about 16, or about 10 to about 13, or about 11 to about 25, or about 15 to about 25, or about 20 to about 50, or about 20 to about 100.

Rth molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

The as-synthesized and treated (e.g., calcined or acid treated) Rth molecular sieve can have characteristic X-ray diffraction (XRD) patterns. The essential (most intense) reflection lines for an aluminosilicate Rth molecular sieve are presented in Table 5 (as synthesized form). Variations can occur as a function of the specific composition and SDA used in synthesis. For this reason, the relative peak height intensities and d(Å) are represented as ranges in Table 5.

TABLE 5

| d (Å) | Relative Peak Height Intensity |
|---|---|
| 10.4-10.1 | 80-100 |
| 9.8-9.6 | 60-80 |
| 4.80-4.65 | 25-35 |
| 4.60-4.55 | 25-35 |
| 3.60-3.55 | 70-90 |
| 3.54-3.52 | 25-35 |
| 3.51-3.48 | 30-50 |

ITE/RTH Intergrowth Framework

ITE/RTH intergrowth frameworks are individual particles having both ITE and RTH frameworks. Because the crystal structure symmetries of these two frameworks are very similar, a layer of ITE framework can grow next to a layer of RTH framework in the same crystal, also referred to as epitaxial intergrowth.

Ite/Rth molecular sieves described herein may be silica molecular sieves, aluminosilicate molecular sieves, borosilicate molecular sieves, aluminoborosilicate molecular sieves, or germanosilicate molecular sieves.

Ite/Rth borosilicate molecular sieves or Ite/Rth aluminoborosilicate molecular sieves may have a molar ratio of atomic Si to atomic B of about 15 or greater (including infinitely high when B is released or removed as described above using acid and/or hot water), or about 15 to about 100, or about 15 to about 25, or about 20 to about 50, or about 20 to about 100. Ite/Rth aluminosilicate molecular sieves or Ite/Rth aluminoborosilicate molecular sieves may have a molar ratio of atomic Si to atomic Al of about 15 or greater (including infinitely high when Al is released or removed as described above using acid and/or hot water), or about 15 to about 100, or about 15 to about 25, or about 20 to about 50, or about 20 to about 100. Ite/Rth germanosilicate molecular sieves may have a molar ratio of atomic Si to atomic Ge of about 1 or greater (including infinitely high when Ge is released or removed as described above using acid and/or hot water), or about 1 to about 100, or about 1 to about 50, or about 1 to about 8, or about 5 to about 12, or about 9 to about 16, or about 10 to about 13, or about 11 to about 25, or about 15 to about 25, or about 20 to about 50, or about 20 to about 100.

Ite/Rth molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

IWV Framework

Iwv molecular sieves described herein may be silica molecular sieves, aluminosilicate molecular sieves, borosilicate molecular sieves, aluminoborosilicate molecular sieves, or germanosilicate molecular sieves. Further, Iwv molecular sieves described herein may have other compositions corresponding to the sources of tetrahedral elements and/or alkali/alkaline earth metals not in the foregoing compositions.

Iwv borosilicate molecular sieves or Iwv aluminoborosilicate molecular sieves may have a molar ratio of atomic Si to atomic B of about 3 or greater (including infinitely high when B is released or removed as described above using acid and/or hot water), or about 3 to about 25, or about 3 to about 8, or about 5 to about 12, or about 9 to about 16, or about 10 to about 13, or about 11 to about 25, or about 15 to about 25. Iwv aluminosilicate molecular sieves or Iwv aluminoborosilicate molecular sieves may have a molar ratio of atomic Si to atomic Al of about 1 or greater (including infinitely high when Al is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25. Iwv silicoaluminophosphate molecular sieves may have a molar ratio of atomic Si to atomic Al of about 0.05 to about 0.4, or about 0.05 to about 0.1, or about 0.1 to about 0.2, or about 0.2 to about 0.3, or about 0.3 to about 0.4. Iwv germanosilicate molecular sieves may have a molar ratio of atomic Si to atomic Ge of about 1 or greater (including infinitely high when Ge is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25.

Iwv molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

The as-synthesized and treated (e.g., calcined or acid treated) Iwv molecular sieve can have characteristic X-ray diffraction (XRD) patterns. The essential (most intense) reflection lines for an aluminosilicate Iwv molecular sieve, silicate Iwv molecular sieve, germanosilicate Iwv molecular sieve are presented in Tables 6, 7, and 8, respectively, (all as synthesized forms). Variations can occur as a function of the specific composition and SDA used in synthesis. For this reason, the relative peak height intensities and d(Å) are represented as ranges in Tables 6, 7, and 8.

TABLE 6

| d (Å) | Relative Peak Height Intensity |
|---|---|
| 13.7-13.5 | 65-85 |
| 12.65-12.45 | 30-50 |
| 11.1-10.9 | 80-100 |
| 7.0-6.8 | 15-30 |
| 4.95-4.80 | 25-45 |
| 4.75-4.60 | 35-55 |
| 3.55-3.43 | 10-30 |
| 3.36-3.31 | 15-35 |

TABLE 7

| d (Å) | Relative Peak Height Intensity |
|---|---|
| 13.65-13.45 | 80-100 |
| 11.1-10.9 | 35-55 |
| 6.95-6.75 | 5-20 |
| 4.95-4.80 | 5-15 |
| 4.77-4.65 | 5-20 |

TABLE 8

| d (Å) | Relative Peak Height Intensity |
|---|---|
| 13.75-13.55 | 80-100 |
| 12.3-12.1 | 20-40 |
| 7.0-6.8 | 15-30 |
| 4.95-4.80 | 5-15 |
| 3.45-3.37 | 5-20 |

IFW Framework

IFW frameworks with all-silica or aluminosilicate compositions have not previously been synthesized directly. Further, other compositions with IFW frameworks generally are produced with SDAs that are expensive and/or difficult to prepare.

Ifw molecular sieves described herein may be silica molecular sieves, aluminosilicate molecular sieves, borosilicate molecular sieves, aluminoborosilicate molecular sieves, or germanosilicate molecular sieves.

Ifw borosilicate molecular sieves or Ifw aluminoborosilicate molecular sieves may have a molar ratio of atomic Si to atomic B of about 3 or greater (including infinitely high when B is released or removed as described above using acid and/or hot water), or about 3 to about 100, or about 3 to about 50, or about 3 to about 8, or about 5 to about 12, or about 9 to about 16, or about 10 to about 13, or about 11 to about 25, or about 15 to about 25, or about 20 to about 50, or about 20 to about 100. Ifw aluminosilicate molecular sieves or Ifw aluminoborosilicate molecular sieves may have a molar ratio of atomic Si to atomic Al of about 15 or greater (including infinitely high when Al is released or removed as described above using acid and/or hot water), or about 15 to about 100, or about 15 to about 50, or about 15 to about 25, or about 20 to about 50, or about 20 to about 100. Ifw silicoaluminophosphate molecular sieves may have a molar ratio of atomic Si to atomic Al of about 0.05 to about 0.4, or about 0.05 to about 0.1, or about 0.1 to about 0.2, or about 0.2 to about 0.3, or about 0.3 to about 0.4. Ifw germanosilicate molecular sieves may have a molar ratio of atomic Si to atomic Ge of about 1 or greater (including infinitely high when Ge is released or removed as described above using acid and/or hot water), or about 1 to about 100, or about 1 to about 50, or about 1 to about 8, or about 5 to about 12, or about 9 to about 16, or about 10 to about 13, or about 11 to about 25, or about 15 to about 25, or about 20 to about 50, or about 20 to about 100.

Ifw molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

The as-synthesized and treated (e.g., calcined or acid treated) Ifw molecular sieve can have characteristic X-ray diffraction (XRD) patterns. The essential (most intense) reflection lines for an aluminoborosilicate Ifw molecular sieve are presented in Table 9 (as synthesized form). Variations can occur as a function of the specific composition and SDA used in synthesis. For this reason, the relative peak height intensities and d(Å) are represented as ranges in Table 9.

TABLE 9

| d (Å) | Relative Peak Height Intensity |
|---|---|
| 12.8-12.6 | 80-100 |
| 10.35-10.15 | 50-70 |
| 4.70-4.57 | 70-90 |
| 4.25-4.16 | 30-50 |
| 4.15-4.08 | 30-50 |
| 3.70-3.60 | 35-55 |
| 3.40-3.30 | 10-30 |

*CTH Framework

Generally, molecular sieves having a *CTH framework previously required the presence of germanium in the reaction mixture. However, as illustrated in the Examples herein, all-silica and borosilicate *Cth molecular sieves can be synthesized using SDAs described herein.

*Cth molecular sieves described herein may be silica molecular sieves, aluminosilicate molecular sieves, borosilicate molecular sieves, aluminoborosilicate molecular sieves, or germanosilicate molecular sieves. *Cth molecular sieves may have an absence of Ge (or not comprise Ge).

*Cth borosilicate molecular sieves or *Cth aluminoborosilicate molecular sieves may have a molar ratio of atomic Si to atomic B of about 4 or greater (including infinitely high when B is released or removed as described above using acid and/or hot water), or about 4 to about 40, or about, or about 4 to about 8, or about 5 to about 12, or about 9 to about 16, or about 10 to about 13, or about 11 to about 25, or about 15 to about 25, or about 20 to about 40. *Cth aluminosilicate molecular sieves or *Cth aluminoborosilicate molecular sieves may have a molar ratio of atomic Si to atomic Al of about 4 or greater (including infinitely high when Al is released or removed as described above using acid and/or hot water), or about 4 to about 25, or about 1 to about 5, or about 4 to about 8, or about 5 to about 12, or about 9 to about 16, or about 10 to about 13, or about 11 to about 25, or about 15 to about 25. *Cth silicoaluminophosphate molecular sieves may have a molar ratio of atomic Si to atomic Al of about 0.05 to about 0.4, or about 0.05 to about 0.1, or about 0.1 to about 0.2, or about 0.2 to about 0.3, or about 0.3 to about 0.4. *Cth germanosilicate molecular sieves may have a molar ratio of atomic Si to atomic Ge of about 1 or greater (including infinitely high when Ge is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25.

*Cth molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

The as-synthesized and treated (e.g., calcined or acid treated) *Cth molecular sieve can have characteristic X-ray diffraction (XRD) patterns. The essential (most intense) reflection lines for an all-silica *Cth molecular sieve are presented in Table 10 (as synthesized form). Variations can occur as a function of the specific composition and SDA used in synthesis. For this reason, the relative peak height intensities and d(Å) are represented as ranges in Table 10.

TABLE 10

| d (Å) | Relative Peak Height Intensity |
|---|---|
| 13.7-13.5 | 40-60 |
| 12.3-12.1 | 80-100 |
| 6.95-6.75 | 15-30 |
| 4.95-4.83 | 45-65 |
| 4.80-4.68 | 15-35 |
| 3.38-3.30 | 15-30 |

SAS Framework

SAS frameworks with metalloaluminophosphate compositions have been prepared previously, but not silicoaluminophosphate compositions.

SAS molecular sieves described herein may be silica molecular sieves, aluminosilicate molecular sieves, borosilicate molecular sieves, aluminoborosilicate molecular sieves, germanosilicate molecular sieves, aluminophosphate molecular sieves, silicoaluminophosphate molecular sieves, and metalloaluminophosphate molecular sieves.

Sas borosilicate molecular sieves or Sas aluminoborosilicate molecular sieves may have a molar ratio of atomic Si to atomic B of about 1 or greater (including infinitely high when B is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25. Sas aluminosilicate molecular sieves or Sas aluminoborosilicate molecular sieves may have a molar ratio of atomic Si to atomic Al of about 1 or greater (including infinitely high when Al is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25. Sas silicoaluminophosphate molecular sieves may have a molar ratio of atomic Si to atomic Al of about 0.05 to about 0.4, or about 0.05 to about 0.1, or about 0.1 to about 0.2, or about 0.2 to about 0.3, or about 0.3 to about 0.4. Sas germanosilicate molecular sieves may have a molar ratio of atomic Si to atomic Ge of about 1 or greater (including infinitely high when Ge is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25.

Sas molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

POS Framework

While POS frameworks have been previously prepared in germanosilicate compositions, the syntheses described herein use SDAs with the advantages described herein.

Pos molecular sieves described herein may be silica molecular sieves, aluminosilicate molecular sieves, borosilicate molecular sieves, aluminoborosilicate molecular sieves, germanosilicate molecular sieves, aluminophosphate molecular sieves, and silicoaluminophosphate molecular sieves.

Pos borosilicate molecular sieves or Pos aluminoborosilicate molecular sieves may have a molar ratio of atomic Si to atomic B of about 1 or greater (including infinitely high when B is released or removed as described above using acid and/or hot water), or about 3 to about 25, or about 3 to about 5, or about 3 to about 8, or about 5 to about 12, or about 9 to about 16, or about 10 to about 13, or about 11 to about 25, or about 15 to about 25. Pos aluminosilicate molecular sieves or Pos aluminoborosilicate molecular sieves may have a molar ratio of atomic Si to atomic Al of about 3 or greater (including infinitely high when Al is released or removed as described above using acid and/or hot water), or about 3 to about 25, or about 3 to about 5, or about 3 to about 8, or about 5 to about 12, or about 9 to about 16, or about 10 to about 13, or about 11 to about 25, or about 15 to about 25. Pos silicoaluminophosphate molecular sieves may have a molar ratio of atomic Si to atomic Al of about 0.05 to about 0.4, or about 0.05 to about 0.1, or about 0.1 to about 0.2, or about 0.2 to about 0.3, or about 0.3 to about 0.4. Pos germanosilicate molecular sieves may have a molar ratio of atomic Si to atomic Ge of about 1 or greater (including infinitely high when Ge is released or removed as described above using acid and/or hot water), or about 1 to about 25, or about 1 to about 5, or about 1 to about 8, or about 5 to about 12, or about 9 to about 16, or about 10 to about 13, or about 11 to about 25, or about 15 to about 25.

Pos molecular sieves of the present disclosure having been treated to release or remove B (or Al or Ge) can comprise B (or Al or Ge) at less than 5 wt % of the molecular sieve, or less than 1 wt % of the molecular sieve, or less than 0.1 wt % of the molecular sieve, or less than 0.01 wt % of the molecular sieve.

MWW Framework

Mww molecular sieves described herein may be silica molecular sieves, aluminosilicate molecular sieves, borosilicate molecular sieves, and aluminoborosilicate molecular sieves. MWW frameworks previously produced use SDAs that are expensive and/or difficult to prepare.

Mww borosilicate molecular sieves or Mww aluminoborosilicate molecular sieves may have a molar ratio of atomic Si to atomic B of about 3 or greater (including infinitely high when B is released or removed as described above using acid and/or hot water), or about 3 to about 750, or about 3 to about 5, or about 3 to about 8, or about 5 to about 12, or about 9 to about 16, or about 10 to about 13, or about 11 to about 25, or about 15 to about 25, or about 20 to about 100, or about 50 to about 250, or about 200 to about 500, or about 250 to about 700. Mww aluminosilicate molecular sieves or Mww aluminoborosilicate molecular sieves may have a molar ratio of atomic Si to atomic Al of about 3 or greater (including infinitely high when Al is released or removed as described above using acid and/or hot water), or about 3 to about 750, or about 3 to about 5, or about 3 to about 8, or about 5 to about 12, or about 9 to about 16, or about 10 to about 13, or about 11 to about 25, or about 15 to about 25, or about 20 to about 100, or about 50 to about 250, or about 200 to about 500, or about 250 to about 700.

Mww molecular sieves of the present disclosure having been treated to release or remove B (or Al) can comprise B (or Al) at less than 5 wt % of the molecular sieve, or less than 1 wt % of the molecular sieve, or less than 0.1 wt % of the molecular sieve, or less than 0.01 wt % of the molecular sieve.

Applications

The molecular sieves (treated after synthesis or as-produced) of the present invention can be used as a sorbent, for example, in the separation of carbon dioxide from a mixture comprising carbon dioxide and one or more alkanes (e.g., methane, ethane, propane, and/or butane) and/or a mixture comprising carbon dioxide and oxygen, nitrogen, $H_2S$, $SO_x$, and/or $NOR_x$. The separation process can employ the equilibrium selectivity of the molecular sieves, the kinetic selectivity of the molecular sieves, or both the equilibrium and kinetic selectivity of the molecular sieves, for carbon dioxide over the other component(s) of the mixture. By way of nonlimiting example, RHO-type molecular sieves having an atomic Si to atomic B molar ratio from about 8 to about 30 can typically possess a sorption capacity for $CO_2$ at about 1 atm (about 100 kPa) from about 0.8 mmol/g to about 2.0 mmol/g. Alternatively or in addition, the molecular sieves can be used as a catalyst to facilitate one or more organic compound conversion processes including many of present commercial/industrial importance.

The molecular sieves (treated after synthesis or as-produced) of the present invention can be used as a support in a catalyst system. Such catalysts may, for example, be useful in reducing $NO_x$ in a gas stream (e.g., an exhaust stream from a combustion operation). For reducing $NO_x$, copper is a preferred transition metal that the molecular sieves can be impregnated or exchanged with to produce the catalyst. Other potential metals include zinc, vanadium, chromium, manganese, iron, cobalt, nickel, rhodium, palladium, platinum, and molybdenum. In addition to the transition metal, alkali or alkaline earth metals may be present in the catalyst to facilitate $NO_x$ reduction. Such metals include alkaline earth metals, sodium, potassium, rubidium, cesium, magnesium, calcium and barium. Furthermore, a steam stabilizing amount of titanium, zirconium, or rare earth can be included. The metal can be impregnated into the molecular sieves as a metal or an ion. The metal can be about 1 wt % to about 10 wt % of the catalyst system (e.g., impregnated molecular sieves), or about 2 wt % to about 5 wt %.

In an example embodiment for making the catalyst, a steam stabilizing amount of titanium or zirconium cations or a mixture of these metal compounds is included in the additive by treatment of molecular sieves (treated after synthesis or as-produced) with any titanium or zirconium compound that can be brought into intimate association with the molecular sieves (e.g., aqueous solutions of titanium tetramethoxide and zirconium acetate). The introduction of titanium or zirconium may follow ion-exchange by copper ions. Alternatively, impregnation with copper ions also may be done concurrently therewith with an aqueous solution containing, for example, both divalent copper cations and a soluble titanium or soluble zirconium compound. Additional synthesis and catalyst system preparation details can be found in U.S. Pat. No. 6,143,261, which is incorporated herein by reference.

In yet another example, the molecular sieves described herein may also be useful as catalysts in reactions like alkylation, transalkylation, dealkylation, hydrodecylization, disproportionation, oligomerization, and dehydrocyclization, especially the molecular sieves with large pores or medium pores.

In another example, the molecular sieve can be used as a catalyst in the synthesis of methylamines (e.g., monomethylamine, dimethylamine, and trimethylamine) from methanol (and/or dimethylether) and ammonia. The reactants (methanol (and/or dimethylether) and ammonia) can be in concentrations to provide for a carbon to nitrogen molar ratio of about 0.2 to about 1.5, or about 0.7 to about 1.3. The reaction temperature is about 250° C. to about 450° C., or about 300° C. to about 425° C. Additional synthesis details can be found in U.S. Pat. No. 5,569,785, which is incorporated herein by reference.

As in the case of many catalysts used in organic compound (hydrocarbon) conversion processes, it may be desirable to incorporate the molecular sieves with another material resistant to the temperatures and other conditions employed in organic conversion processes. Such materials can include active and inactive materials and synthetic or naturally occurring molecular sieves, as well as inorganic materials such as clays, silica, and/or metal oxides such as alumina. The latter may be either naturally occurring or in the form of gelatinous precipitates or gels, including mixtures of silica and metal oxides. Use of a material in conjunction with the molecular sieves (i.e., combined therewith and/or present during synthesis of the new crystal, which is active) can tend to change the conversion and/or selectivity of the catalyst in certain organic conversion processes. Inactive materials can suitably serve as diluents to control the amount of conversion in a given process so that products can be obtained in an economic and orderly manner without employing other (more costly) means for controlling the rate of reaction. These materials may be incorporated into naturally occurring clays (e.g., bentonite and kaolin) to improve the crush strength of the catalyst under commercial operating conditions. Said materials (i.e., clays, oxides, etc.) can function as binders for the catalyst. It can be desirable to provide a catalyst having good crush strength, because in commercial use it can be desirable to prevent the catalyst from breaking down into powder-like materials (attrition). These clay and/or oxide binders have been employed normally only for the purpose of improving the crush strength of the catalyst.

Naturally occurring clays which can be composited with the molecular sieves can include, without limitation, the montmorillonite and kaolin family, which families include the subbentonites, and the kaolins commonly known as Dixie, McNamee, Georgia, and Florida clays, or others in which the main mineral constituent is halloysite, kaolinite, dickite, nacrite, or anauxite. Such clays can be used in the raw state as originally mined or initially subjected to calcination, acid treatment, or chemical modification. Binders useful for compositing with the molecular sieves can additionally or alternatively include inorganic oxides, such as silica, zirconia, titania, magnesia, beryllia, alumina, and mixtures thereof.

Alternatively or in addition to the foregoing materials, the molecular sieves can be composited with a porous matrix material such as silica-alumina, silica-magnesia, silica-zirconia, silica-thoria, silica-beryllia, silica-titania, and/or one or more ternary compositions such as silica-alumina-thoria, silica-alumina-zirconia silica-alumina-magnesia, and silica-magnesia-zirconia.

The relative proportions of molecular sieves and inorganic oxide matrix may vary widely, with the molecular sieve content ranging from about 1 wt % to about 90 wt %, and, more usually, particularly when the composite is prepared in the form of beads, in the range of about 2 wt % to about 80 wt % of the composite. An exemplary matrix content range can include from about 10 wt % to about 50 wt %.

Numerical ranges used herein include the numbers recited in the range. For example, the numerical range "from 1 wt % to 10 wt %" includes 1 wt % and 10 wt % within the recited range.

EXAMPLE EMBODIMENTS

A first nonlimiting example embodiment of the present disclosure is a method comprising: reacting a source selected from the group consisting of: a source of a tetrahedral element in the presence of a structure directing agent (SDA) selected from the group consisting of: $Ar^+$-L-Ar, Ar$^+$-L-Ar-L-Ar$^+$, and Ar$^+$-L-Ar-L-NR3$^+$, where Ar$^+$ is to a N-containing cationic aromatic ring, Ar is to a non-charged aromatic ring, L is a methylene chain of 3-6 carbon atoms, and NR3$^+$ is to a quaternary ammonium, to produce a molecular sieve. The first nonlimiting example embodiment may include one or more of the following: Element 1: wherein the N-containing cationic aromatic ring is selected from the group consisting of: pyridinium, a substituted pyridinium, imidazolium, a substituted imidazolium, pyrazolium, a substituted pyrazolium, pyrazinium, a substituted pyrazinium, pyrimidinium, and a substituted pyrimidinium; Element 2: wherein the non-charged aromatic ring is selected from the group consisting of: phenyl, a substituted phenyl, naphthyl, and a substituted naphthyl; Element 3: wherein the SDA is selected from the group consisting of: Compound E, Compound F, Compound G, Compound H, Compound I, Compound J, Compound K, Compound L, Compound M, Compound N, Compound O, Compound P, Compound Q, Compound R, Compound S, Compound T, and any combination thereof; Element 4: wherein the tetrahedral element comprises Si, and wherein the aqueous reaction mixture has a molar ratio of atomic Si to the structure directing agent of about 1 to about 20; Element 5: wherein the tetrahedral element comprises Si, and wherein the aqueous reaction mixture has a molar ratio of water to atomic Si of about 2 to about 80; Element 6: wherein the tetrahedral element is selected from the group consisting of: Li, Be, Al, B, P, Si, Ga, Ge, Zn, Cr, Mg, Fe, Co, Ni, Mn, As, In, Sn, Sb, Ti, Zr, and any combination thereof; Element 7: wherein the reaction mixture further comprises a source of hydroxide ions; Element 8: wherein the reaction mixture further comprises a source of halide ions; Element 9: wherein the reaction mixture further comprises a source of alkali/alkaline earth metal ions; Element 10: wherein the reaction mixture further comprises molecular sieve seeds; Element 11: wherein reacting is at a temperature of about 75° C. to about 200° C.; Element 12: wherein reacting is for a time of about 2 hours to about 28 days; Element 13: wherein the molecular sieve has a composition selected from the group consisting of: silica, aluminosilicate, borosilicate, aluminoborosilicate, germanosilicate, aluminophosphate, silicoaluminophosphate, and metalloaluminophophates; Element 14: wherein the molecular sieve has a framework selected from the group consisting of: a RHO framework, a LTA framework, ITE framework, a RTH framework, an ITE/RTH intergrowth framework, an ITE/RTH intergrowth framework, an IWV framework, an IFW framework, a *CTH framework, a SAS framework, a POS framework, and a MWW framework; Element 15: the method further comprises: calcining the molecular sieve at about 500° C. to about 900° C.; Element 16: the method further comprises: exposing the molecular sieve to an acid; and Element 17: the method further comprises: exposing the molecular sieve to boiling water. Examples of combinations include, but are not limited to, Element 1 and Element 2 in combination; Element 1 and/or Element 2 in combination with one or more of Elements 4-9 and optionally in further combination with Elements 10-12; Element 3 in combination with one or more of Elements 4-9 and optionally in further combination with Elements 10-12; Elements 13 and 14 in combination; Element 13 and/or Element 14 in combination with one or more of Elements 15-17; Element 1 and/or Element 2 in combination with Element 13 and/or Element 14; and Element 3 in combination with Element 13 and/or Element 14.

A second nonlimiting example embodiment of the present disclosure is a method comprising: reacting a source selected from the group consisting of: a source of a tetrahedral element in the presence of a structure directing agent (SDA) of ArAr$^+$-L-Ar$^+$Ar, where L is a methylene chain of 3-6 carbon atoms, and ArAr$^+$ and Ar$^+$Ar are a fused aromatic ring structure comprising both a N-containing cationic portion and a non-charged portion, to produce a molecular sieve. The second nonlimiting example embodiment may include one or more of the following: Element 18: wherein the SDA is selected from the group consisting of: Compound U, Compound V, Compound W, and any combination thereof; Element 19: wherein the tetrahedral element comprises Si; and wherein the aqueous reaction mixture has a molar ratio of atomic Si to the structure directing agent of about 1 to about 15; Element 20: wherein the tetrahedral element comprises Si; and wherein the aqueous reaction mixture has a molar ratio of water to atomic Si of about 2 to about 80; Element 21: wherein the tetrahedral element is selected from the group consisting of: Li, Be, Al, B, P, Si, Ga, Ge, Zn, Cr, Mg, Fe, Co, Ni, Mn, As, In, Sn, Sb, Ti, Zr, and any combination thereof; Element 22: wherein the reaction mixture further comprises a source of hydroxide ions; Element 23: wherein the reaction mixture further comprises a source of halide ions; Element 24: wherein the reaction mixture further comprises a source of alkali/alkaline earth metal ions; Element 25: wherein the reaction mixture further comprises molecular sieve seeds; Element 26: wherein reacting is at a temperature of about 75° C. to about 200° C.; Element 27: wherein reacting is for a time of about 2 hours to about 20 days; Element 28: wherein the molecular sieve has a composition selected from the group consisting of: silica, aluminosilicate, borosilicate, aluminoborosilicate, germanosilicate, aluminophosphate, and silicoaluminophosphate; Element 29: wherein the molecular sieve has a framework selected from the group consisting: of a RHO framework, a LTA framework, ITE framework, a RTH framework, an ITE/RTH intergrowth framework, an IWV framework, an IFW framework, a *CTH framework, a SAS framework, a POS framework, and a MWW framework; Element 30: the method further comprising: calcining the molecular sieve at about 500° C. to about 900° C.; Element 31: the method further comprising: exposing the molecular sieve to an acid; and Element 32: the method further comprising: exposing the molecular sieve to boiling water. Examples of combinations include, but are not limited to, Element 18 in combination with Element 28 and/or Element 29; Element 18 in combination with Element 19 and/or Element 20; one or more of Elements 18-20 in combination with Element 21; two or more of Elements 18-25; Element 26 and/or Element 27 in combination with one or more of Elements 18-25; Element 28 and/or Element 29 in combination with one or more of Elements 18-27; and Element 31 and/or Element 32 in combination with one or more of Elements 18-30.

A third nonlimiting example embodiment of the present disclosure is a composition comprising: an aluminosilicate molecular sieve or an aluminoborosilicate molecular sieve having a RHO framework having a Si to Al ratio greater than or equal to about 8 (e.g., about 8 to about 25). For the aluminoborosilicate molecular sieve, the Si to B ratio may be about 1 to about 25.

A fourth nonlimiting example embodiment of the present disclosure is a composition comprising: a borosilicate molecular sieve having a RHO framework. Said borosilicate molecular sieve may have a Si to B ratio of about 1 to about 25 (or about 8 to about 25)

A fifth nonlimiting example embodiment of the present disclosure is a composition comprising: a silica sieve having a IFW framework.

A sixth nonlimiting example embodiment of the present disclosure is a composition comprising: an aluminosilicate molecular sieve having a IFW framework. The aluminosilicate molecular sieve may have a Si to Al ratio of about 3 to about 100 (or about 20 to about 100).

A seventh nonlimiting example embodiment of the present disclosure is a composition comprising: a silica molecular sieve, an aluminosilicate molecular sieve, a borosilicate molecular sieve, an aluminoborosilicate molecular sieve, or a germanosilicate molecular sieve having a ITH/RTH intergrowth framework. For the aluminosilicate molecular sieve or the aluminoborosilicate molecular sieve, a Si to Al ratio of about 3 to about 100 (e.g., about 20 to about 100). For the borosilicate molecular sieve or the aluminoborosilicate molecular sieve, a Si to B ratio may be about 3 to about 100 (or about 20 to about 100). For the composition is the germanosilicate molecular sieve or the aluminoborosilicate molecular sieve having a Si to Ge ratio of about 1 to about 100 (or about 20 to about 100).

An eighth nonlimiting example embodiment of the present disclosure is a composition comprising: a silica molecular sieve or a borosilicate molecular sieve having a *CTH framework, which may be absent Ge. The Si to B ratio may be about 4 to about 25.

A ninth nonlimiting example embodiment of the present disclosure is a composition comprising: a silicoaluminophosphate molecular sieve having a SAS framework. The Si to Al ratio may be of about 1 to about 25.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. Reaction Scheme 1 illustrates the synthesis of Compound X, an SDA embodiment of Compound V. 200 mL of anhydrous THF was cannulated into a 500 mL flame dried round bottom with a stir bar. 3.965 g (30.0 mmol) of 2-methylbenzimidazole was added to the flask, then the flask was purged with nitrogen. Reaction mixture was cooled to −78 degrees Celsius. 12.0 mL (30.0 mmol, 1.0 eq) of 2.5M N-butyllithium added to the reaction mixture and stirred at −78 degrees Celsius for 5 minutes before returning to room temperature and stirring for 15 minutes at room temperature. 12.77 g (90.0 mmol, 3.0 eq) iodomethane was added and the reaction was stirred at room temperature for 16 hours. The light brown reaction mixture was poured into 150 mL deionized water and extracted two times with 75 mL ethyl acetate and two times with 75 mL methylene chloride. Combined organic layers were dried with sodium sulfate, gravity-filtered into a pre-weighed round bottom, and solvent was removed by vacuum to yield product as a beige solid (3.04 g, 69.3% yield). 7.52 g (51.2 mmol, 2.05 eq) of the product from the previous reaction was placed into a 500-mL round bottom flask with a stir bar and dissolved in 100 mL acetonitrile. 5.74 g 1,5-dibromopentane (24.97 mmol, 1.0 eq) was added to the flask and reaction was refluxed under nitrogen for 72 hours. White solid crashed out in the reaction mixture. The precipitate was filtered on a medium frit and washed 3 times with 50 mL acetone. The solid was placed in an evaporating dish and dried overnight in the vacuum oven to yield 10.15 g. (78.0% yield).

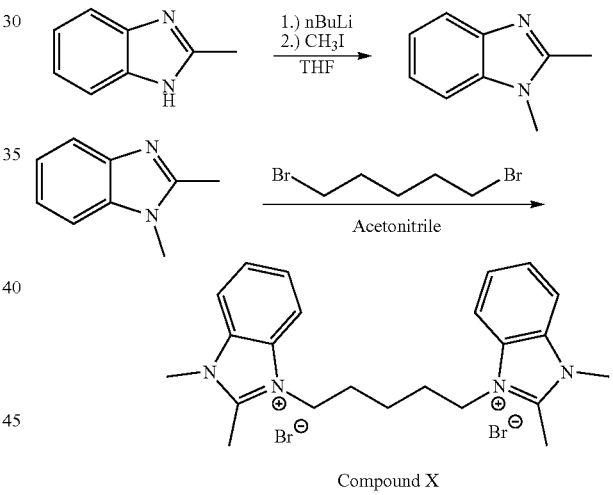

Reaction Scheme 1

Synthesis of Compounds Y and Z can be performed similarly. For example, to produce the Compound Y, a molar equivalent of 1,4-dibromobutane was substituted for the 1,5-dibromopentane.

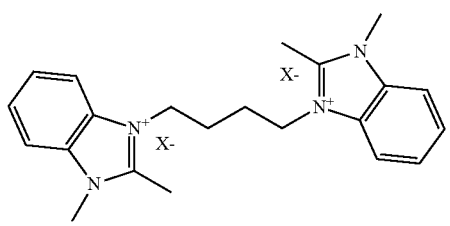

Compound Y where $X^-$ is $Br^-$

Compound Z

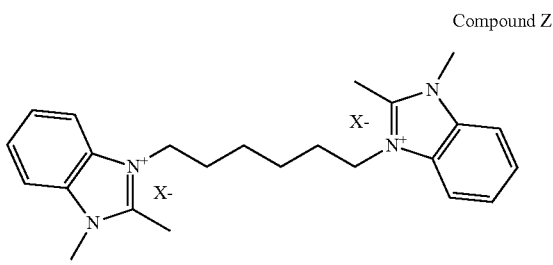

where X⁻ is Br⁻

Figure 3:
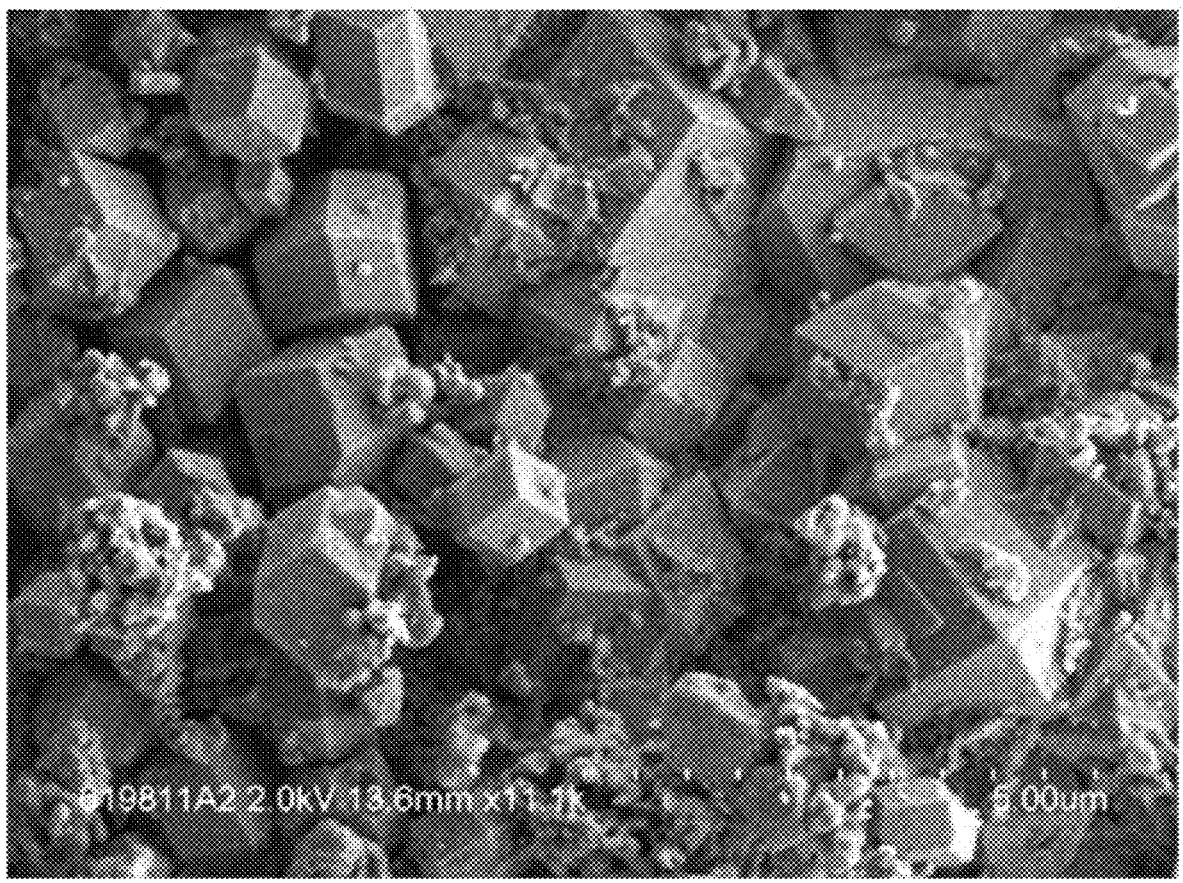
FIG. 3 is a scanning electron microscopy (SEM) micrograph of a borosilicate Rho molecular sieve of the present invention.
Figure 4A:
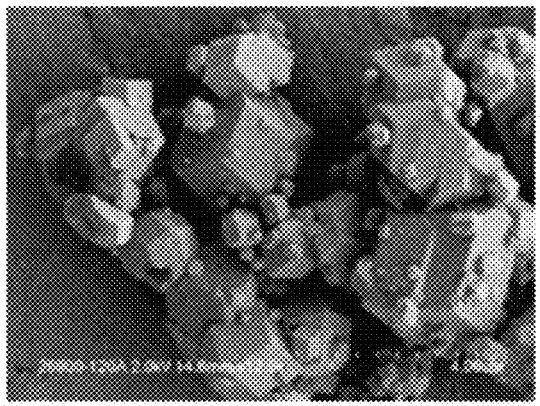
FIGS. 4A-4D are SEM micrographs of a borosilicate Rho molecular sieve of the present invention.
Figure 4B:
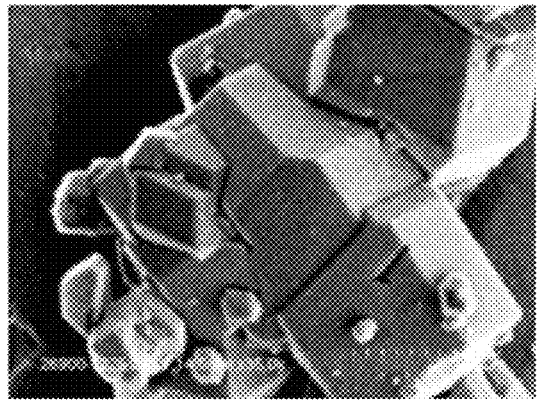
Figure 4C:
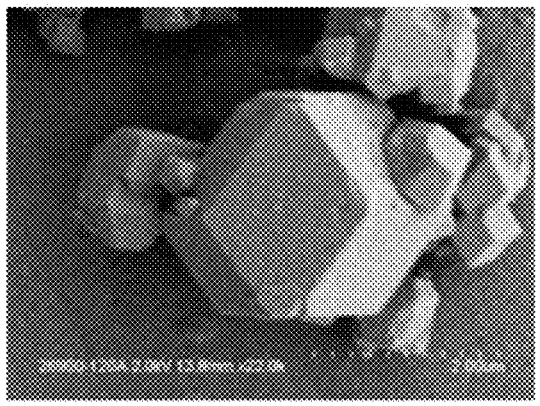
Figure 4D:
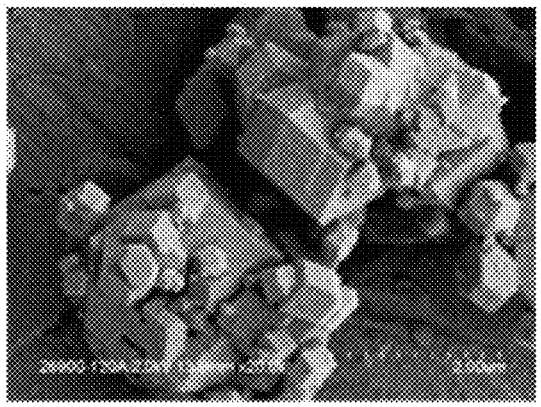

Example 2. In a 1.5 mL reactor, boric acid, tetramethylorthosilicate (TMOS), and a hydroxide solution of Compound X were combined with a sufficient amount of water so that in the reaction mixture the molar ratio of atomic Si to atomic B was 10, and the molar ratio of atomic Si to the SDA was 4. The mixture was then freeze-dried to remove methanol and much of the water, and the molar ratio of water to atomic Si was then adjusted to 4 by back addition of deionized water. The reaction mixture was heated at 150° C. for 10 days to produce a mixture of the borosilicate Rho molecular sieve and amorphous material. FIG. 3 is a scanning electron microscopy (SEM) micrograph of the product.

Example 3. The reaction mixture of Example 2 was heated for a total of 28 days at 150° C. to produce a substantially pure borosilicate Rho molecular sieve (less than 2 wt % amorphous product).

Example 4. The conditions of Example 2 were reproduced in a Steel Parr reactor with a 10-mL Teflon insert with the addition of seeds from the Example 3 product. The seeds increased the speed of the reaction such that within 11 days, a substantially pure borosilicate Rho molecular sieve was produced. FIGS. 4A-4D are SEM micrographs of the product.

The Example 4 product was calcined in a box furnace in a staged procedure. The sample was exposed to flowing nitrogen for two hours at room temperature, followed by a ramp from room temperature to 400° C. over a two-hour period while remaining under nitrogen flow. The temperature then remained at 400° C. for 15 minutes and then the atmosphere was switched from flowing nitrogen to flowing dried air. The temperature was then ramped from 400° C. to 600° C. over a 1-hour period. The temperature remained at 600° C. for 16 hours and then the box furnace was allowed to cool. Unless otherwise specified, this is the method of calcining other examples described herein.

Figure 5:
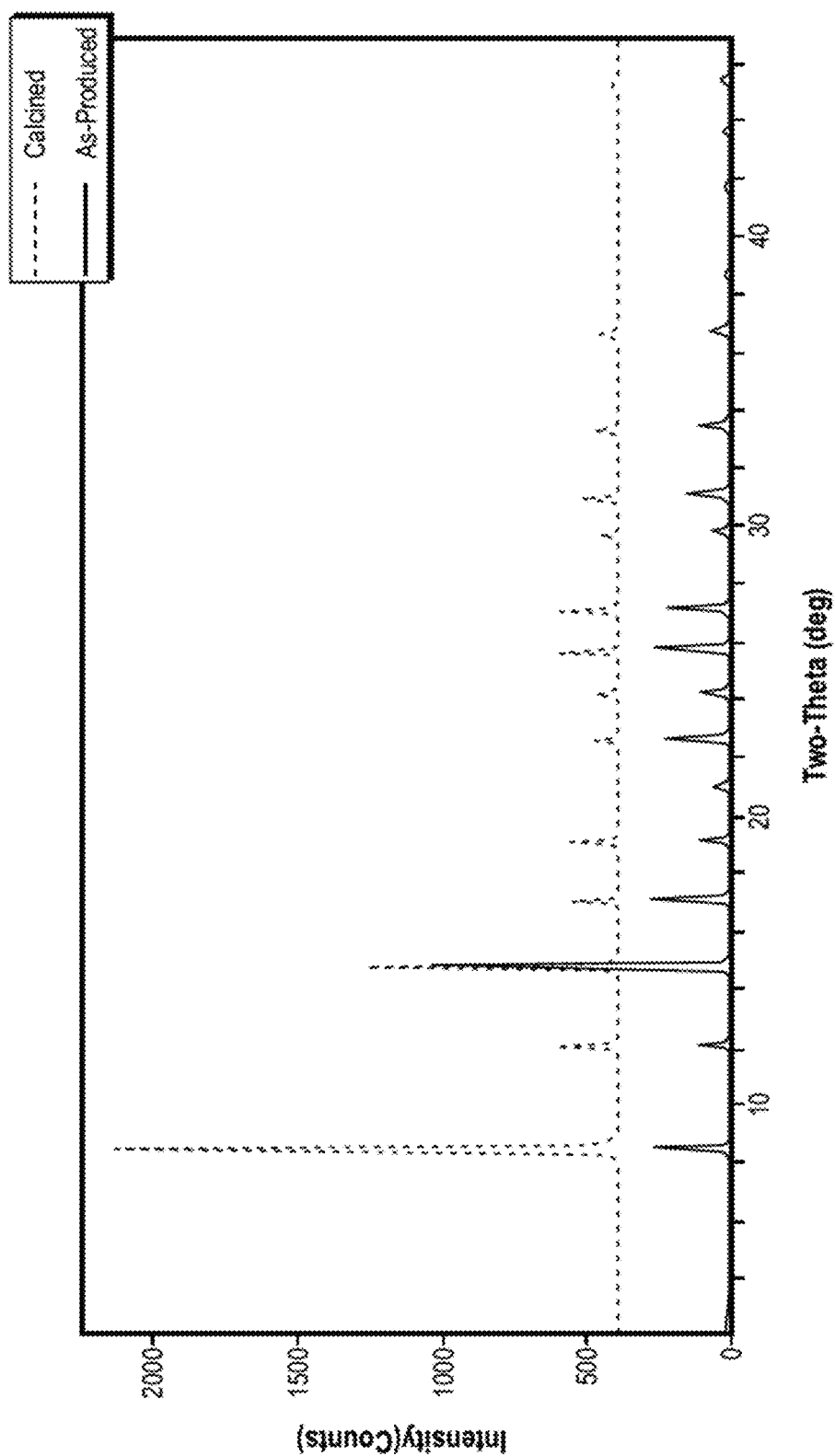
FIG. 5 is a plot of the x-ray diffraction patterns of the as-produced borosilicate Rho molecular sieve and the calcined borosilicate Rho molecular sieve.

Calcination removes the SDA from the borosilicate Rho molecular sieve. FIG. 5 and Tables 11 and 12 are the XRD patterns (Bruker DaVinci D8 Discovery instrument in continuous mode using a Cu Kα radiation; Bragg-Bentano geometry with Vantec 500 detector; angle range: 4° to 36° 2-Theta) of the as-produced borosilicate Rho molecular sieve and the calcined borosilicate Rho molecular sieve, respectively. The as-produced borosilicate Rho molecular sieve has a unit cell with an a parameter of 14.69 Å. The calcined borosilicate Rho molecular sieve has a unit cell with an a of 14.75 Å. Unlike other typical Rho molecular sieves, the borosilicate Rho molecular sieve of the present invention having a higher siliceous content shows little change in the unit cell upon removal of occluded species.

TABLE 11

| 2-Theta (°) | d (Å) | Relative Peak Height Intensity |
| --- | --- | --- |
| 8.59 | 10.29 | 28.2 |
| 12.12 | 7.30 | 9.4 |
| 14.84 | 5.97 | 100 |
| 17.14 | 5.17 | 30.5 |
| 19.17 | 4.63 | 12.3 |
| 21.01 | 4.23 | 7.6 |
| 22.71 | 3.91 | 27.7 |
| 24.29 | 3.66 | 14.1 |
| 25.78 | 3.45 | 33.6 |
| 27.2 | 3.28 | 29.5 |
| 28.63 | 3.12 | 0.7 |
| 29.84 | 2.99 | 9.9 |
| 31.09 | 2.87 | 21.6 |
| 33.45 | 2.68 | 17.1 |
| 34.58 | 2.59 | 0.9 |
| 35.67 | 2.52 | 0.7 |
| 36.74 | 2.44 | 10.3 |
| 37.78 | 2.38 | 0.6 |
| 38.8 | 2.32 | 1.6 |
| 39.79 | 2.26 | 0.8 |
| 40.75 | 2.21 | 0.6 |
| 41.73 | 2.16 | 1.5 |
| 42.66 | 2.12 | 0.3 |
| 43.59 | 2.07 | 3.3 |
| 44.5 | 2.03 | 0.4 |
| 45.39 | 2.00 | 6.8 |

TABLE 12

| 2-Theta (°) | d (Å) | Relative Peak Height Intensity |
| --- | --- | --- |
| 8.56 | 10.33 | 100.0 |
| 12.08 | 7.32 | 12.1 |
| 14.78 | 5.99 | 49.1 |
| 17.07 | 5.19 | 9.8 |
| 19.09 | 4.64 | 10.1 |
| 20.92 | 4.24 | 0.7 |
| 22.61 | 3.93 | 5.4 |
| 24.19 | 3.68 | 6.2 |
| 25.68 | 3.47 | 14.9 |
| 27.09 | 3.29 | 15.2 |
| 29.72 | 3.00 | 5.3 |
| 30.96 | 2.89 | 9.8 |
| 33.31 | 2.69 | 7.4 |
| 34.43 | 2.60 | 1.0 |
| 35.52 | 2.53 | 0.2 |
| 36.58 | 2.45 | 6.2 |
| 37.64 | 2.39 | 0.2 |
| 38.64 | 2.33 | 0.5 |
| 39.65 | 2.27 | 0.1 |
| 40.61 | 2.22 | 0.3 |
| 41.55 | 2.17 | 1.0 |
| 43.41 | 2.08 | 1.6 |
| 44.28 | 2.04 | 0.1 |
| 45.19 | 2.00 | 3.3 |

Example 5. Example 3 synthesis was repeated in a 23 mL Parr bomb. Thermogravimetric analysis (TGA) in air was performed on the as-produced borosilicate Rho molecular sieve. There was a 23.7 wt % cumulative mass loss up to 800° C., which illustrates the removal of the SDA and water.

The Example 5 product was calcined as described in Example 4. This product was allowed to sit in open air overnight subsequent to the calcination. TGA in air was performed on the calcined borosilicate Rho molecular sieve. There was a less than 6 wt % cumulative mass loss up to 400° C., which is a high enough temperature to remove adsorbed water. The low wt % loss observed indicates that little water is adsorbed by the calcined borosilicate Rho molecular sieve and that the calcined borosilicate Rho molecular sieve is less hydrophilic than typical Rho molecular sieves having a comparatively low siliceous content.

BET analysis of nitrogen adsorption data shows the surface area and micropore volume of the calcined borosilicate Rho molecular sieve are 993 m²/g and 0.37 cm³/g, respectively.

Figure 6A:
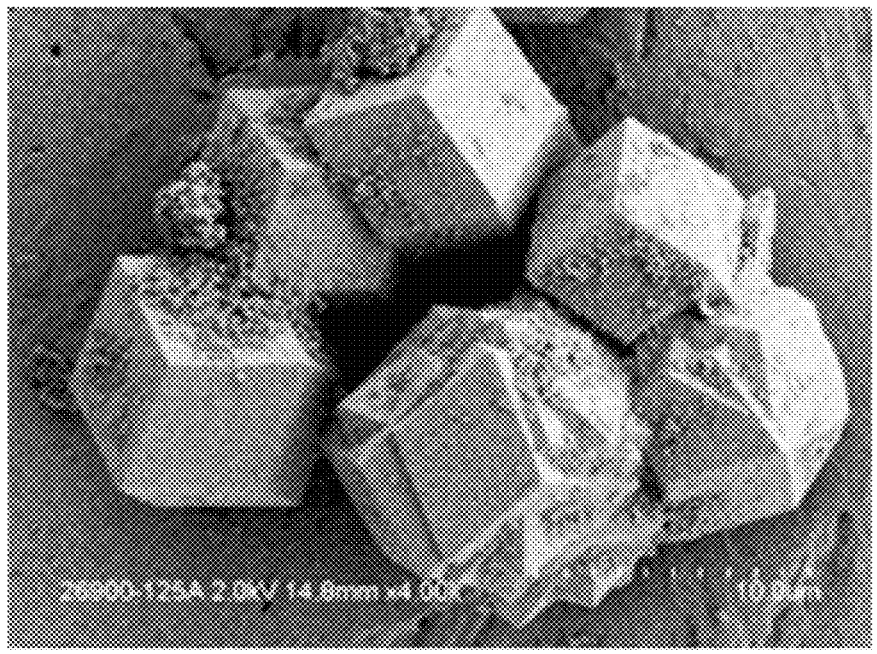
FIGS. 6A and 6B are SEM micrographs of a borosilicate Rho molecular sieve of the present invention.
Figure 6B:
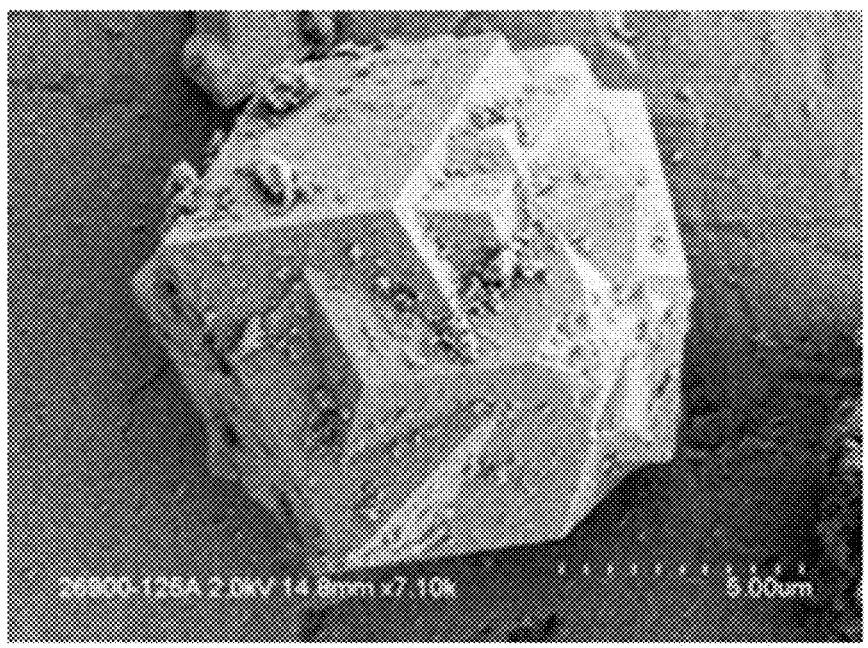

Example 6. Example 5 (seeded synthesis) was repeated with ULTRASIL™ as the silica source and only 10 days of reaction time. The produced borosilicate Rho molecular sieve had only trace amounts of the amorphous product (less than 1 wt % amorphous product). FIGS. 6A and 6B are SEM micrographs of the product.

Figure 7:
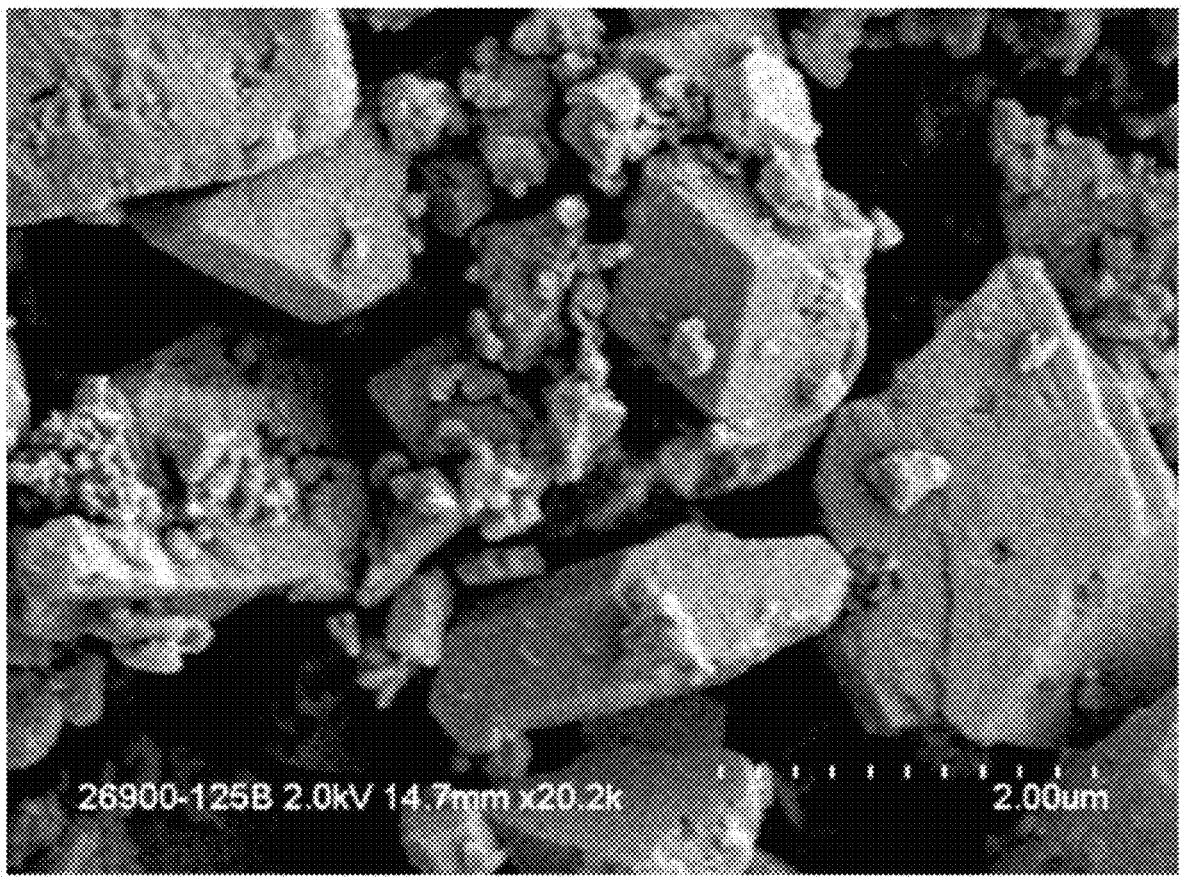
FIG. 7 is an SEM micrograph of a borosilicate Rho molecular sieve of the present invention.

Example 7. Example 5 (seeded synthesis) was repeated with LUDOX™ LS-30 (available from du Pont) as the silica source and only 10 days of reaction time. The produced borosilicate Rho molecular sieve was pure Rho (less than 0.1 wt % amorphous product). FIG. 7 is an SEM micrograph of the product.

Figure 8A:
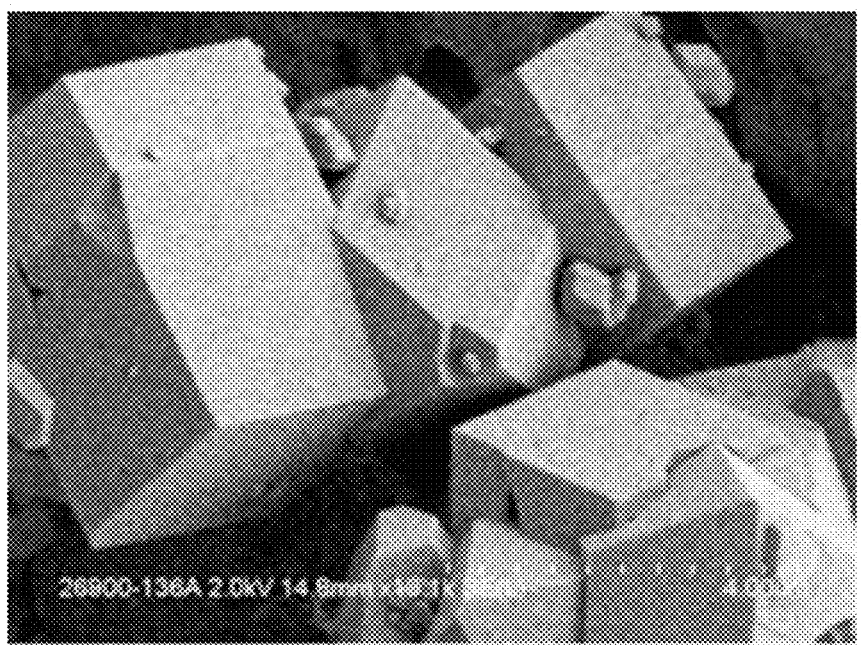
FIGS. 8A and 8B are SEM micrographs of a borosilicate Rho molecular sieve of the present invention.
Figure 8B:
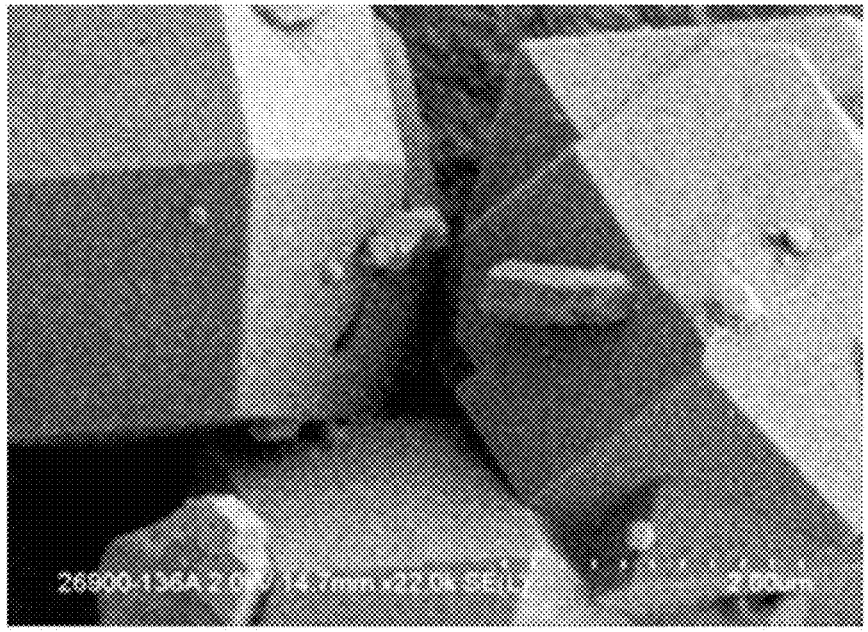

Example 8. Example 4 (seeded synthesis) was repeated with TMOS as the silica source, with a molar ratio of water to atomic Si in the reaction mixture of 7, and only 7 days of reaction time. The produced borosilicate Rho molecular sieve was pure Rho. FIGS. 8A and 8B are SEM micrographs of the product.

Example 9. In the table and the following tables below, unless stated otherwise, syntheses were carried out in 1.5-mL wells of a parallel reactor synthesis reactor. Each of the syntheses used a stainless steel liner with a steel ball. Several aluminosilicate Rho molecular sieves and borosilicate Rho molecular sieves were prepared using Compound Y as the SDA and according to the reaction mixture components, reaction conditions, and product description provided in Table 13. Please specify which SDA is used—different from the one above. The boron source was 3.47 wt % boric acid in water. The potassium source was 17.54 wt % KOH in water. The sodium source was 2 wt % to 10 wt % NaOH in water. The reaction temperature was 160° C.

TABLE 13

| Sample No. | SDA:Si (molar) | H₂O:Si (molar) | Silica Source[a], Si:Al (molar) | Si:B (molar) | OH:Si (molar) | K:Si (molar) | Na:Si (molar) | HCl:Si (molar) | Reaction Time (days) | Results |
|---|---|---|---|---|---|---|---|---|---|---|
| 9.1 | 0.15 | 44 | L, 10[b] | — | 0.60 | 0.15 | 0.15 | 0.30 | 4 | AlSi-RHO and impurities |
| 9.2 | 0.15 | 49 | A, 40[b] | — | 1.00 | 0 | 0.70 | 0.25 | 4 | pure AlSi-RHO |
| 9.3 | 0.15 | 57 | A, 40[b] | — | 1.30 | 0 | 1 | 0.55 | 4 | AlSi-RHO and impurities |
| 9.4 | 0.15 | 53 | L, — | 5 | 0.40 | 0 | 0.10 | 0 | 14 | pure BSi-RHO |
| 9.5 | 0.10 | 35 | L, — | 10 | 0.30 | 0.10 | 0 | 0 | 14 | BSi-RHO and impurities |
| 9.6 | 0.15 | 37 | L, 10[c] | — | 0.60 | 0 | 0.30 | 0 | 7 | AlSi-RHO and impurities |

[a]L was LUDOX™ LX-30 (30 wt % SiO₂); A was AERODISP™ W7330N (30 wt % SiO₂).
[b]The aluminum source was USALCO™ LSA (8.86 wt % in water).
[c]The aluminum source was kaolin.

Example 10. Several aluminophosphate LTA molecular sieves and silicoaluminophosphate LTA molecular sieves were prepared according to the reaction mixture components and relative concentrations and product descriptions provided in Table 14. The alumina source was 69.3 wt % CATAPAL™ A (aluminum hydrate, available from SASOL) in water. The phosphorus source was 50 wt % phosphoric acid in water. The reaction time was 4 days and the reaction temperature was 160° C.

TABLE 14

| Sample No. | SDA used, SDA:T[a] (molar) | H₂O:T (molar) | Al:T (molar) | P:Al (molar) | Silica Source[b], Si:Al (molar) | HF:Si (molar) | Metal cation Source[c], Metal cation:T (molar) | Results |
|---|---|---|---|---|---|---|---|---|
| 10.1 | Cmpd X, 0.12 | 23 | 0.47 | 1.00 | A, 0.15 | 1.55 | 0 | LTA/amorphous |
| 10.2 | Cmpd X, 0.13 | 24 | 0.50 | 1.00 | 0 | 0 | 0 | LTA |
| 10.3 | Cmpd X, 0.14 | 29 | 0.44 | 1.25 | 0 | 0 | Mg, 0.11 | LTA/amorphous |
| 10.4 | Cmpd X, 0.11 | 30 | 0.44 | 1.00 | L, 0.3 | 0.72 | 0 | LTA/amorphous |
| 10.5 | Cmpd X, 0.11 | 35 | 0.44 | 1.00 | L, 0.3 | 0 | 0 | LTA |
| 10.6 | Cmpd Y, 0.25 | 30 | 0.50 | 1.00 | 0 | 0 | 0 | LTA |
| 10.7 | Cmpd Y, 0.22 | 30 | 0.44 | 1.00 | L, 0.3 | 0 | 0 | LTA |
| 10.8 | Cmpd Z, 0.13 | 30 | 0.47 | 1.11 | 0 | 0 | Mg, 0.053 | LTA, AFI |
| 10.9 | Cmpd Z, 0.13 | 31 | 0.47 | 1.11 | 0 | 0 | Ni, 0.10 | LTA/amorphous |

[a]T is the molar sum of aluminum, phosphorus, and silicon atoms in the reaction mixture.
[b]L was LUDOX™ LS-30 (30 wt % SiO₂); A was AERODISP™ W7330 (30 wt % SiO₂).
[c]The magnesium cation source was magnesium nitrate; the nickel cation source was nickel nitrate.

Example 11. A molecular sieve was prepared using Compound Y as the SDA, a molar ratio of SDA to Si of 0.125, a molar ratio of tetramethylammonium hydroxide to Si of 0.25, and a molar ratio of F to Si of 0.5. The synthesis was carried out for 8 days at 150° C. The resulting molecular sieve product was about 60 wt % LTA and 40 wt % AST.

Example 12. Compound AA was prepared by adding to a 125-mL Teflon insert 14.8 g 2,3-lutidine and 25.0 g 1-bromo-3-phenylpropane. To this, 60 mL acetonitrile solvent was added. The liner was then capped, placed inside a 125-mL Parr steel autoclave, and then heated 16 hours at 90° C. The autoclave was removed and cooled to room temperature. The solvent was then removed from the mixture by rotoevaporation, and the solid residues were washed with ethyl ether to remove unreacted reagents. After the solid was air dried, the total yield was 95%. The product purity was verified by $^1$H and $^{13}$C NMR. The compound was converted to its hydroxide form in a batch reaction by dissolving it in deionized water and adding it to a 3-fold excess of Dowex anion-exchange resin. After about 12 hours, the solution was isolated by filtration and washing the resin with deionized water. The combined aqueous fractions were then concentrated in a rotoevaporator to obtain a 15.7 wt % solution was determined by titration with a 0.1 M HCl solution.

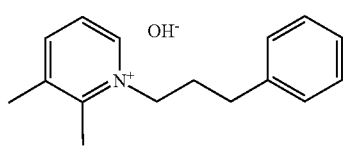

Compound AA

Several aluminosilicate and borosilicate molecular sieves were prepared according to the reaction mixture components, reaction conditions, and product descriptions provided in Table 15. The SDA was Compound AA with the OH⁻ counter ion (an embodiment of Compound E).

TABLE 15

| Sample No. | Silica Source[a], SDA:Si (molar) | H₂O:Si (molar) | Si:T[III] (molar) | MOH:Si (M, molar) | T[III] Source[b] | HCl:Si (molar) | Time (days), Temp (° C.) | Results |
|---|---|---|---|---|---|---|---|---|
| 12.1 | L, 0.3 | 39 | 40, Al | Na, 0.30 | S | 0.3 | 7, 160 | RTH |
| 12.2 | L, 0.3 | 38 | 40, Al | Na, 0.30 | S | 0.2 | 7, 160 | RTH |
| 12.3 | L, 0.3 | 35 | 40, Al | Na, 0.15 | S | 0.2 | 7, 160 | RTH |
| 12.4 | L, 0.3 | 43 | 20, B | Na, 0.30 | B | 0.3 | 7, 160 | RTH |
| 12.5 | L, 0.3 | 41 | 10, B | Na, 0.10 | B | 0 | 7, 160 | RTH |
| 12.6 | A, 0.3 | 41 | 20, B | Na, 0.30 | B | 0 | 7, 160 | Unidentified |
| 12.7 | A, 0.2 | 30 | 20, B | Na, 0.10 | B | 0 | 7, 160 | IFW |
| 12.8 | L, 0.3 | 51 | 5, B | Na, 0.10 | B | 0 | 7, 160 | IFW |
| 12.9 | L, 0.2 | 41 | 10, B | Li, 0.30 | B | 0 | 7, 160 | IFW |
| 12.10 | L, 0.2 | 48 | 5, B | K, 0.30 | B | 0.1 | 7, 160 | IFW |
| 12.11 | L, 0.2 | 51 | 5, B | Li, 0.30 | B | 0.1 | 7, 160 | RTH |
| 12.12 | L, 0.3 | 41 | 10, B | Na, 0.10 | B | 0 | 7, 160 | IFW |
| 12.13 | L, 0.2 | 34 | 10, B | K, 0.10 | B | 0 | 7, 160 | IFW |
| 12.14 | L, 0.3 | 30 | 40, Al | 0 | M | 0 | 7, 160 | RTH, IWV |
| 12.15 | L, 0.3 | 34 | 10, Al | Na, 0.30 | Y | 0 | 7, 160 | IWV, MOR |
| 12.16 | L, 0.3 | 41 | 10, Al | Na, 0.30 | S | 0.3 | 7, 160 | RTH |
| 12.17 | L, 0.3 | 34 | 40, Al | Na, 0.15 | S | 0 | 28, 120 | RTH |
| 12.18 | L, 0.3 | 41 | 20, B | Na, 0.30 | B | 0 | 28, 120 | RTH |
| 12.19 | L, 0.3 | 38 | 10, Al | Li, 0.30 | M | 0.3 | 28, 160 | RTH |
| 12.20[c] | L, 0.3 | 42 | 10, Al | K, 0.15 | S | 0.3 | 28, 160 | RTH |
| 12.21[d] | L, 0.3 | 39 | 5, Al | K, 0.15 | S | 0.3 | 28, 160 | RTH |
| 12.22 | L, 0.3 | 40 | 20, Al | Na, 0.30 | S | 0.3 | 28, 120 | RTH |
| 12.23 | L, 0.3 | 30 | 40, Al | 0 | M | 0 | 28, 160 | IWV/RTH (~60/40) |

[a]L was LUDOX™ HS-30 (30 wt % SiO₂); A was AERODISP™ W7330 (30 wt % SiO₂).
[b]S was 8.86% sodium aluminate solution, B was 3.47% boric acid solution, M was MS-25 amorphous silica/alumina (65.5% silica-22% alumina) and Y was USY zeolite (Si/Al = 3.05).
[c]The reaction mixture also included NaOH in a ratio Na:Si was 0.10.
[d]The reaction mixture also included NaOH in a ratio Na:Si was 0.20.

Figure 9:
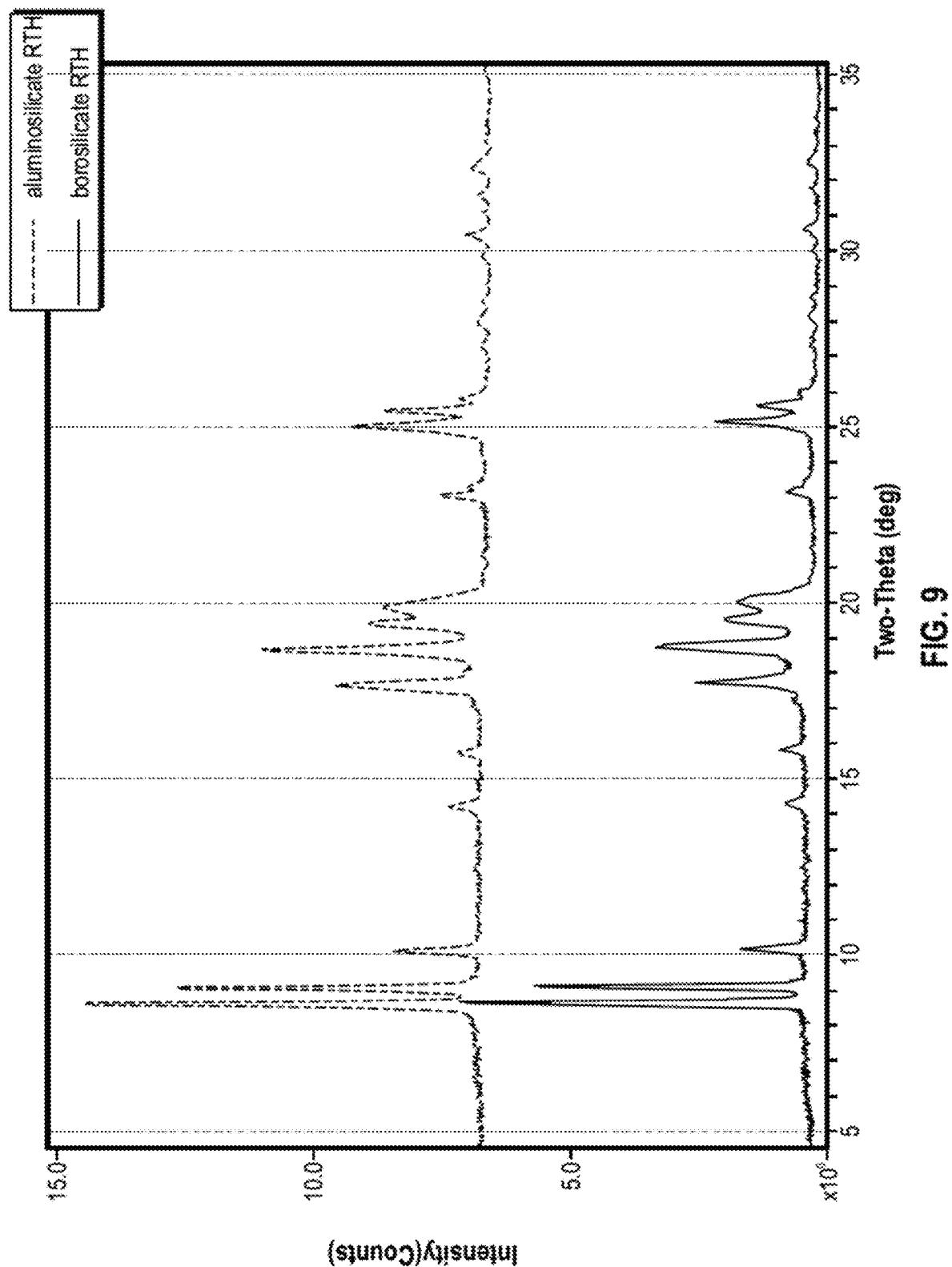
FIG. 9 is a plot of the x-ray diffraction (XRD) patterns for an aluminosilicate Rth molecular sieve (top plot) and a borosilicate Rth molecular sieve (bottom plot).

FIG. 9 is a plot of the XRD patterns for Example 12.22 (aluminosilicate Rth molecular sieve, top plot) and Example 12.5 (borosilicate Rth molecular sieve, bottom plot).

Figure 10:
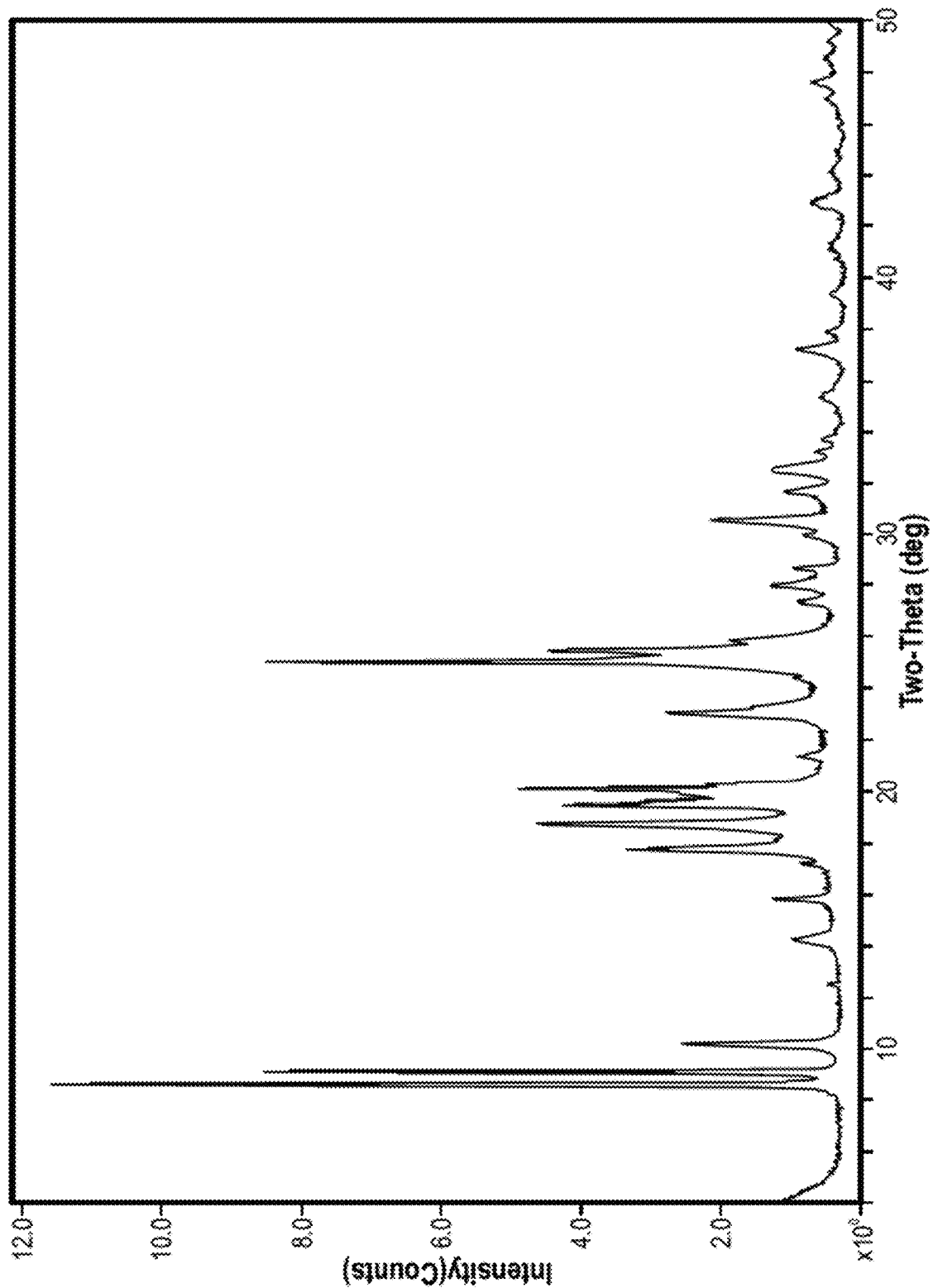
FIG. 10 is a plot of the XRD pattern of a borosilicate having a pure RTH-type phase.
Figure 11A:
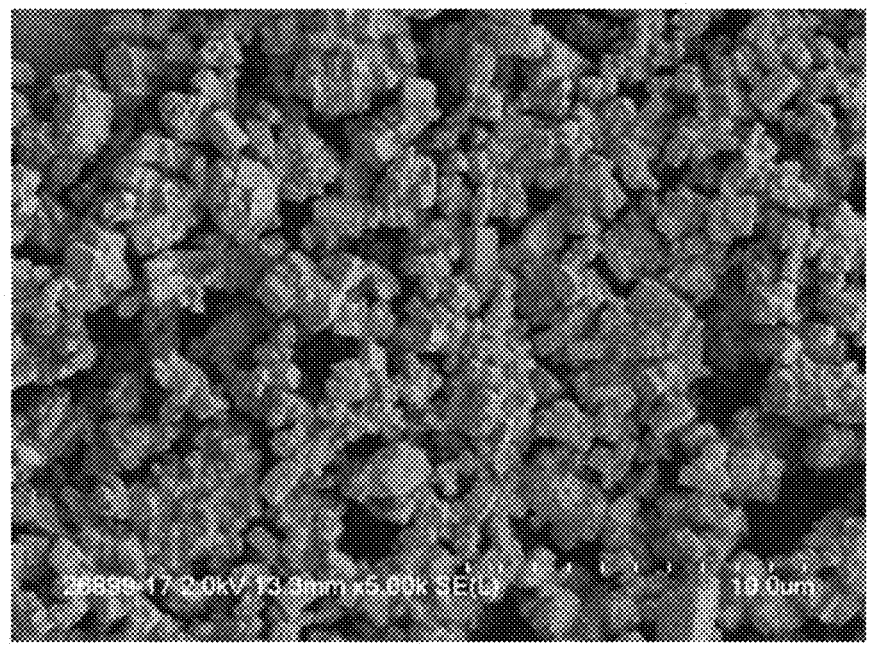
FIGS. 11A and 11B are SEM micrographs of the borosilicate having a pure RTH-type phase of FIG. 10.
Figure 11B:
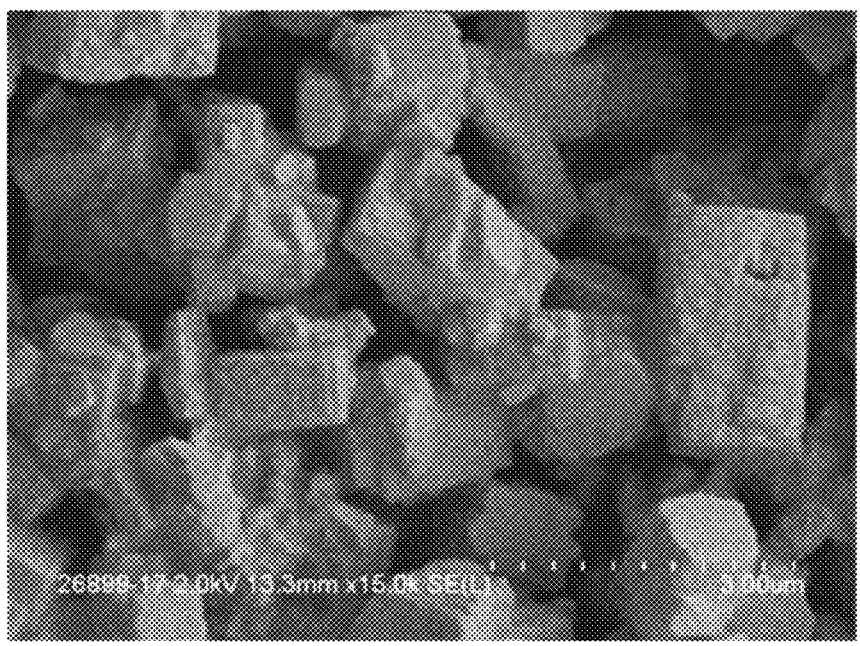

Sample 12.14 synthesis was repeated on a large scale in a 23-mL Steel Parr autoclave but with molar ratio of Si to Al of 20 rather than 40. After 17 days of heating at 160° C., a pure RTH-type phase was obtained. FIG. 10 is a plot of the XRD pattern. Table 16 provides the peak positions for the XRD pattern. FIGS. 11A and 11B are SEM micrographs of the product.

TABLE 16

| 2-Theta (°) | d (Å) | Relative Peak Height Intensity |
|---|---|---|
| 8.62 | 10.24 | 100 |
| 9.10 | 9.71 | 73 |
| 10.16 | 8.70 | 19.4 |
| 12.52 | 7.07 | 1.3 |
| 14.24 | 6.22 | 5.4 |
| 15.81 | 5.60 | 7.6 |
| 17.19 | 5.16 | 2.1 |
| 17.74 | 4.99 | 21.9 |
| 18.72 | 4.74 | 31.8 |
| 19.44 | 4.56 | 31.1 |
| 19.56 | 4.53 | 21.3 |
| 19.92 | 4.45 | 17.5 |
| 20.10 | 4.42 | 41 |
| 20.28 | 4.38 | 15.1 |
| 21.38 | 4.15 | 3.4 |
| 23.05 | 3.86 | 20.1 |
| 23.35 | 3.81 | 8.1 |
| 24.35 | 3.65 | 3.2 |
| 25.05 | 3.55 | 81.9 |
| 25.16 | 3.53 | 27.1 |

TABLE 16-continued

| 2-Theta (°) | d (Å) | Relative Peak Height Intensity |
|---|---|---|
| 25.47 | 3.50 | 37.2 |
| 25.88 | 3.44 | 12.4 |
| 27.32 | 3.26 | 4.1 |
| 27.98 | 3.19 | 8.2 |
| 28.25 | 3.16 | 1.9 |
| 28.66 | 3.11 | 5.9 |
| 29.96 | 2.98 | 3.8 |
| 30.57 | 2.92 | 16.8 |
| 31.31 | 2.85 | 0.9 |
| 31.63 | 2.83 | 7.4 |
| 32.41 | 2.76 | 9.1 |
| 33.23 | 2.69 | 3.1 |
| 33.70 | 2.66 | 2.4 |
| 35.38 | 2.54 | 2.3 |

In addition, several aluminosilicate, borosilicate, and germanosilicate molecular sieves were prepared according to the reaction mixture components, reaction conditions, and product descriptions provided in Table 17. The silica source was TMOS. The SDA was Compound AA with the OH⁻ counter ion.

TABLE 17

| Sample No. | SDA:Si (molar) | H₂O:Si (molar) | Si:T$^{III/IV}$ (molar) | T$^{III/IV}$ Source[b] | HF:Si (molar) | Time (days), Temp (° C.) | Results |
|---|---|---|---|---|---|---|---|
| 12.24 | 0.5 | 4.00 | 0 | — | 0.5 | 10, 150 | IWV |
| 12.25 | 0.5 | 4.00 | 0 | — | 0.5 | 10, 150 | IWV |
| 12.26 | 0.5 | 4.00 | 0 | — | 0.5 | 10, 150 | IWV |
| 12.27 | 0.5 | 4.00 | 50, Al | N | 0.5 | 10, 150 | RTH, amorph. |
| 12.28 | 0.5 | 4.00 | 5, B | B | 0.5 | 10, 150 | RTH, IWV |
| 12.29 | 0.5 | 4.00 | 0 | — | 0.5 | 7, 175 | IWV |
| 12.30 | 0.5 | 4.00 | 0 | — | 0.5 | 7, 175 | IWV |
| 12.31 | 0.5 | 11.4 | 7.3, Ge | G | 0.6 | 7, 175 | IWV |
| 12.32 | 0.5 | 10.0 | 5, B | B | 0.5 | 28, 150 | RTH, layered |
| 12.33 | 0.5 | 4.00 | 10, B | B | 0.5 | 28, 150 | L, RTH, trace IFW |
| 12.34 | 0.5 | 40.0 | 10, B | B | 0.5 | 28, 150 | IWV, trace L |
| 12.35 | 0.5 | 10.0 | 0 | — | 0.5 | 28, 150 | IWV, amorph. |
| 12.36[b] | 0.5 | 4.00 | 0 | — | 0.5 | 28, 150 | IWV, trace L |
| 12.37[c] | 0.5 | 4.00 | 0 | — | 0.5 | 28, 150 | IWV, trace L |
| 12.38 | 0.5 | 4.00 | 50, Al | N | 0.5 | 28, 150 | RTH, amorph. |
| 12.39 | 0.6 | 4.55 | 7.3, Ge | G | 0.6 | 28, 150 | IWV, amorph. |

[a]B was 3.47% boric acid solution, N was aluminum nitrate, and G was germanium oxide.
bThe reaction mixture included ITQ-24 seeds.
cThe reaction mixture included ITQ-33 seeds.
L = layered phase Example 13. Several aluminosilicate and borosilicate molecular sieves were prepared according to the reaction mixture components, reaction conditions, and product descriptions provided in Table 18. The SDA was Compound AB with the OH⁻ counter ion (an embodiment of Compound E). Compound AB was prepared in similar fashion to that of compound AA except that an equimolar quantity of 2,3,5-collidine was used to replace the 2,3-lutidine.

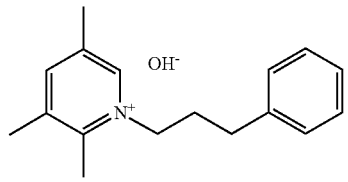

Compound AB

TABLE 18

| Sample No. | Silica Source[a], SDA:Si (molar) | H₂O:Si (molar) | Si:T$^{III}$ (molar) | MOH:Si (M, molar) | T$^{III}$ Source[b] | HCl:Si (molar) | Time (days), Temp (° C.) | Results |
|---|---|---|---|---|---|---|---|---|
| 13.1 | A, 0.2 | 33 | 20, B | Na, 0.10 | B | 0 | 7, 160 | IWV |
| 13.2 | A, 0.3 | 44 | 10, Al | Na, 0.30 | S | 0 | 7, 160 | ITE, MOR |
| 13.3 | L, 0.3 | 40 | 20, Al | Na, 0.30 | Y | 0 | 7, 160 | FAU, ITE |
| 13.4 | L, 0.3 | 41 | 20, Al | Na, 0.30 | M | 0 | 7, 160 | ITE, amorph. |
| 13.5 | L, 0.3 | 44 | 40, Al | Na, 0.30 | S | 0.2 | 7, 160 | ITE, minor MOR |
| 13.6 | L, 0.3 | 46 | 10, Al | Na, 0.30 | S | 0.3 | 7, 160 | ITE |
| 13.7[c] | L, 0.3 | 35 | 40, Al | 0 | M | 0 | 28, 160 | ITE |
| 13.8[d] | L, 0.3 | 35 | 40, Al | 0 | M | 0 | 28, 160 | ITE |
| 13.9[e] | L, 0.3 | 35 | 20, Al | 0 | M | 0 | 28, 160 | ITE |
| 13.10 | L, 0.3 | 42 | 20, Al | K, 0.30 | K | 0.3 | 28, 160 | IWV, quartz |
| 13.11[f] | L, 0.3 | 36 | 100, B | 0 | B | 0 | 28, 160 | Unidentified |
| 13.12 | L, 0.3 | 43 | 20, Al | Na, 0.30 | S | 0 | 28, 120 | ITE |
| 13.13 | L, 0.3 | 42 | 40, Al | Na, 0.30 | S | 0 | 28, 120 | ITE |

TABLE 18-continued

| Sample No. | Silica Source[a], SDA:Si (molar) | H$_2$O:Si (molar) | Si:T[III] (molar) | MOH:Si (M, molar) | T[III] Source[b] | HCl:Si (molar) | Time (days), Temp (° C.) | Results |
|---|---|---|---|---|---|---|---|---|
| 13.14 | L, 0.3 | 44 | 10, Al | Li, 0.30 | M | 0.3 | 28, 160 | ITE, minor layered |
| 13.15 | L, 0.3 | 45 | 5, Al | K, 0.15 | M | 0.3 | 28, 160 | ITE, amorph. |
| 13.16 | L, 0.3 | 53 | 5, Al | Na, 0.30 | S | 0.3 | 28, 160 | ITE |
| 13.17 | L, 0.3 | 40 | 20, Al | Na, 0.30 | Y | 0 | 28, 160 | ITE |
| 13.18 | L, 0.3 | 41 | 20, Al | Na, 0.30 | MK | 0 | 28, 160 | ITE, amorph. |

[a]L was LUDOX ™ HS-30 (30 wt % SiO$_2$); A was AERODISP ™ W7330 (30 wt % SiO$_2$).
[b]S was 8.86% sodium aluminate solution, B was 3.47% boric acid solution, M was MS-25, MK is metakaolin, K was potassium aluminate, and Y was Y molecular sieve.
[c]The reaction mixture included ITQ-21 seeds.
[d]The reaction mixture included ITQ-24 seeds.
[e]The reaction mixture included ITQ-33 seeds.
[f]The ratio of Si:Ti was 100, anatase.

Table 19 provides the peaks of the XRD pattern for Sample 13.9.

TABLE 19

| 2-Theta (°) | d (Å) | Relative Peak Height Intensity |
|---|---|---|
| 6.52 | 13.54 | 100 |
| 6.98 | 12.66 | 7.4 |
| 8.02 | 11.02 | 43.8 |
| 9.48 | 9.32 | 3.4 |
| 12.60 | 7.02 | 1.5 |
| 12.94 | 6.84 | 11 |
| 14.50 | 6.11 | 2.7 |
| 15.60 | 5.68 | 0.5 |
| 17.72 | 5.00 | 1 |
| 18.22 | 4.86 | 9.3 |
| 18.84 | 4.71 | 10.9 |
| 19.90 | 4.46 | 2.4 |
| 20.96 | 4.24 | 4 |
| 21.81 | 4.07 | 1.7 |
| 23.38 | 3.80 | 5.7 |
| 24.66 | 3.61 | 4.4 |
| 25.36 | 3.51 | 1.6 |
| 26.06 | 3.42 | 3.8 |
| 26.62 | 3.35 | 4.4 |

Figure 12:
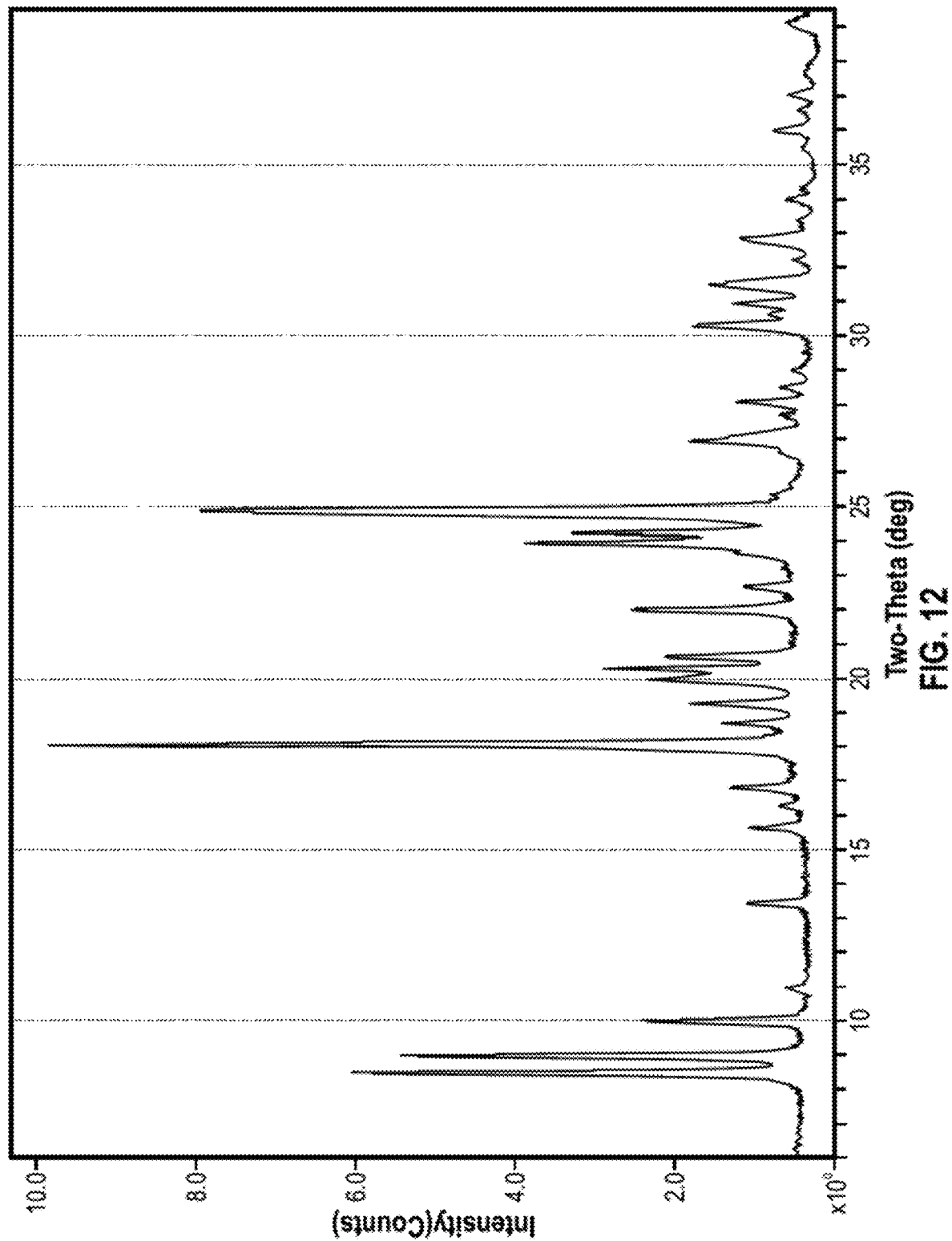
FIG. 12 is a plot of the XRD pattern of an aluminosilicate having a pure ITE-type phase.
Figure 13A:
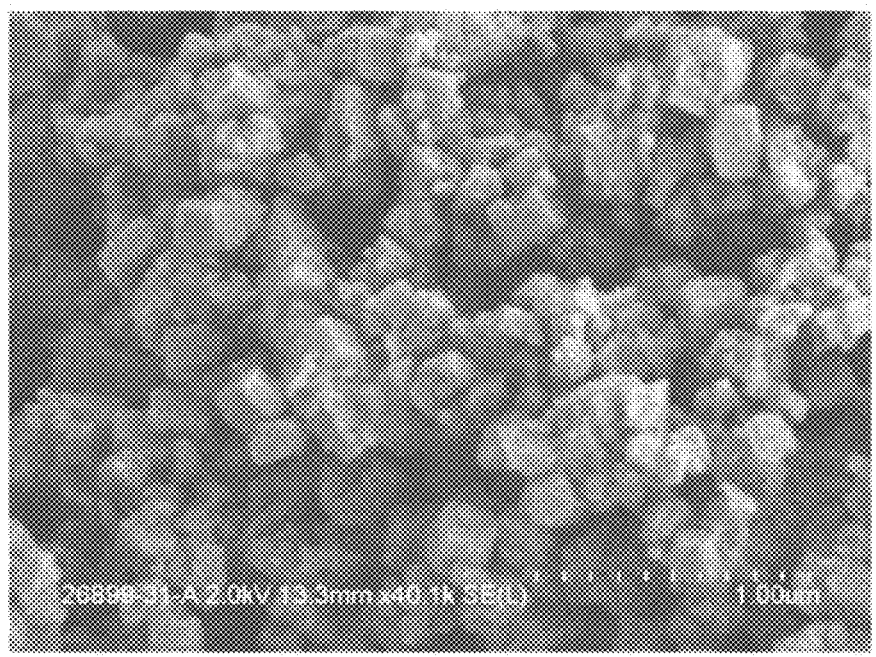
FIGS. 13A and 13B are SEM micrographs of the aluminosilicate having a pure ITE-type phase of FIG. 12.
Figure 13B:
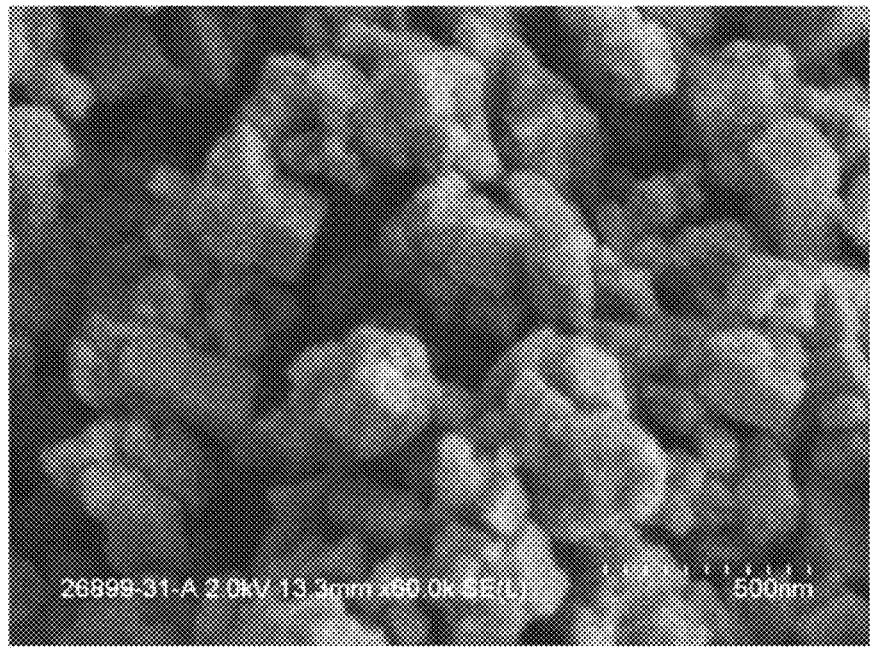

Sample 13.9 synthesis was repeated on a larger scale within a 45-mL steel Parr autoclave except with seeds of the ITE molecular sieve from the Sample 13.9. To a 45-mL Teflon insert were added 11.1 g of the SDAOH solution ([OH]=0.90 mmol/g), 5.6 g LUDOX™ LS-30 colloidal silica, 7.9 g distilled water, 0.37 g MS-25, 19 mg ITQ-33 seeds, and 20 mg of Sample 13.9 seeds. The liner was then capped, sealed within a 45-mL steel Parr autoclave, and placed within an oven with a rotating spit. The reactor was tumbled at about 30 rpm. After 7 days of heating at 160° C., a pure ITE-type phase molecular sieve was obtained. FIG. 12 is the XRD pattern of the resultant product, and Table 20 provides the peaks of the XRD pattern. FIGS. 13A and 13B are SEM micrographs of the resultant product.

TABLE 20

| 2-Theta (°) | d (Å) | Relative Peak Height Intensity |
|---|---|---|
| 8.49 | 10.41 | 56.3 |
| 8.98 | 9.84 | 49.4 |
| 9.99 | 8.85 | 20.4 |
| 10.96 | 8.07 | 2.5 |
| 13.44 | 6.59 | 7.5 |
| 15.65 | 5.66 | 6.9 |
| 16.27 | 5.44 | 2.4 |
| 16.81 | 5.27 | 8.3 |
| 17.31 | 5.12 | 0.3 |
| 18.06 | 4.91 | 100 |
| 18.68 | 4.75 | 9.5 |
| 19.26 | 4.60 | 13.1 |
| 19.94 | 4.45 | 19.4 |
| 20.06 | 4.42 | 14.2 |
| 20.26 | 4.38 | 24.8 |
| 20.62 | 4.30 | 17.2 |
| 22.00 | 4.04 | 22.3 |
| 22.65 | 3.92 | 7.2 |
| 23.63 | 3.76 | 7.1 |
| 23.93 | 3.72 | 37.1 |
| 24.23 | 3.67 | 30.2 |
| 24.89 | 3.58 | 82.3 |
| 25.36 | 3.51 | 2.6 |
| 26.60 | 3.35 | 2.4 |
| 26.92 | 3.31 | 14.9 |
| 27.10 | 3.29 | 7.5 |
| 27.68 | 3.22 | 3.1 |
| 28.06 | 3.18 | 9.8 |
| 28.49 | 3.13 | 3.5 |
| 38.99 | 3.08 | 2 |
| 30.27 | 2.95 | 15.7 |
| 30.61 | 2.92 | 5.4 |
| 30.91 | 2.89 | 10.2 |
| 31.45 | 2.84 | 12.8 |
| 32.21 | 2.78 | 2.4 |
| 32.84 | 2.72 | 9.2 |
| 33.36 | 2.68 | 1.8 |
| 33.98 | 2.64 | 3.9 |
| 34.28 | 2.61 | 1.5 |
| 35.42 | 2.53 | 1.4 |
| 35.98 | 2.49 | 6.2 |
| 36.58 | 2.45 | 2.1 |
| 37.03 | 2.43 | 3.7 |

The above described, scaled-up synthesis using Sample 13.9 seeds was repeated but without seeds. After 12 days, a pure ITE-type phase molecular sieve was obtained.

In addition, several aluminosilicate, borosilicate, and germanosilicate molecular sieves were prepared according to the reaction mixture components, reaction conditions, and product descriptions provided in Table 21. The silica source was TMOS. The SDA was Compound AB with the OH⁻ counter ion.

TABLE 21

| Sample No. | SDA:Si (molar) | H₂O:Si (molar) | Si: T$^{III/IV}$ (molar) | T$^{III/IV}$ Source[a] | HF:Si (molar) | Time (days), Temp (° C.) | Results |
|---|---|---|---|---|---|---|---|
| 13.19[b] | 0.5 | 4.00 | 0 | | 0.5 | 14, 150 | IWV |
| 13.20 | 0.5 | 4.00 | 50, Al | N | 0.5 | 7, 175 | IWV, layered |
| 13.21 | 0.5 | 10.0 | 50, Al | N | 0.5 | 7, 175 | IWV, minor amorph. |
| 13.22 | 0.6 | 4.54 | 7.3, Ge | G | 0.6 | 7, 175 | IWV, minor layered |
| 13.23 | 0.6 | 5.00 | 4.0, Ge | G | 0.6 | 7, 175 | IWV |
| 13.24 | 0.6 | 11.4 | 7.3, Ge | G | 0.6 | 7, 175 | IWV |
| 13.25 | 0.6 | 12.5 | 4.0, Ge | G | 0.6 | 7, 175 | IWV, minor unidentified |
| 13.26 | 0.5 | 4.00 | 40, B | B | 0.5 | 7, 175 | IWV, minor layered |

[a]N was aluminum nitrate, G was germanium oxide, and B was 3.47% boric acid solution.
[b]The reaction mixture included ITQ-33 seeds.

Figure 14:
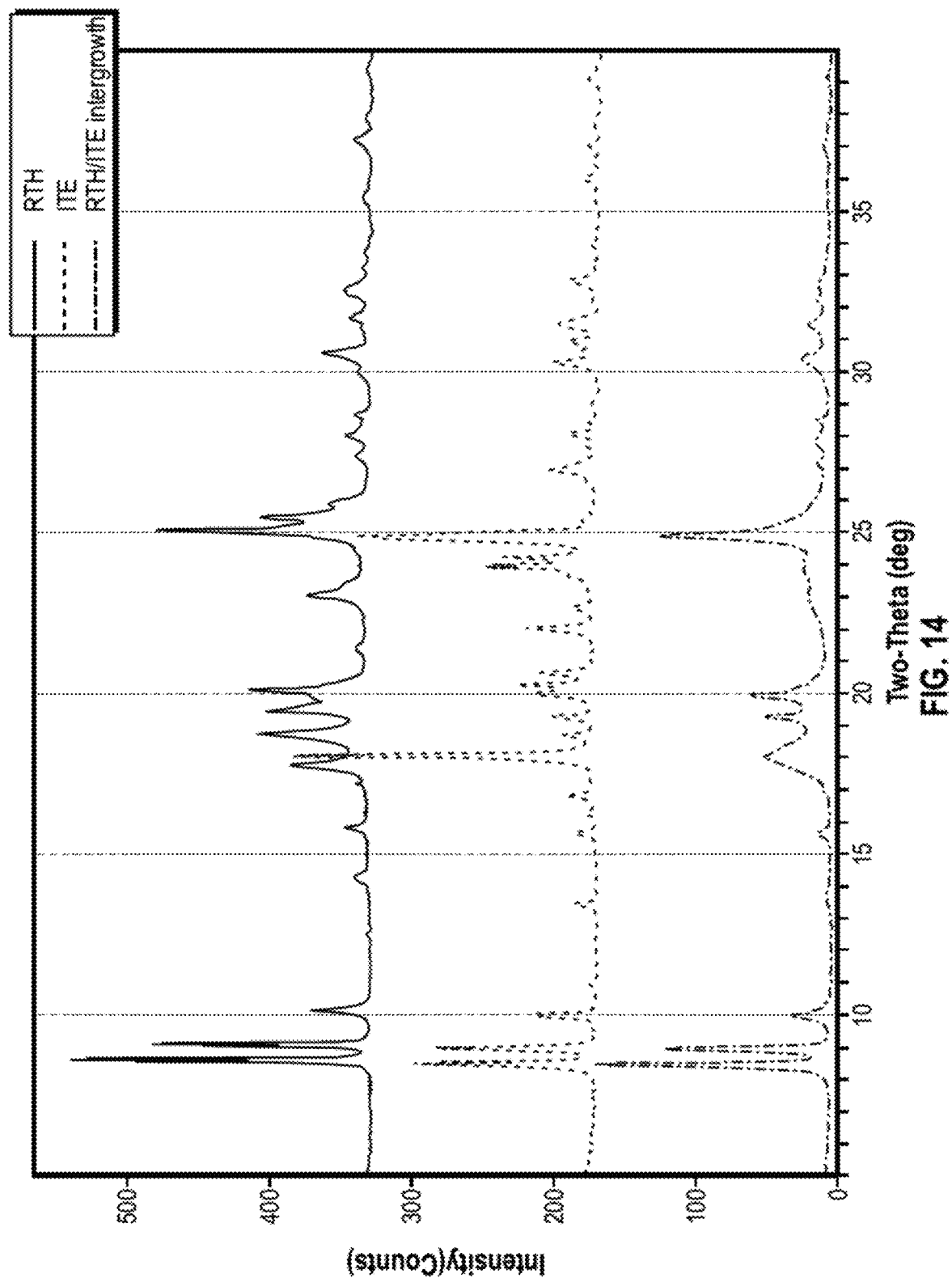
FIG. 14 is a plot of the XRD pattern of a ITE/RTH-type phase molecular sieve compared to pure ITE-type phase molecular sieve and a pure RTH-type phase molecular sieve.

Example 14. A random intergrowth framework of ITE/RTH was prepared by using a mixture of template SDA molecules that are respectively selective for the ITE or the RTH frameworks. To a 23-mL Teflon insert were added 2.78 g of SDA solution Compound AB (PM=0.90 mmol/g), 3.78 g SDA solution compound AA (PM=0.66 mmol/g), and 2.94 g deionized water. To this solution were added 2.80 g LUDOX™ LS-30 and 0.185 g MS-25 amorphous silica/alumina. The liner was then capped, sealed within a 23-mL steel Parr autoclave, and placed within an oven with a rotating spit. The reactor was tumbled at about 30 rpm. After 7 days of heating at 160° C., an ITE/RTH intergrowth phase was obtained. FIG. 14 compares the x-ray powder pattern of the intergrowth with those of the pure RTH and ITE framework products of previous examples. The broadening of particular features in the patterning is consistent with the simulations of Wagner et al.

Example 15. A borosilicate product having a mixture of IFW and IWV-type phases was prepared according to the reaction mixture components and reaction conditions provided in Table 22 using Compound AC with the OH⁻ counter ion (an embodiment of Compound E) as the SDA. The silica source was LUDOX™ HS-30 (30 wt % SiO₂) The boron source was 3.47% boric acid solution. Compound AC was prepared in similar fashion to Compound AA except 2,4-lutidine was used in lieu of 2,3-lutidine.

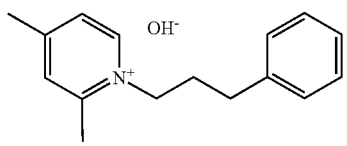

Compound AC

TABLE 22

| Sample No. | SDA:Si (molar) | H₂O:Si (molar) | Si:B (molar) | NaOH:Si (molar) | Time (days), Temp (° C.) | Results |
|---|---|---|---|---|---|---|
| 14.1 | 0.3 | 46 | 5 | 0.10 | 28, 160 | IFW, IWV (~50/50) |

Example 16. Several germanosilicate LTA molecular sieves were prepared according to the reaction mixture components, reaction conditions, and product descriptions provided in Table 23. The silica source was TMOS. The germanium source was germanium oxide. The SDA was Compound Z.

TABLE 23

| Sample No. | SDA:Si (molar) | H₂O:Si (molar) | Si:Ge (molar) | HF:Si (molar) | Time (days), Temp (° C.) | Results |
|---|---|---|---|---|---|---|
| 15.1 | 0.3 | 11.4 | 7.3 | 0.3 | 7, 175 | LTA |
| 15.2 | 0.3 | 12.5 | 4.0 | 0.2 | 7, 175 | LTA |
| 15.3 | 0.3 | 5.00 | 4.0 | 0.15 | 7, 175 | LTA, IWV |
| 15.4 | 0.3 | 4.50 | 7.3 | 0.3 | 7, 175 | LTA, IWV |

Example 17. A silicoaluminophosphate molecular sieve was prepared according to the reaction mixture components and reaction conditions provided in Table 24 using Compound AD with the OH⁻ counter ion (an embodiment of Compound J) as the SDA. The silica source was LUDOX™ LS-30. The alumina source was CATAPAL™ A. The phosphorus source was phosphoric acid. The reaction time was 4 days at 160° C.

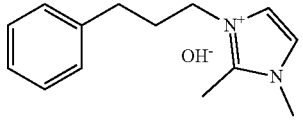

Compound AD

TABLE 24

| Sample No. | SDA:T[a] (molar) | H₂O:T (molar) | Al:T (molar) | P:Al (molar) | Si:Al (molar) | Results |
|---|---|---|---|---|---|---|
| 16.1 | 0.44 | 21 | 0.44 | 1 | 0.3 | SAS/amorph. |

[a]T is the molar sum of aluminum, phosphorus, and silicon atoms.

Example 18. Several aluminosilicate and borosilicate molecular sieves were prepared according to the reaction mixture components, reaction conditions, and product descriptions provided in Table 25. The SDA was Compound AD with the OH⁻ counter ion.

TABLE 25

| Sample No. | Silica Source[a], SDA:Si (molar) | H$_2$O:Si (molar) | Si:T$^{III}$ (molar) | MOH:Si (M, molar) | T$^{III}$ Source[b] | HCl:Si (molar) | Time (days), Temp (° C.) | Results |
|---|---|---|---|---|---|---|---|---|
| 17.1 | A, 0.2 | 30 | B, 20 | Na, 0.10 | B | 0 | 4, 160 | Unidentified, minor IFW |
| 17.2 | L, 0.3 | 30 | B, 40 | K, 0.15 | B | 0.15 | 7, 160 | IFW |
| 17.3 | L, 0.3 | 41 | B, 5 | Na, 0.10 | B | 0 | 7, 160 | IFW |
| 17.4 | A, 0.3 | 30 | Al, 40 | K, 0.30 | K | 0.15 | 7, 160 | IFW, potassium H silicate |
| 17.5 | L, 0.3 | 32 | B, 40 | Li, 0.30 | B | 0.3 | 7, 160 | IFW, layered Li silicate |
| 17.6 | L, 0.3 | 30 | Al, 40 | Na, 0.30 | S | 0.2 | 7, 160 | RTH, quartz |
| 17.7 | L, 0.3 | 30 | Al, 20 | Na, 0.30 | S | 0.3 | 7, 160 | RTH, quartz, trace kenyaite |
| 17.8 | L, 0.3 | 30 | Al, 40 | K, 0.30 | K | 0.15 | 7, 160 | unidentified |
| 17.9 | L, 0.3 | 32 | B, 10 | Na, 0.10 | B | 0 | 28, 160 | IFW |
| 17.10 | L, 0.2 | 30 | B, 10 | K, 0.10 | B | 0 | 28, 160 | IFW |
| 17.11 | L, 0.3 | 41 | B, 5 | Na, 0.10 | B | 0 | 28, 160 | IFW |
| 17.12 | L, 0.3 | 30 | Al, 10 | K, 0.30 | K | 0.3 | 28, 160 | ~70 IFW/30 orthoclase |
| 17.13 | L, 0.3 | 30 | Al, 40 | K, 0.30 | K | 0.15 | 28, 160 | ~80 IFW/20 quartz |
| 17.14 | L, 0.3 | 30 | B, 40 | K, 0.15 | B | 0 | 28, 120 | IFW |
| 17.15 | L, 0.3 | 31 | B, 20 | Na, 0.30 | B | 0 | 28, 120 | IFW |
| 17.16[c] | L, 0.3 | 30 | Al, 20 | 0 | M | 0 | 28, 160 | RTH |
| 17.17 | L, 0.3 | 30 | Al, 5 | K, 0.15 | M | 0 | 28, 120 | RTH, amorph. |
| 17.18 | L, 0.3 | 30 | Al, 40 | Na, 0.15 | S | 0 | 28, 120 | RTH |
| 17.19 | L, 0.3 | 30 | Al, 20 | Na, 0.30 | S | 0 | 28, 120 | RTH |
| 17.20[f] | L, 0.3 | 30 | B, 100 | 0 | B | 0 | 28, 160 | MWW |
| 17.21[d] | L, 0.3 | 30 | Al, 20 | 0 | M | 0 | 28, 160 | MWW |
| 17.22[e] | L, 0.3 | 30 | Al, 40 | 0 | M | 0 | 28, 160 | MWW |
| 17.23[e] | L, 0.3 | 30 | Al, 500 | 0 | M | 0 | 28, 160 | MWW |
| 17.24[e] | L, 0.3 | 30 | Al, 40 | 0 | M | 0 | 28, 160 | MWW |
| 17.25[e] | L, 0.3 | 30 | Al, 500 | 0 | M | 0 | 28, 160 | MWW |
| 17.26 | A, 0.2 | 30 | B, 20 | Na, 0.10 | B | 0 | 28, 160 | ~70/30 IFW, quartz |
| 17.27 | L, 0.3 | 30 | Al, 5 | Na = K = 0.15 | S | 0.3 | 28, 160 | IFW, MWW, amorph. |
| 17.28 | L, 0.3 | 32 | Al, 10 | Na = K = 0.15 | S | 0.3 | 28, 160 | IFW, minor ANA |
| 17.29 | L, 0.3 | 34 | Al, 5 | Na, 0.30 | S | 0.3 | 28, 160 | ~60/40 IFW, ANA |
| 17.30 | L, 0.3 | 30 | Al, 10 | Na, 0.30 | Y | 0 | 28, 160 | ~60/40 IFW, ANA |
| 17.31 | L, 0.3 | 35 | B, 20 | Li, 0.30 | B | 0.3 | 28, 120 | IFW, minor lithium silicate |
| 17.32 | L, 0.3 | 33 | B, 20 | Na, 0.30 | B | 0.3 | 28, 120 | IFW |
| 17.33 | L, 0.3 | 30 | B, 40 | K, 0.15 | B | 0.15 | 28, 120 | IFW |
| 17.34 | L, 0.3 | 30 | Al, 5 | K, 0.15 | S | 0 | 28, 160 | ~50/50 RTH, orthoclase |
| 17.35 | L, 0.3 | 34 | Al, 5 | Na, 0.30 | S | 0.3 | 28, 160 | ~50/50 RTH, ANA |
| 17.36 | L, 0.3 | 30 | Al, 10 | Na, 0.30 | Y | 0 | 28, 160 | ~50/50 RTH, ANA |
| 17.37 | L, 0.3 | 30 | Al, 20 | Na, 0.30 | S | 0.3 | 28, 160 | ~50/50 RTH, quartz |
| 17.38 | L, 0.3 | 30 | Al, 20 | Na, 0.30 | MK | 0 | 28, 160 | ~80/20 RTH, quartz |
| 17.39 | L, 0.3 | 30 | Al, 40 | Li, 0.30 | M | 0.3 | 28, 160 | ~75/25 RTH, lithium silicate |
| 17.40 | L, 0.3 | 30 | Al, 20 | Na, 0.30 | S | 0.3 | 28, 120 | RTH |
| 17.41 | L, 0.3 | 30 | Al, 40 | Na, 0.30 | S | 0.2 | 28, 120 | RTH, minor layered |
| 17.42 | L, 0.3 | 30 | Al, 40 | Li, 0.30 | M | 0.3 | 28, 120 | ~75/25 RTH, lithium silicate |

[a]L was LUDOX ™ HS-30 (30 wt % SiO$_2$); A was AERODISP ™ W7330 (30 wt % SiO$_2$).
[b]S was 8.86% sodium aluminate solution, B was 3.47% boric acid solution, M was MS-25, MK was metakaolin, K was potassium aluminate, and Y was Y molecular sievem.
[c]The reaction mixture included ITQ-33 seeds.
[f]The reaction mixture included ITQ-21 seeds.
[d]The reaction mixture included ITQ-24 seeds.
[e]The ratio of Si:Ti was 39, anatase.

Figure 15A:
FIGS. 15A and 15B are SEM micrographs of an IFW-type phase aluminoborosilicate without any layered silicate or quartz impurities.
Figure 15B:

Sample 17.4 synthesis was repeated but with seeds and a ratio of KOH to Si of 0.15, a ratio of Si to Al of 40, a ratio of Si to B of 24, a ratio of SDAOH to Si of 0.30, and a ratio of H$_2$O to Si of 32. To a 23-mL Teflon insert were added 4.15 SDAOH solution (1.085 mmol/g) and 2.25 g 1 N KOH. To this was added 0.035 g aluminum hydroxide (Aldrich) and 0.04 g boric acid, which were dissolved by stirring. To this solution was then added 3.00 g AERODISP™ W7330N colloidal silica (30%) and about 0.02 g of seeds from Sample 17.4. The liner was then capped, sealed within a 23-mL steel Parr autoclave, and placed within an oven with a rotating spit. The reactor was tumbled at about 30 rpm. After 5 days of heating at 160° C., an IFW-type phase was obtained without any layered silicate or quartz impurities. FIGS. 15A and 15B are SEM micrographs of the product.

Figure 16:
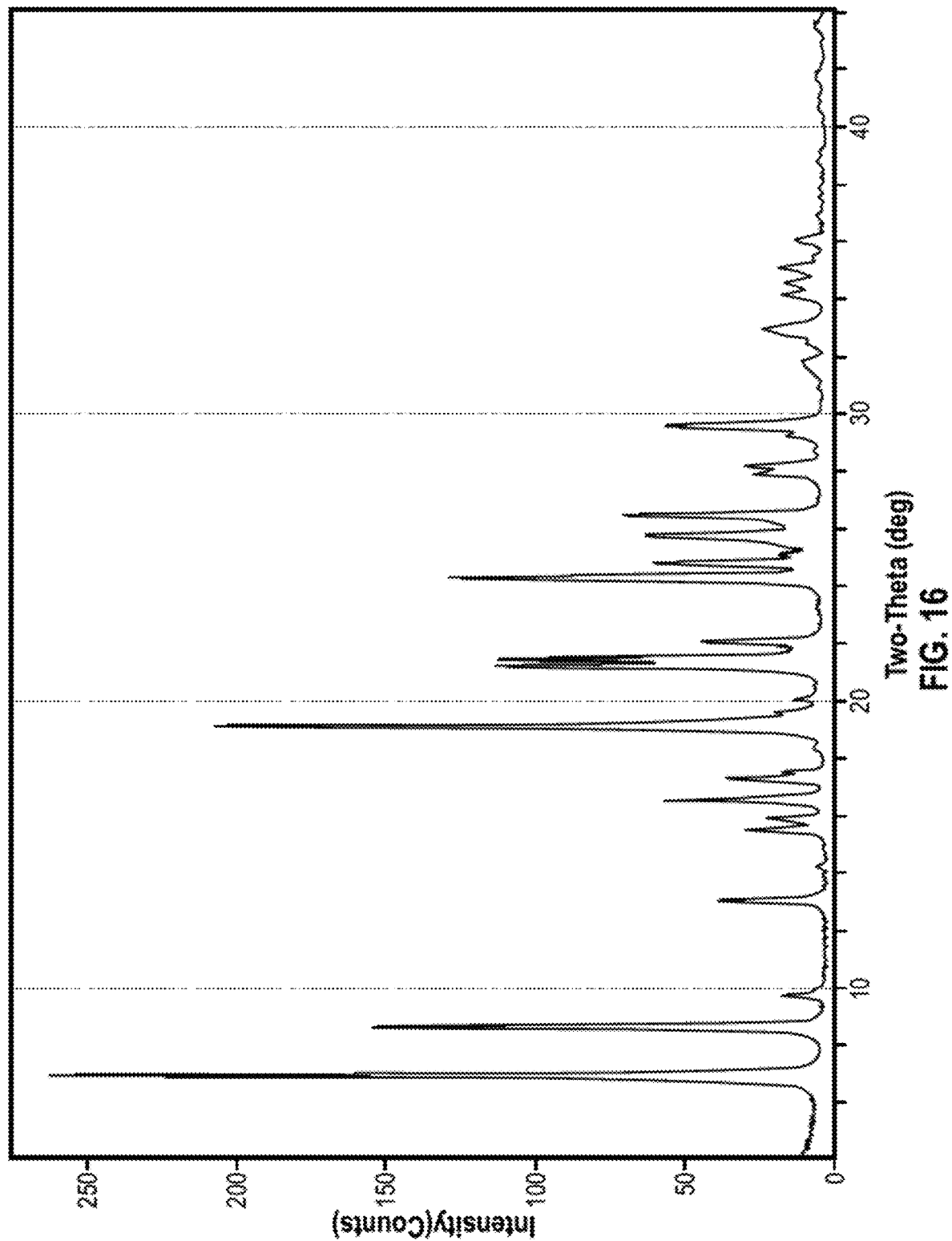
FIG. 16 is a plot of the XRD pattern of an aluminoborosilicate having a pure IFW-type phase.
Figure 17A:
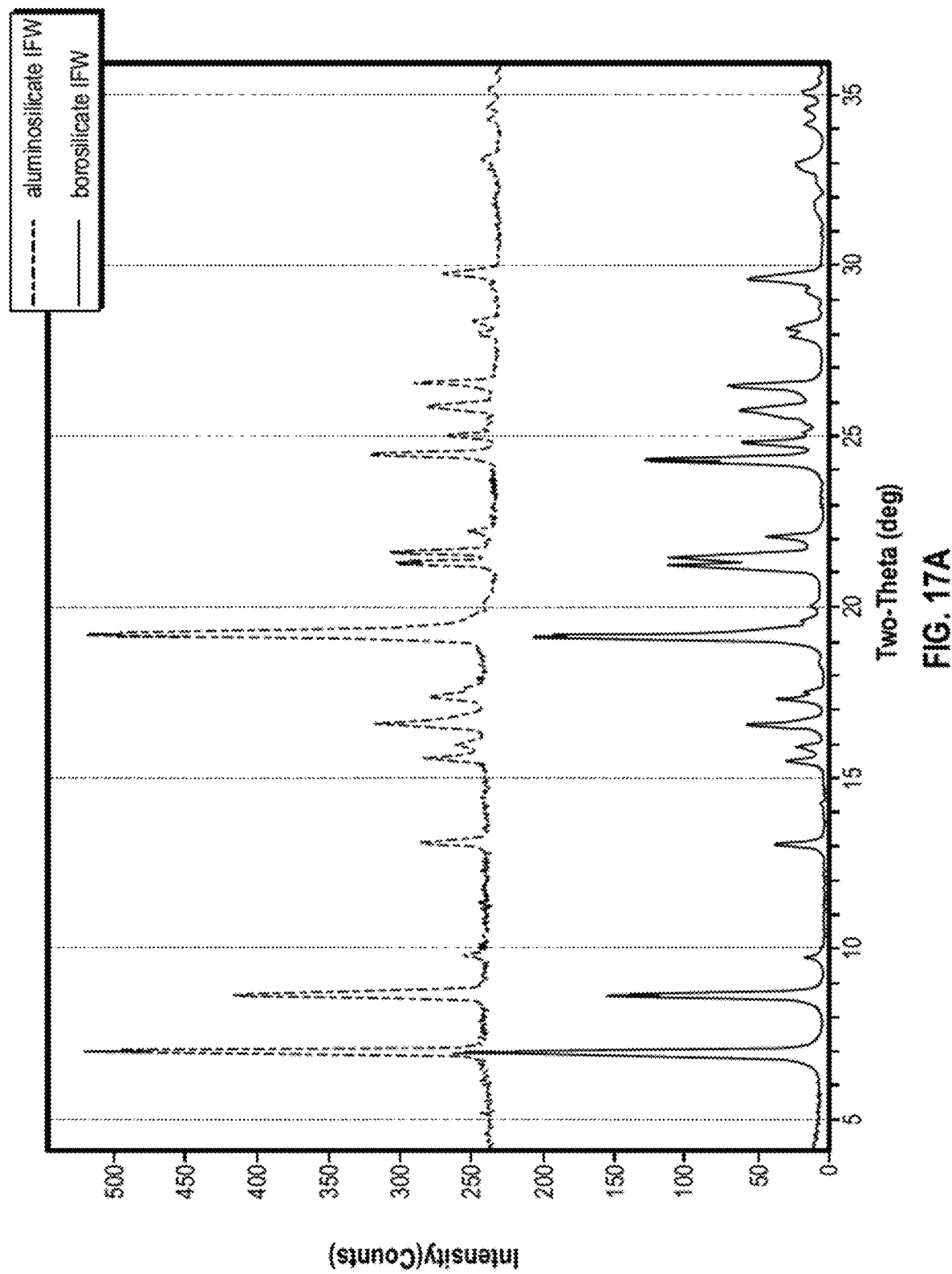
FIGS. 17A and 17B are plots of the XRD patterns for a borosilicate IFW-type molecular sieve (top plot) and an aluminosilicate IFW-type molecular sieve (bottom plot.).
Figure 17B:
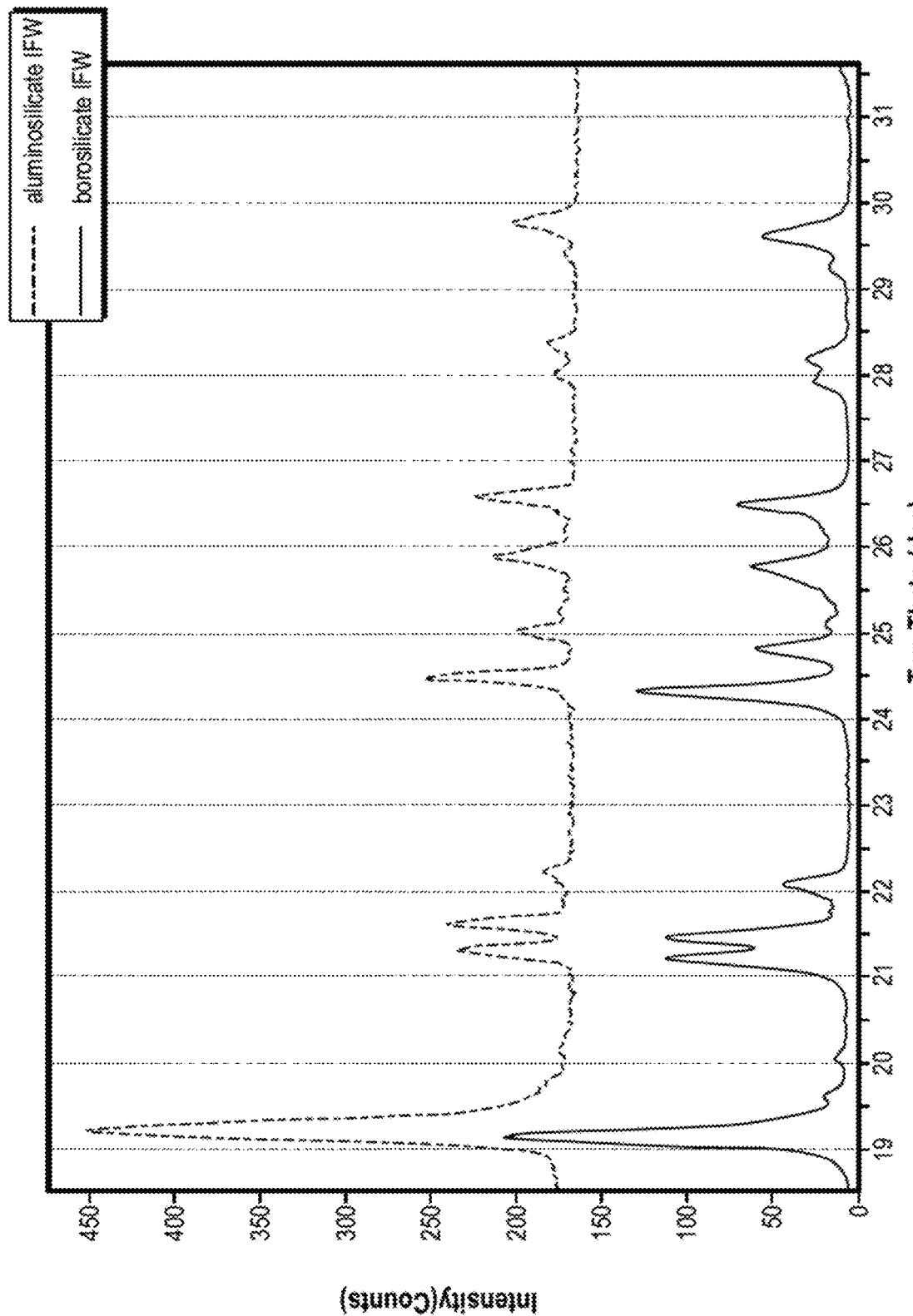

The foregoing synthesis that used seeds from Sample 17.4 was repeated but with (a) a higher aluminum concentration (a ratio of Si to Al of 25), (b) a lower boron concentration (a ratio of Si to B of 40), and (c) 0.02 g of seeds of the foregoing product (corresponding to FIGS. 15A and 15B) rather than Sample 17.4 seeds. After 6 days, a pure IFW-type phase was obtained. FIG. 16 is the XRD pattern for this product, and Table 26 is the peaks of the XRD pattern for this product. FIGS. 17A and 17B are plots of the XRD patterns for Sample 17.10 (borosilicate IFW-type molecular sieve, top plot) and this aluminosilicate IFW-type molecular sieve (bottom plot.). FIG. 17B is a zoomed version of FIG. 17A, which clearly illustrates the different peak positions for the different compositions. These are the first demonstrations of direct synthesis of aluminosilicate IFW-type molecular sieves.

TABLE 26

| 2-Theta (°) | d (Å) | Relative Peak Height Intensity |
|---|---|---|
| 6.96 | 12.69 | 100 |
| 8.63 | 10.24 | 58.3 |
| 9.76 | 9.06 | 5.2 |

TABLE 26-continued

| 2-Theta (°) | d (Å) | Relative Peak Height Intensity |
|---|---|---|
| 9.95 | 8.88 | 1.3 |
| 13.05 | 6.78 | 13.8 |
| 14.23 | 6.22 | 1.2 |
| 15.51 | 5.71 | 10.1 |
| 15.92 | 5.56 | 7.1 |
| 16.55 | 5.35 | 20.3 |
| 16.70 | 5.31 | 6.4 |
| 16.71 | 5.30 | 6.4 |
| 17.32 | 5.12 | 12.1 |
| 17.52 | 5.06 | 5.2 |
| 18.41 | 4.81 | 0.6 |
| 19.14 | 4.63 | 78.2 |
| 19.61 | 4.52 | 5.4 |
| 20.04 | 4.43 | 2.3 |
| 21.22 | 4.18 | 40.9 |
| 21.45 | 4.14 | 41.4 |
| 22.07 | 4.02 | 15 |
| 23.26 | 3.82 | 0.6 |
| 24.32 | 3.66 | 46.8 |
| 24.83 | 3.58 | 19.3 |
| 25.11 | 3.54 | 1.9 |
| 25.79 | 3.45 | 20.3 |
| 26.49 | 3.36 | 22.2 |
| 27.93 | 3.19 | 8.4 |
| 28.18 | 3.16 | 9.5 |
| 28.71 | 3.11 | 0.4 |
| 29.25 | 3.05 | 4.3 |
| 29.61 | 3.01 | 20 |
| 30.91 | 2.89 | 0.5 |
| 31.60 | 2.83 | 2.2 |
| 31.82 | 2.81 | 2.5 |
| 32.50 | 2.75 | 1.7 |
| 32.99 | 2.71 | 7.7 |
| 34.13 | 2.63 | 4.4 |
| 34.55 | 2.59 | 4.4 |
| 35.11 | 2.55 | 4.5 |
| 36.05 | 2.49 | 3.2 |
| 36.90 | 2.43 | 0.7 |

The foregoing synthesis that used seeds from Sample 17.4 was repeated but with (a) a higher aluminum concentration (a ratio of Si to Al of 25), (b) no boron source, and (c) 0.02 g of seeds of the foregoing product (corresponding to FIGS. 15A and 15B) rather than Sample 17.4 seeds. After 6 days, a pure IFW-type phase was obtained with no boron.

In addition, IFW and RTH borosilicate molecular sieves were prepared according to the reaction mixture components, reaction conditions, and product descriptions provided in Table 27. The silica source was TMOS. The boron source was 3.47% boric acid solution. The SDA was Compound AD illustrated above. The reaction time was 10 days at 150° C.

TABLE 27

| Sample No. | SDA:Si (molar) | H$_2$O:Si (molar) | Si:T$^{III}$ (molar) | HF:Si (molar) | Results |
|---|---|---|---|---|---|
| 17.43 | 0.5 | 4.0 | B, 5 | 0 | IFW |
| 17.44 | 0.5 | 10 | B, 5 | 0 | IFW |
| 17.45 | 0.5 | 10 | B, 10 | 0.5 | IFW |
| 17.46 | 0.5 | 4.0 | B, 40 | 0.5 | IFW |
| 17.47 | 0.5 | 10 | B, 40 | 0.5 | IFW |
| 17.48 | 0.5 | 10 | B, 10 | 0 | RTH |
| 17.49 | 0.5 | 4.0 | 0 | 0.5 | RTH |
| 17.50 | 0.5 | 10 | 0 | 0.5 | RTH |

Example 19. Several germanosilicate IWV molecular sieves were prepared according to the reaction mixture components, reaction conditions, and product descriptions provided in Table 28. The silica source was TMOS. The germanium source was germanium oxide. The SDA was Compound AE with the OH$^-$ counter ion (an embodiment of Compound E).

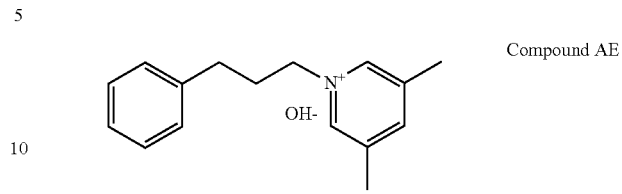
Compound AE

TABLE 28

| Sample No. | SDA:Si (molar) | H$_2$O:Si (molar) | Si:Ge (molar) | HF:Si (molar) | Time (days), Temp (° C.) | Results |
|---|---|---|---|---|---|---|
| 18.1 | 0.6 | 4.54 | 7.3 | 0.6 | 7, 175 | IWV |
| 18.2 | 0.6 | 5.00 | 4 | 0.6 | 7, 175 | IWV |
| 18.3 | 0.6 | 11.4 | 7.3 | 0.6 | 7, 175 | IWV |
| 18.4 | 0.6 | 12.5 | 4 | 0.6 | 7, 175 | IWV |
| 18.5 | 0.5 | 4.00 | 0 | 0.5 | 10, 150 | ~60/40 *CTH, IWV |

The XRD pattern peaks for Sample 18.2 are provided in Table 29.

TABLE 29

| 2-Theta (°) | d (Å) | Relative Peak Height Intensity |
|---|---|---|
| 6.46 | 13.67 | 100 |
| 6.94 | 12.72 | 2.2 |
| 7.24 | 12.20 | 31.5 |
| 7.98 | 11.07 | 7.8 |
| 9.48 | 9.32 | 3.5 |
| 12.82 | 6.90 | 22.1 |
| 14.42 | 6.14 | 1.7 |
| 17.44 | 5.08 | 2 |
| 18.26 | 4.85 | 10.1 |
| 18.74 | 4.73 | 4.5 |
| 19.60 | 4.53 | 1.7 |
| 20.84 | 4.26 | 3.3 |
| 21.58 | 4.11 | 1.8 |
| 23.16 | 3.84 | 2.3 |
| 23.34 | 3.81 | 5 |
| 24.56 | 3.62 | 3.6 |
| 25.22 | 3.53 | 0.9 |
| 25.62 | 3.74 | 5.3 |
| 25.92 | 3.43 | 12.3 |
| 26.60 | 3.35 | 4.1 |

Example 20. Several aluminosilicate and borosilicate molecular sieves were prepared according to the reaction mixture components, reaction conditions, and product descriptions provided in Table 30. The SDA was Compound AF with the OH$^-$ counter ion (an embodiment of Compound F).

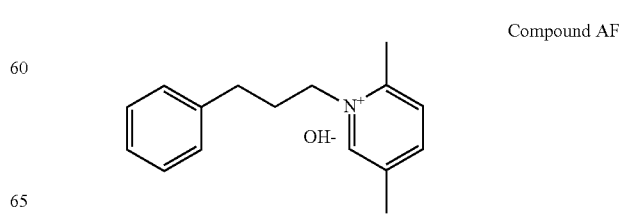
Compound AF

TABLE 30

| Sample No. | Silica Source[a], SDA:Si (molar) | H$_2$O:Si (molar) | Si:T$^{III}$ (molar) | MOH:Si (M, molar) | T$^{III}$ Source[b] | HCl:Si (molar) | Time (days), Temp (° C.). | Results |
|---|---|---|---|---|---|---|---|---|
| 19.1 | L, 0.3 | 43 | Al, 5 | Na, 0.30 | MK | 0 | 28, 160 | IWV, unidentified |
| 19.2 | L, 0.3 | 59 | B, 5 | Na, 0.10 | B | 0 | 28, 160 | IFW |
| 19.3 | L, 0.2 | 57 | B, 5 | Li, 0.30 | B | 0.1 | 28, 160 | ~70/30 IFW:cristobalite |
| 19.4 | A, 0.2 | 36 | B, 20 | Li, 0.10 | K | 0 | 28, 160 | ~70/30 IFW:cristobalite |
| 19.5 | L, 0.3 | 59 | B, 5 | Na, 0.10 | B | 0 | 7, 160 | IFW |

[a]L is LUDOX ™ HS-30 (30 wt % SiO$_2$); A is AERODISP ™ W7330 (30 wt % SiO$_2$).
[b]MK is metakaolin, B is 3.47% boric acid solution, and K is potassium aluminate.

In addition, aluminosilicate, borosilicate, and germanosilicate molecular sieves were prepared according to the reaction mixture components, reaction conditions, and product descriptions provided in Table 31. The silica source was TMOS. The boron source was 3.47% boric acid solution. The aluminum source was aluminum nitrate. The SDA was Compound AF.

TABLE 31

| Sample No. | SDA:Si (molar) | H2O:Si (molar) | Si:T$^{III/IV}$ (molar) | HF:Si (molar) | Time (days), Temp (° C.) | Results |
|---|---|---|---|---|---|---|
| 19.6 | 0.5 | 4 | B, 10 | 0 | 10, 150 | IFW, RTH, layered |
| 19.7 | 0.5 | 4 | B, 5 | 0 | 10, 150 | IFW |
| 19.8 | 0.5 | 4 | Al, 50 | 0.5 | 10, 150 | IFW |
| 19.9[a] | 0.5 | 4 | 0 | 0.5 | 10, 150 | IFW |
| 19.10[b] | 0.5 | 4 | 0 | 0.5 | 10, 150 | IFW |
| 19.11 | 0.5 | 4 | Al, 50 | 0 | 10, 150 | ~70/30 RTH, IFW |
| 19.12 | 0.5 | 4 | Al, 20 | 0 | 10, 150 | IFW |
| 19.13 | 0.5 | 10 | B, 5 | 0 | 10, 150 | ~50/50 *CTH, IFW |
| 19.14 | 0.5 | 4 | B, 5 | 0.5 | 10, 150 | RTH |
| 19.15 | 0.5 | 10 | B, 5 | 0.5 | 10, 150 | RTH |
| 19.16 | 0.5 | 10 | B, 40 | 0.5 | 10, 150 | RTH |
| 19.17 | 0.5 | 4 | B, 10 | 0.5 | 10, 150 | *CTH |
| 19.18 | 0.5 | 10 | B, 10 | 0.5 | 10, 150 | *CTH |
| 19.19 | 0.5 | 4 | 0 | 0.5 | 10, 150 | *CTH |
| 19.20 | 0.5 | 10 | 0 | 0.5 | 10, 150 | *CTH |
| 19.21 | 0.6 | 11.4 | Ge, 7.33 | 0.6 | 7, 175 | *CTH |

[a]The reaction mixture included ITQ-24 seeds.
[b]The reaction mixture included ITQ-33 seeds.

The XRD pattern peaks for Sample 19.20 are provided in Table 32.

TABLE 32

| 2-Theta (°) | d (Å) | Relative Peak Height Intensity |
|---|---|---|
| 6.50 | 13.59 | 51.4 |
| 7.24 | 12.20 | 100 |
| 8.00 | 11.05 | 11.7 |
| 9.48 | 9.32 | 9 |
| 11.45 | 7.72 | 1 |
| 12.94 | 6.84 | 23.4 |
| 14.40 | 6.15 | 11.1 |
| 17.40 | 5.09 | 6 |
| 18.22 | 4.87 | 53.8 |
| 18.74 | 4.73 | 24.8 |
| 19.56 | 4.54 | 15.5 |
| 20.94 | 4.24 | 16.5 |
| 21.72 | 4.09 | 15 |
| 23.38 | 3.80 | 15.8 |
| 24.64 | 3.61 | 10.5 |
| 25.32 | 3.51 | 8.6 |
| 26.00 | 3.42 | 11.7 |
| 26.64 | 3.34 | 23.1 |
| 27.84 | 3.20 | 1.8 |
| 28.90 | 3.09 | 0.9 |
| 29.40 | 3.04 | 3 |
| 29.98 | 2.98 | 4 |
| 34.00 | 2.63 | 1.9 |
| 34.92 | 2.57 | 1.7 |
| 35.58 | 2.582 | 2.1 |

Example 21. Germanosilicate molecular sieves were prepared according to the reaction mixture components, reaction conditions, and product descriptions provided in Table 33. The silica source was TMOS. The germanium source was germanium oxide. The SDA was Compound AG with the OH$^-$ counter ion.

Compound AG

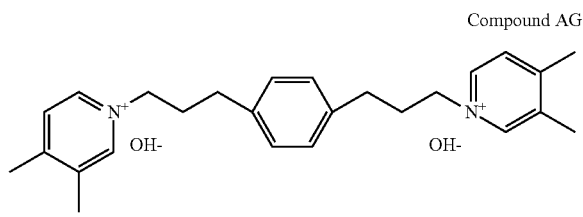

TABLE 33

| Sample No. | SDA:Si (molar) | H$_2$O:Si (molar) | Si:Ge (molar) | HF:Si (molar) | Time (days), Temp (° C.) | Results |
|---|---|---|---|---|---|---|
| 21.1 | 0.3 | 11.4 | 7.3 | 0.6 | 7, 175 | POS |

In this example, the product was a material with the POS framework, a material with a 12×11×11-ring structure with the channels intersecting to create a large cavity. This material is isostructural with PKU-16 (A Germanosilicate Structure with 11×11×12-Ring Channels Solved by Electron Crystallography" Angew. Chem. Int. Ed., 53, 5868-5871 (2014).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed:

1. A method comprising:
reacting, in a reaction mixture, a source of a tetrahedral element in the presence of a structure directing agent (SDA) selected from the group consisting of: Ar$^+$-L-Ar, Ar$^+$-L-Ar-L-Ar$^+$, and Ar$^+$-L-Ar-L-NR3$^+$, where Ar$^+$ is to a N-containing cationic aromatic ring, Ar is to a non-charged aromatic ring, L is a methylene chain of 3-6 carbon atoms, and NR3$^+$ is to a quaternary ammonium, to produce a molecular sieve.

2. The method of claim 1, wherein the N-containing cationic aromatic ring is selected from the group consisting of: pyridinium, a substituted pyridinium, imidazolium, a substituted imidazolium, pyrazolium, a substituted pyrazolium, pyrazinium, a substituted pyrazinium, pyrimidinium, and a substituted pyrimidinium.

3. The method of claim 1, wherein the non-charged aromatic ring is selected from the group consisting of: phenyl, a substituted phenyl, naphthyl, and a substituted naphthyl.

4. The method of claim 1, wherein the SDA is selected from the group consisting of:

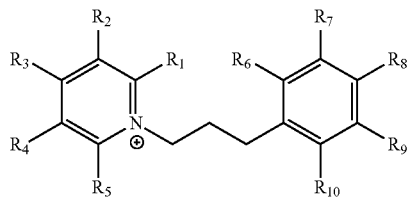

where R$_1$-R$_{10}$ are independently H, C$_1$-C$_6$ alkyl (branched or linear), or C$_5$-C$_6$ cycloalkyl; and wherein N$^+$ is counterbalanced by OH$^-$, F$^-$, Cl$^-$, Br$^-$, or I$^-$;

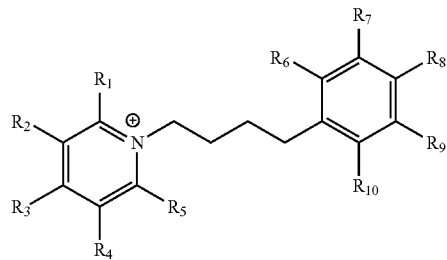

where R$_1$-R$_{10}$ are independently H, C$_1$-C$_6$ alkyl (branched or linear), or C$_5$-C$_6$ cycloalkyl; and wherein N$^+$ is counterbalanced by OH$^-$, F$^-$, Cl$^-$, Br$^-$, or I$^-$;

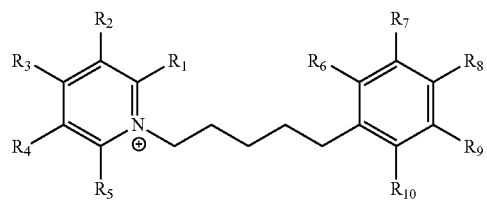

where R$_1$-R$_{10}$ are independently H, C$_1$-C$_6$ alkyl (branched or linear), or C$_5$-C$_6$ cycloalkyl; and wherein N$^+$ is counterbalanced by OH$^-$, F$^-$, Cl$^-$, Br$^-$, or I$^-$;

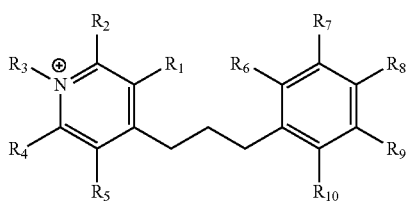

where $R_1$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

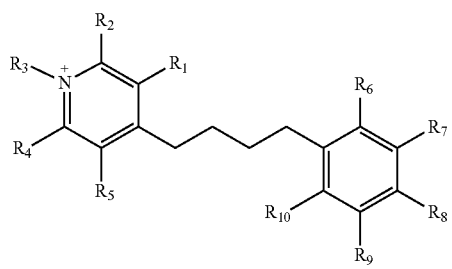

where $R_1$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

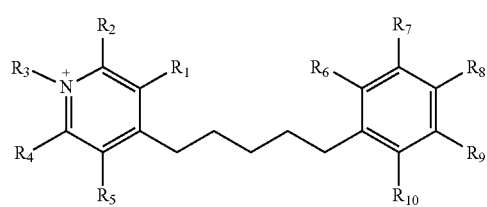

where $R_1$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

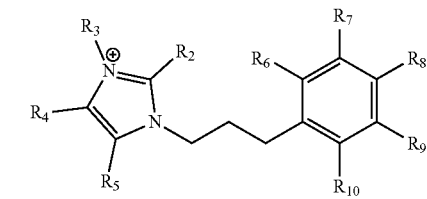

where $R_2$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

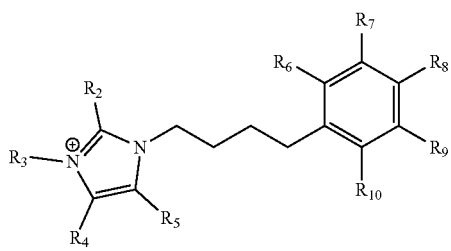

where $R_2$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

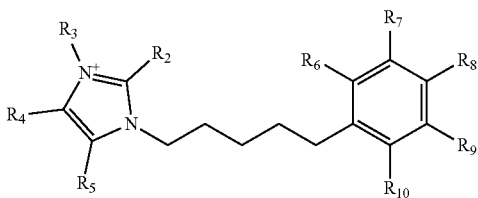

where $R_2$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

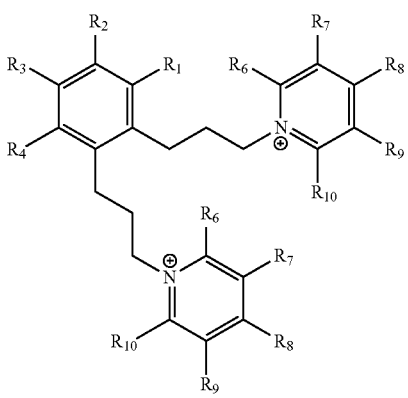

where $R_1$-$R_4$ are independently H, $C_1$-$C_6$ alkyl (branched or linear), or $C_5$-$C_6$ cycloalkyl and $R_6$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

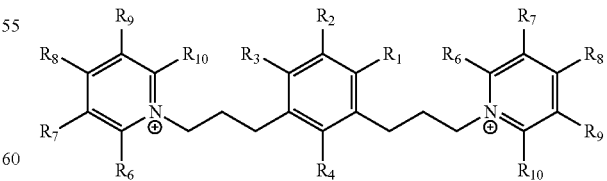

where $R_1$-$R_4$ are independently H, $C_1$-$C_6$ alkyl (branched or linear), or $C_5$-$C_6$ cycloalkyl and $R_6$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

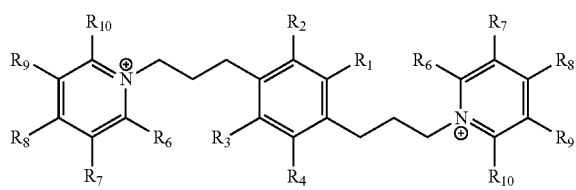

where $R_1$-$R_4$ are independently H, $C_1$-$C_6$ alkyl (branched or linear), or $C_5$-$C_6$ cycloalkyl and $R_6$-$R_{10}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

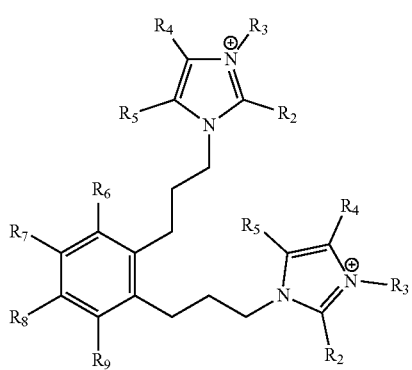

where $R_2$-$R_9$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

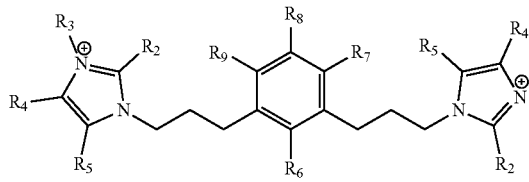

where $R_2$-$R_9$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

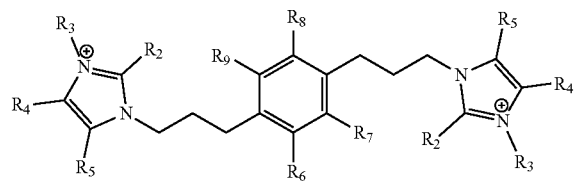

where $R_2$-$R_9$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

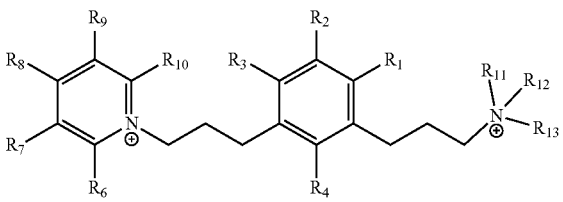

where $R_1$-$R_4$ are independently H, $C_1$-$C_6$ alkyl (branched or linear), or $C_5$-$C_6$ cycloalkyl and $R_6$-$R_{13}$ are independently H, $C_1$-$C_6$ alkyl (branched or linear), or $C_5$-$C_6$ cycloalkyl; and wherein $N^+$ is counterbalanced by $OH^-$, $F^-$, $Cl^-$, $Br^-$, or $I^-$;

and any combination thereof.

5. The method of claim 1, wherein the reaction mixture is an aqueous reaction mixture; wherein the tetrahedral element comprises Si; and wherein the aqueous reaction mixture has a molar ratio of atomic Si to the structure directing agent of about 1 to about 20 and wherein the aqueous reaction mixture has a molar ratio of water to atomic Si of about 2 to about 80.

6. The method of claim 1, wherein the source of tetrahedral element is selected from the group consisting of: silicon sources, germanium sources, aluminum sources, boron sources, phosphorus sources, and any combination thereof.

7. The method of claim 1, wherein the reaction mixture further comprises a source of hydroxide ions.

8. The method of claim 1, wherein the reaction mixture further comprises a source of halide ions.

9. The method of claim 1, wherein the reaction mixture further comprises a source of alkali/alkaline earth metal ions.

10. The method of claim 1, wherein the reaction mixture further comprises molecular sieve seeds.

11. The method of claim 1, wherein reacting is at a temperature of about 75° C. to about 200° C.

12. The method of claim 1, wherein the molecular sieve has a composition selected from the group consisting of: silica, aluminosilicate, borosilicate, aluminoborosilicate, germanosilicate, aluminophosphate, silicoaluminophosphate, and metalloaluminophophates.

13. The method of claim 1, wherein the molecular sieve has a framework selected from the group consisting: of a RHO framework, a LTA framework, ITE framework, a RTH framework, an ITE/RTH intergrowth framework, an IWV framework, an IFW framework, a *CTH framework, a SAS framework, a POS framework, and a MWW framework.

* * * * *